(12) United States Patent
Kubota et al.

(10) Patent No.: US 8,184,253 B2
(45) Date of Patent: May 22, 2012

(54) LIQUID CRYSTAL DISPLAY DEVICE

(75) Inventors: Daisuke Kubota, Kanagawa (JP);
Tetsuji Ishitani, Kanagawa (JP); Shuji Fukai, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 187 days.

(21) Appl. No.: 12/783,764

(22) Filed: May 20, 2010

(65) Prior Publication Data

US 2010/0328565 A1     Dec. 30, 2010

(30) Foreign Application Priority Data

May 29, 2009  (JP) ................................. 2009-130030

(51) Int. Cl.
*G02F 1/1343* (2006.01)
(52) U.S. Cl. ........................................................ 349/141
(58) Field of Classification Search .................... 349/141
See application file for complete search history.

(56) References Cited

U.S. PATENT DOCUMENTS

| | | | |
|---|---|---|---|
| 4,409,134 A | 10/1983 | Yamazaki | |
| 6,097,465 A | 8/2000 | Hiroki et al. | |
| 6,128,062 A * | 10/2000 | Sato | 349/141 |
| 6,175,395 B1 | 1/2001 | Yamazaki et al. | |
| 6,429,914 B1 | 8/2002 | Kubota et al. | |
| 6,630,969 B2 | 10/2003 | Kubota et al. | |
| 7,057,695 B2 | 6/2006 | Mun et al. | |
| 7,084,840 B2 | 8/2006 | Moon | |
| 7,136,128 B2 * | 11/2006 | Hirakata et al. | 349/141 |
| 7,209,204 B2 | 4/2007 | Mun et al. | |
| 7,211,825 B2 | 5/2007 | Shih et al | |
| 7,327,433 B2 | 2/2008 | Miyachi et al. | |
| 7,342,632 B2 | 3/2008 | Miyachi et al. | |
| 7,486,364 B2 | 2/2009 | Mun et al. | |
| 7,525,621 B2 | 4/2009 | Mun et al. | |
| 7,564,526 B2 | 7/2009 | Mun et al. | |
| 7,576,829 B2 | 8/2009 | Kikuchi et al. | |
| 7,639,332 B2 | 12/2009 | Miyachi et al. | |
| 7,639,337 B2 | 12/2009 | Mun et al. | |
| 2006/0203169 A1 | 9/2006 | Ozawa et al. | |
| 2006/0209245 A1 | 9/2006 | Mun et al. | |

(Continued)

FOREIGN PATENT DOCUMENTS

EP          1 688 783 A1      8/2006

(Continued)

OTHER PUBLICATIONS

International Search Report (Application No. PCT/JP2010/058692), mailed Jun. 15, 2010.

(Continued)

*Primary Examiner* — James Dudek
(74) *Attorney, Agent, or Firm* — Nixon Peabody LLP; Jeffrey L. Costellia

(57) ABSTRACT

An object is to provide a liquid crystal display device using a liquid crystal material exhibiting a blue phase, in order to enable a higher contrast. In a liquid crystal display device which includes a liquid crystal layer exhibiting a blue phase, a first structure body and a second structure body are provided over a first electrode layer (a pixel electrode layer) and a second electrode layer (a common electrode layer), respectively. The first structure body and the second structure body are insulators each having a higher dielectric constant than a liquid crystal material used for the liquid crystal layer, and are provided to project into the liquid crystal layer.

27 Claims, 40 Drawing Sheets

U.S. PATENT DOCUMENTS

| | | |
|---|---|---|
| 2006/0227283 A1 | 10/2006 | Ooi et al. |
| 2007/0126969 A1 | 6/2007 | Kimura et al. |
| 2008/0259254 A1 | 10/2008 | Kikuchi et al. |
| 2008/0284964 A1 | 11/2008 | Mun et al. |
| 2009/0153761 A1 | 6/2009 | Park et al. |
| 2010/0053485 A1 | 3/2010 | Mun et al. |
| 2010/0195028 A1 | 8/2010 | Kubota et al. |
| 2010/0245724 A1 | 9/2010 | Nishi et al. |

FOREIGN PATENT DOCUMENTS

| | | |
|---|---|---|
| EP | 1 743 931 A1 | 1/2007 |
| JP | 11-095220 | 4/1999 |
| JP | 2000-298266 | 10/2000 |
| JP | 2002-122869 | 4/2002 |
| JP | 2005-202390 | 7/2005 |
| JP | 2006-343697 | 12/2006 |
| JP | 2008-112022 | 5/2008 |
| WO | WO 2005/052674 A1 | 6/2005 |
| WO | WO 2005-090520 A1 | 9/2005 |

OTHER PUBLICATIONS

Written Opinion (Application No. PCT/JP2010/058692), mailed Jun. 15, 2010.

* cited by examiner

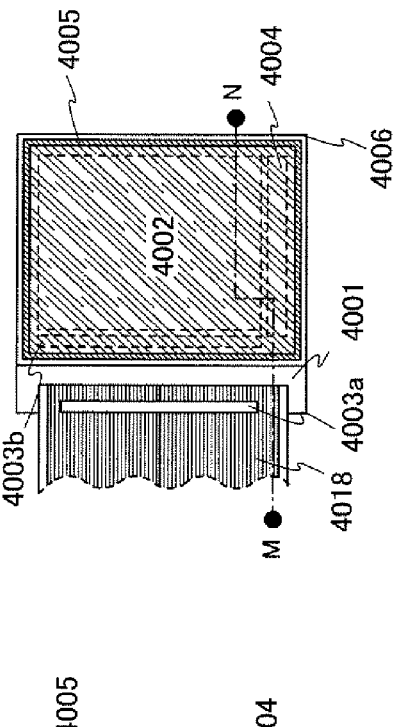
FIG. 12A1
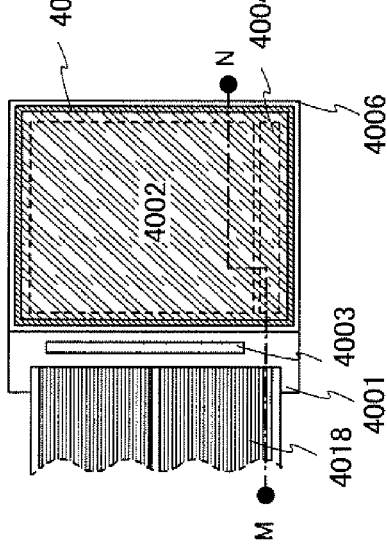
FIG. 12A2
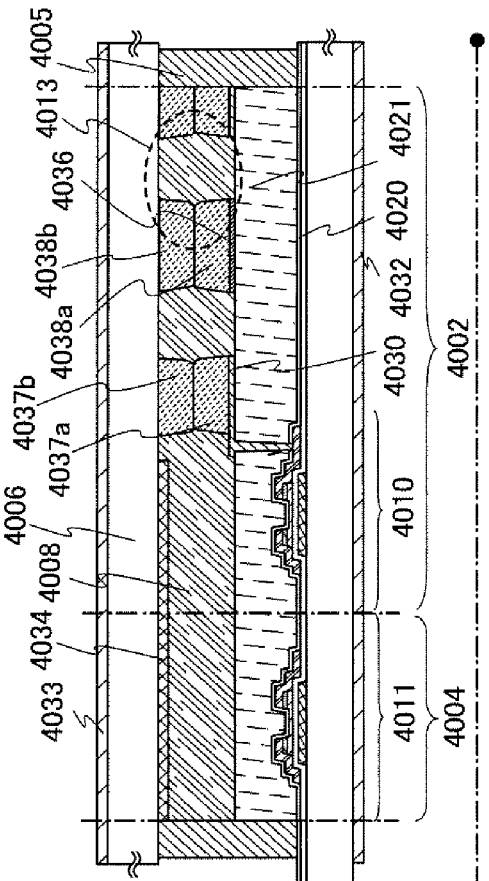
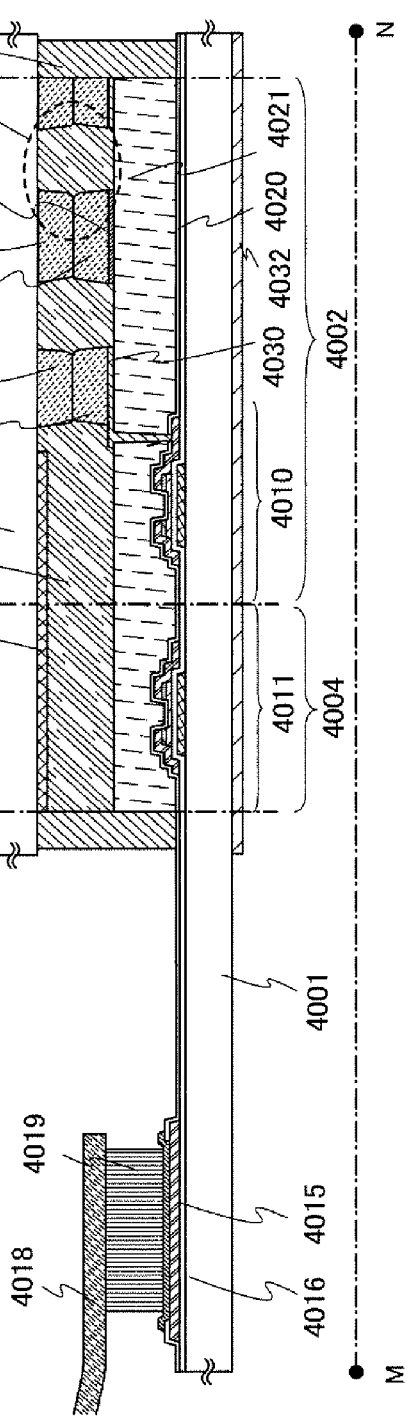
FIG. 12B

FIG. 19A    dielectric constant=12
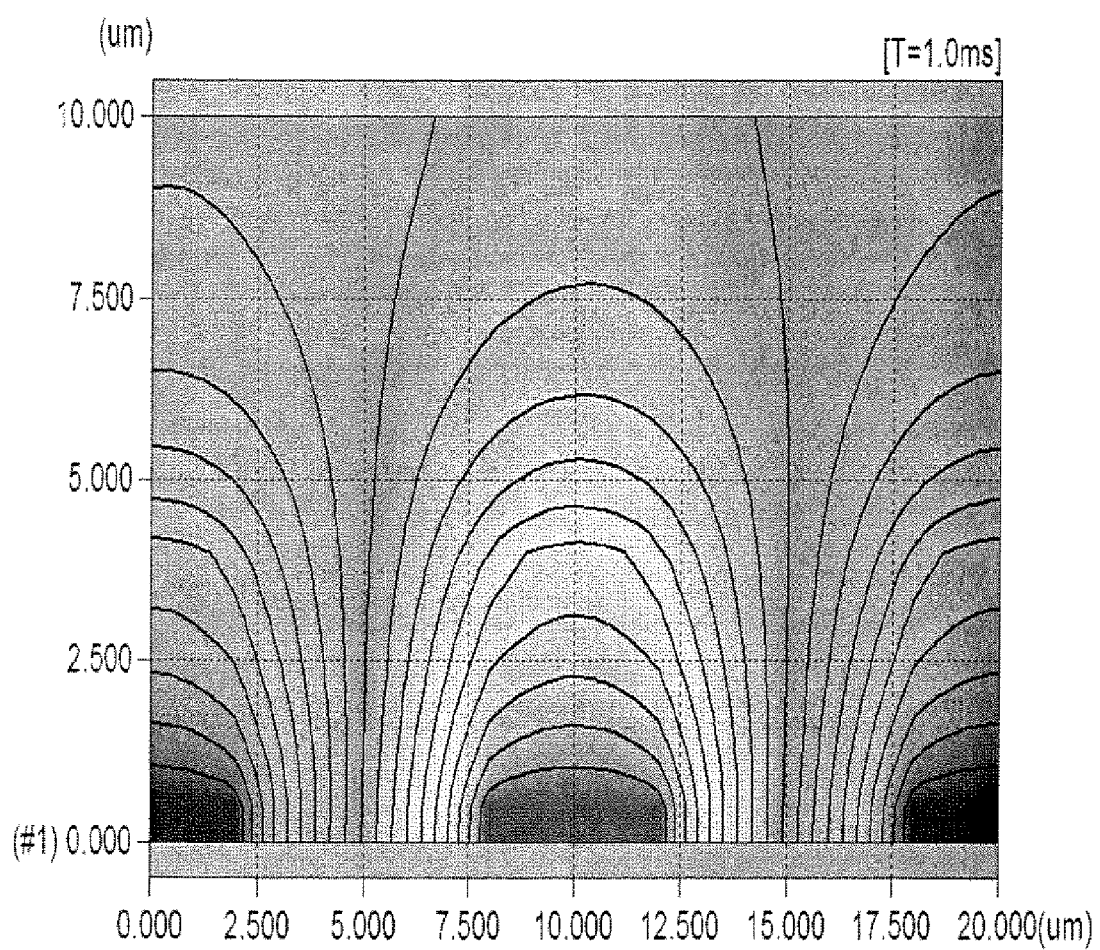

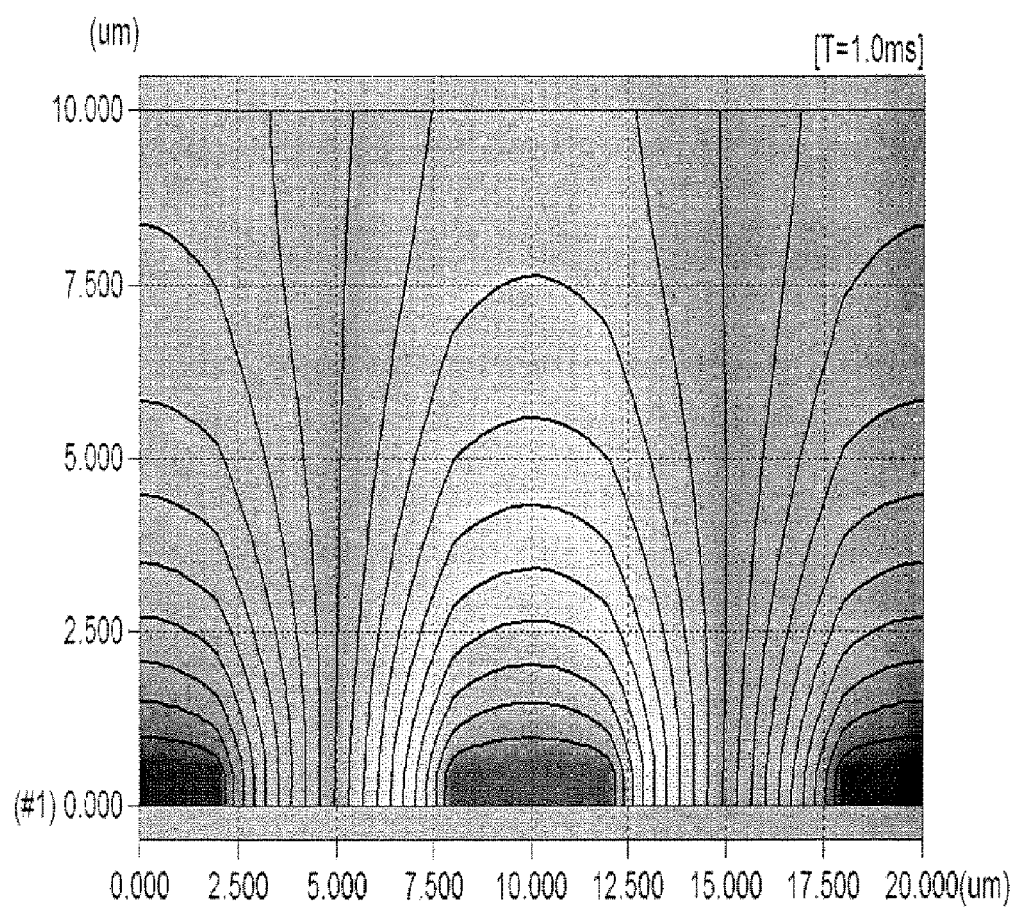
FIG. 19B  dielectric constant=12

FIG. 19C    dielectric constant=12
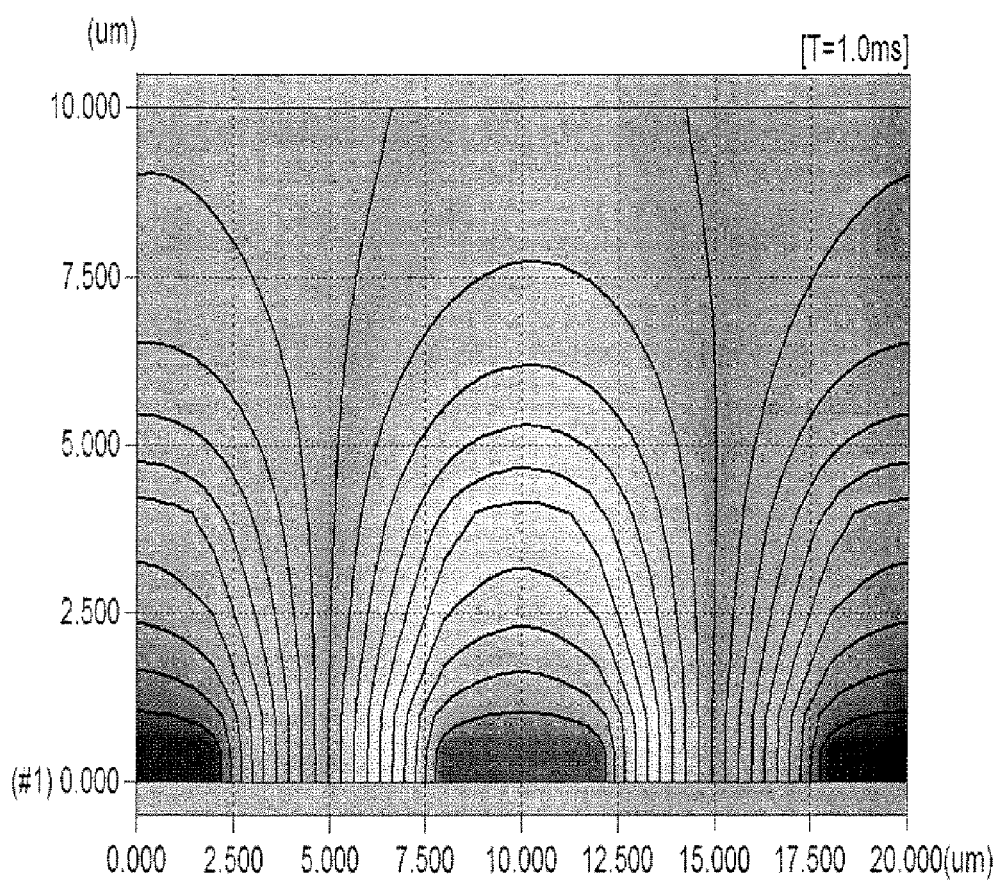

dielectric constant=18

FIG. 21A  dielectric constant=24
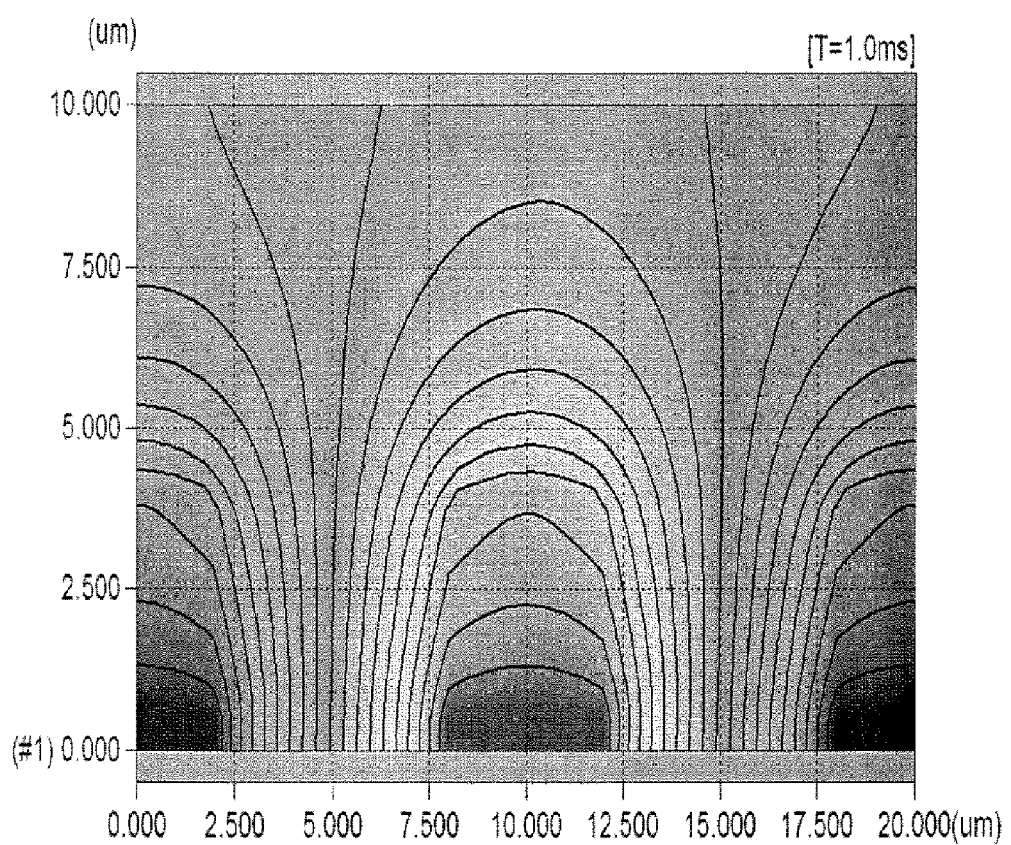

FIG. 21B  dielectric constant=24
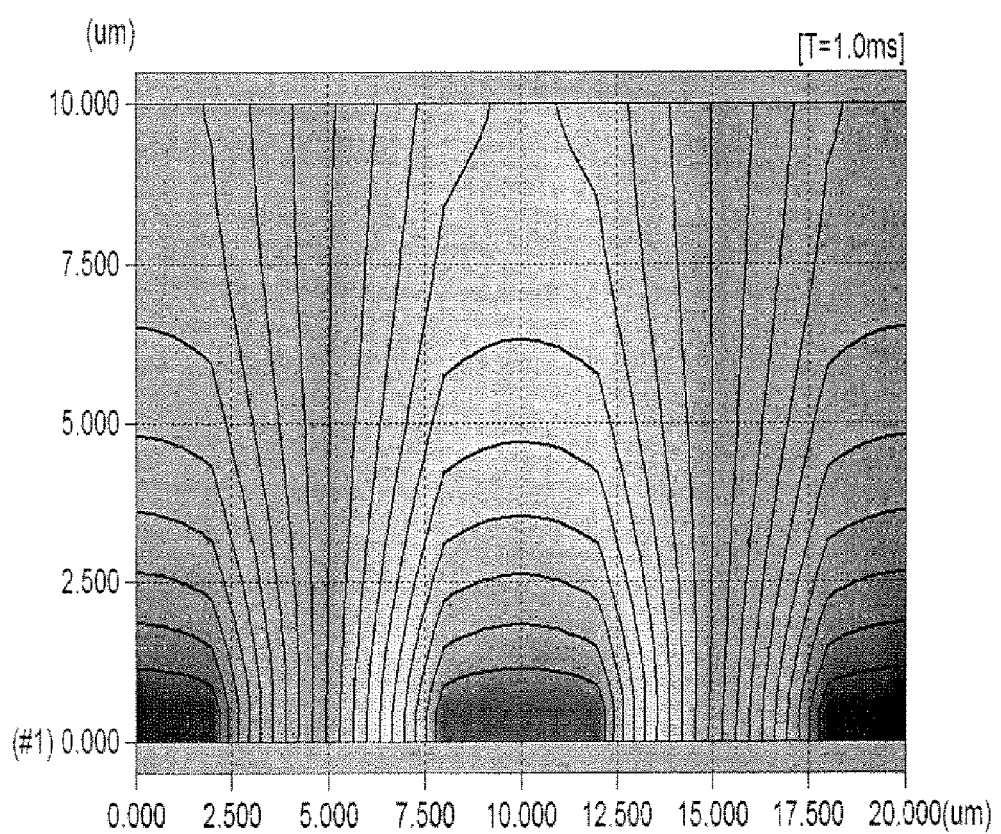

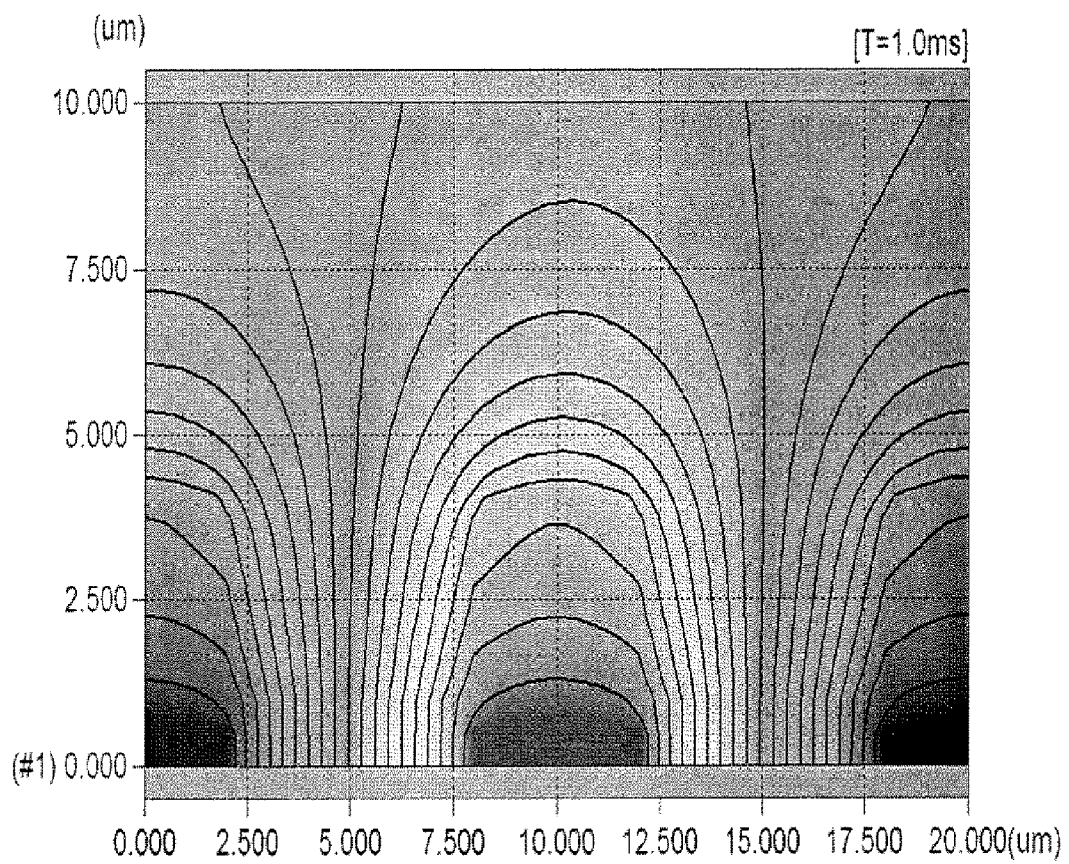
FIG. 21C  dielectric constant=24

FIG. 22A    dielectric constant=130
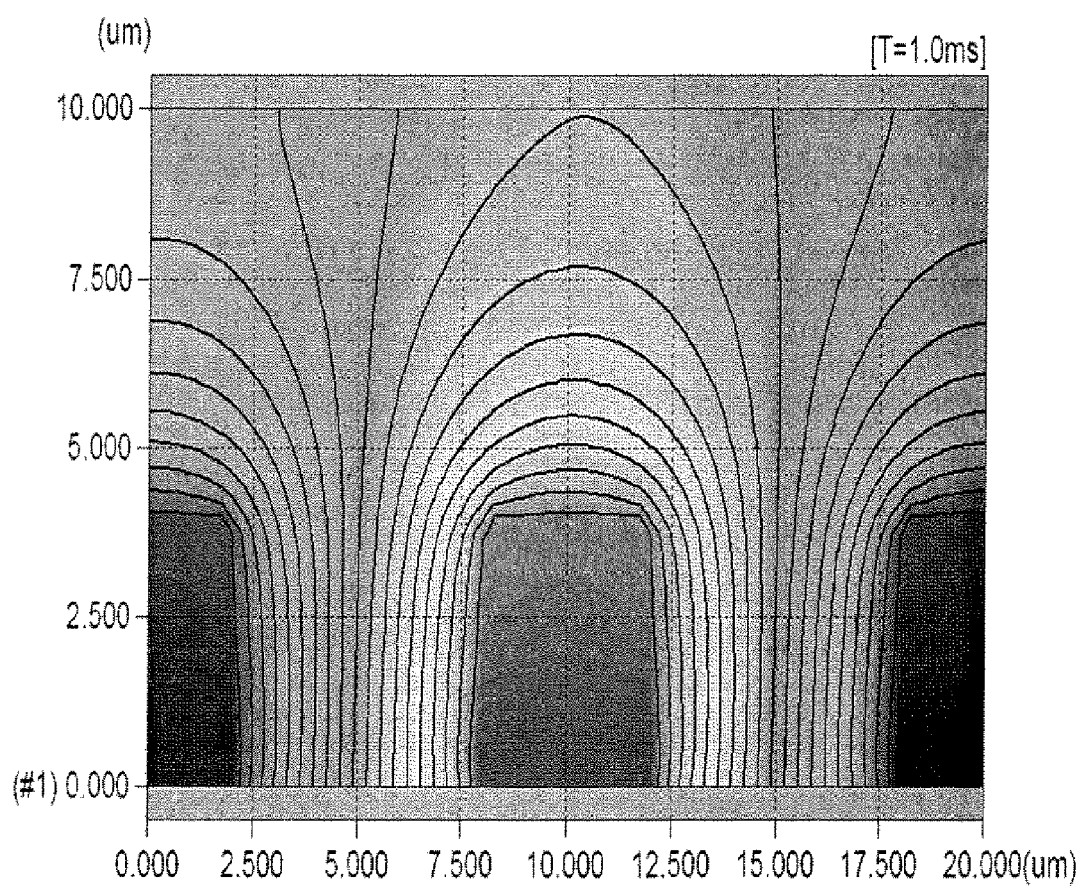

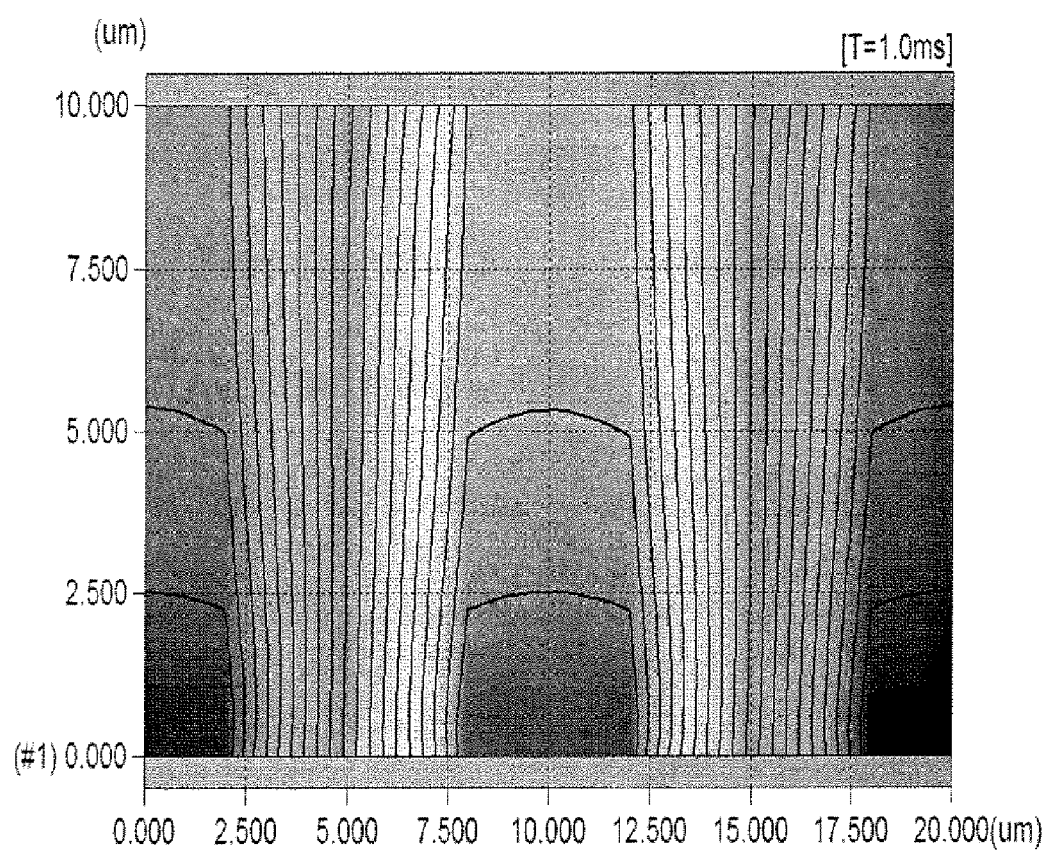
FIG. 22B  dielectric constant=130

FIG. 22C  dielectric constant=130
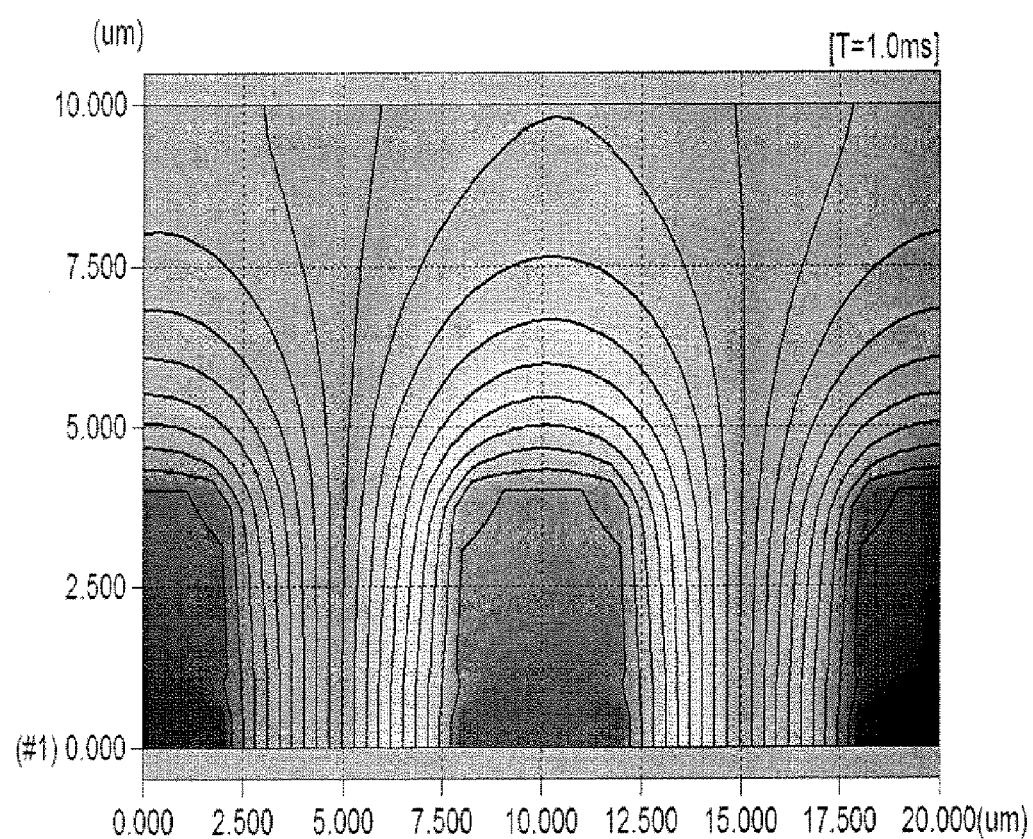

EXPLANATION OF REFERENCE

200: first electrode, 201: second electrode, 208: liquid crystal layer, 230 (230a, 230b): first electrode layer, 232 (232a, 232b, 232c): second electrode layer, 233a (233a1, 233a2): first structure body, 233b (233b1, 233b2): first structure body, 234a (234a1, 234a2, 234a3): second structure body, 234b (234b1, 234b2, 234b3): second structure body, 234c (234c1, 234c2, 234c3): second structure body, 235a, 235b, 235c, 235d: third structure body, 401: gate electrode layer, 402: gate insulating layer, 403: semiconductor layer, 404a, 404b: $n^+$ layer, 405a, 405b: wiring layer, 407: insulating film, 408: capacitor wiring layer, 413: interlayer film, 414: light-blocking layer, 415: insulating layer, 417: light-transmitting resin layer, 420: thin film transistor, 421: thin film transistor, 422: thin film transistor, 423: thin film transistor, 441: first substrate, 442: second substrate, 443a, 443b: polarizing plate, 444: liquid crystal layer, 446: first structure body, 447: first electrode layer, 448: second electrode layer, 449: second structure body, 450: color filter, 451: element layer, 454a, 454b, 454c: light-transmitting resin layer, 455a, 455b, 455c, 455d: light-blocking layer, 456a, 456b: sealant, 457: light, 458: liquid crystal layer, 459a, 459b: substrate, 501: substrate, 503: gate electrode layer, 505: gate insulating layer, 508a: microcrystalline semiconductor region, 508b: amorphous semiconductor region, 508c: microcrystalline semiconductor region, 515: semiconductor layer, 515a: microcrystalline semiconductor layer, 515b: mixed region, 525: wiring, 527: impurity semiconductor layer, 529c: layer containing amorphous semiconductor, 800: first substrate, 801: second substrate, 802: first electrode layer, 803a, 803b: electrode layer, 808: liquid crystal layer, 1000: mobile phone handset, 1001: housing, 1002: display portion, 1003: operation button, 1004: external connection port, 1005: speaker, 1006: microphone, 1301: display portion, 1302: driving portion, 1303: signal line driver circuit, 1304: scan line driver circuit, 1305: pixel, 1306: scan line, 1308: signal line, 2600: element substrate, 2601: counter substrate, 2602: sealant, 2603: element layer, 2604: display element, 2605: interlayer film, 2606: polarizing plate, 2607: polarizing plate, 2608: wiring circuit portion, 2609: flexible wiring board, 2610: cold cathode tube, 2611: reflective plate, 2612: circuit substrate, 2613: diffuser plate, 4001: substrate, 4002: pixel portion, 4003 (4003a, 4003b): signal line driver circuit, 4004: scan line driver circuit, 4005: sealant, 4006: substrate, 4008: liquid crystal layer, 4010: thin film transistor, 4011: thin film transistor, 4013: liquid crystal element, 4015: connection terminal electrode, 4016: terminal electrode, 4018: FPC, 4019: anisotropic conductive film, 4020: insulating layer, 4021: interlayer film, 4030: pixel electrode layer, 4032: polarizing plate, 4034: light-blocking layer, 4036: common electrode layer, 4037a, 4037b: first structure body, 4038a, 4038b: second structure body, 9400: communication device, 9401: housing, 9402: operation button, 9403: external input terminal, 9404: microphone, 9405: speaker, 9406: light-emitting portion, 9410: display device, 9411: housing, 9412: display portion, 9413: operation button, 9600: television set, 9601: housing, 9603: display portion, 9605: stand, 9607: display portion, 9609: operation key, 9610: remote controller, 9700: digital photo frame, 9701: housing, 9703: display portion, 9881: housing, 9882: display portion, 9883: display portion, 9884: speaker portion, 9885: operation key, 9886: recording medium insert portion, 9887: connection terminal, 9888: sensor, 9889: microphone, 9890: LED lamp, 9891: housing, 9893: joint portion, 9900: slot machine, 9901: housing, and 9903: display portion

LIQUID CRYSTAL DISPLAY DEVICE

TECHNICAL FIELD

The present invention relates to a liquid crystal display device and a manufacturing method thereof.

BACKGROUND ART

As a display device which is thin and lightweight (a so-called flat panel display), a liquid crystal display device including a liquid crystal element, a light-emitting device including a self-light-emitting element, a field emission display (an FED), and the like have been competitively developed.

In a liquid crystal display device, response speed of liquid crystal molecules is required to be increased. Among various kinds of display modes of a liquid crystal, a ferroelectric a liquid crystal (FLC) mode, an optical compensated birefringence (OCB) mode, and a mode using a liquid crystal exhibiting a blue phase can be given as liquid crystal modes by which high-speed response is possible.

In particular, the mode using a liquid crystal exhibiting a blue phase does not require an alignment film and the viewing angle can be widened; therefore, further research thereon has been carried out for practical use (for example, see Patent Document 1). Patent Document 1 reports that polymer stabilization treatment is performed on a liquid crystal so that the temperature range where a blue phase is exhibited is increased.

REFERENCE

Patent Document

[Patent Document 1] PCT International Publication No. 05/090520

DISCLOSURE OF INVENTION

In order to achieve high contrast of a liquid crystal display device, white transmittance (light transmittance in white display) needs to be high.

Therefore, it is an object to provide a liquid crystal display device that is suitable for a liquid crystal display mode using a liquid crystal exhibiting a blue phase in order to obtain higher contrast.

A pixel electrode layer and a common electrode layer which are formed over a first substrate (also referred to as an element substrate) and a common electrode layer formed on a second substrate (also referred to as a counter substrate) are fixed to each other by a sealant with a liquid crystal layer interposed between the electrode layers. In a liquid crystal display device which includes a liquid crystal layer exhibiting a blue phase, a method in which the gray scale is controlled by generation of an electric field generally parallel (i.e., in a lateral direction) to a substrate to move liquid crystal molecules in a plane parallel to the substrate can be used. In such a method, an electrode structure used in an in-plane switching (IPS) mode can be employed.

In a lateral electric field mode such as an IPS mode, a first electrode layer (e.g., a pixel electrode layer with which voltage is controlled per pixel) and a second electrode layer (e.g., a common electrode layer with which common voltage is applied to all pixels), which have an opening pattern, are located below a liquid crystal layer. The first electrode layer and the second electrode layer have not a plane shape but various opening patterns including a bent portion or a branching comb-like portion. The first electrode layer and the second electrode layer are arranged so that they do not have the same shape and do not overlap with each other, in order to generate an electric field therebetween.

By application of an electric field between the pixel electrode layer and the common electrode layer, a liquid crystal is controlled. An electric field in a lateral direction is applied to the liquid crystal, so that liquid crystal molecules can be controlled using the electric field. That is, the liquid crystal molecules oriented parallel to the substrate can be controlled in a direction parallel to the substrate; accordingly, the viewing angle can be widened.

In a liquid crystal display device disclosed in this specification, a first substrate (an element substrate) provided with a first electrode layer and a second electrode layer and a second substrate (a counter substrate) are fixed to each other by a sealant with a liquid crystal layer interposed between the substrates, and a first structure body and a second structure body are provided over a first electrode layer (a pixel electrode layer) and a second electrode layer (a common electrode layer), respectively. The first structure body and the second structure body are insulators each having a higher dielectric constant than a liquid crystal material used for the liquid crystal layer, and are provided to project into the liquid crystal layer.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field. Note that in the case where a coloring layer functioning as a color filter, a light-blocking layer functioning as a black matrix, an insulating layer, or the like is formed between the second substrate and the liquid crystal layer, a film which is on the second substrate and is in contact with the liquid crystal layer and each of the first structure body and the second structure body are in contact with each other.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance (light transmittance in black display), can also be increased.

The structure body can be formed using an insulator which uses an insulating material (an organic material or an inorganic material). Since the structure body is formed using a material having a higher dielectric constant than the liquid crystal material, a material having a high dielectric constant is suitable for the structure body, and in particular, a material having a dielectric constant of 12 or more is preferably used. Typically, a visible light curable resin, an ultraviolet curable resin, a thermosetting resin, or a thermoplastic resin is preferably used. For example, an acrylic resin, an epoxy resin, an amine resin, a pullulan derivative, or the like can be used. Alternatively, an organic-inorganic composite material of an inorganic material and an organic material can be used, and for example, an organic-inorganic composite material of barium titanate and the above-described organic resin or the like can be used.

Note that the structure body may have a stacked-layer structure of a plurality of thin films. The structure body can have a columnar shape, a conical or pyramidal shape with a plane top surface and a trapezoidal cross section, a conical or pyramidal shape with a rounded dome top surface, or the like. Note that the structure body may reflect the shape of the first electrode layer or the second electrode layer to have a shape similar to the shape thereof. In order to fill a space between the first substrate and the second substrate with the liquid crystal layer, the structure body is formed to have a shape by which a closed space is not formed in a pixel region. The distance between the first electrode layer and the second electrode layer is preferably 0.2 μm to 10 μm (more preferably, 0.2 μm to 2 μm), and typically, 0.8 μm to 2 μm.

In the case where the first structure body and the second structure body are provided in contact with the second substrate, the first structure body and the second structure body can function as spacers. In that case, the height (the thickness) of the first structure body and that of the second structure body each become substantially the same thickness (so-called cell thickness) as the liquid crystal layer. In the case where the height of the first structure body and that of the second structure body are large, the first structure body and the second structure body may have a stacked-layer structure. In the case where the first structure body and the second structure body are provided in contact with the second substrate and each has a stacked-layer structure, they may be formed in the following manner: structure bodies are provided on each of the first substrate and the second substrate; and the structure bodies are made to be in contact with each other in attaching the first substrate and the second substrate. Note that in the case where a coloring layer functioning as a color filter, a light-blocking layer functioning as a black matrix, an insulating layer, or the like is formed between the second substrate and the liquid crystal layer, a film which is on the second substrate and is in contact with the liquid crystal layer and each of the first structure body and the second structure body are in contact with each other.

The first structure body and the second structure body may be selectively provided over the first electrode layer and the second electrode layer, respectively. For example, in the case where the first electrode layer and the second electrode layer have a complicated shape, the first structure body and the second structure body are selectively provided; thus, injection of the liquid crystal material and the filling with the liquid crystal material become easy, and process time becomes short.

The first structure body and the second structure body can be formed in such a manner that an insulating film is formed so as to cover the first electrode layer and the second electrode layer, and the insulating film is selectively etched. In this etching step, the insulating film between the first electrode layer and the second electrode layer may partially remain instead of being removed completely (a remaining portion is also referred to as a third structure body.)

In this specification, the first electrode layer (the pixel electrode layer) and the second electrode layer (the common electrode layer) each have a comb-like pattern which does not form a closed space and is opened. The first electrode layer and the second electrode layer are not in contact with each other, and they are provided on the same insulating surface (e.g., the same substrate or the same insulating film) such that their comb-like patterns are engaged with each other.

In this specification, a substrate over which a thin film transistor, a first electrode layer (a pixel electrode layer), a second electrode layer (a common electrode layer), and an interlayer film are formed is referred to as an element substrate (a first substrate), and a substrate which is opposite to the element substrate with a liquid crystal layer interposed between the substrates is referred to as a counter substrate (a second substrate).

A liquid crystal material exhibiting a blue phase is used for the liquid crystal layer. The liquid crystal material exhibiting a blue phase has a short response time of 1 msec or less and enables high-speed response, whereby the liquid crystal display device can show high performance.

The liquid crystal material exhibiting a blue phase includes a liquid crystal and a chiral agent. The chiral agent is employed to align the liquid crystal in a helical structure and to make the liquid crystal exhibit a blue phase. For example, a liquid crystal material into which a chiral agent is mixed at 5 wt % or more may be used for the liquid crystal layer.

As the liquid crystal, a thermotropic liquid crystal, a low-molecular liquid crystal, a high-molecular liquid crystal, a ferroelectric liquid crystal, an anti-ferroelectric liquid crystal, or the like is used.

As the chiral agent, a material having a high compatibility with a liquid crystal and a strong twisting power is used. Either an R-enantiomer or an S-enantiomer is used, and a racemic mixture in which an R-enantiomer and an S-enantiomer are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator are reacted. This polymer stabilization treatment may be conducted by light irradiation of a liquid crystal material exhibiting an isotropic phase or by light irradiation of a liquid crystal material exhibiting a blue phase under the control of the temperature. For example, the polymer stabilization treatment is conducted in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C., preferably +5° C. from the phase transition temperature between the blue phase and the isotropic phase. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (with an isotropic phase exhibited). In the case of using an ultraviolet curable resin (a UV curable resin) as the photocurable resin included in the liquid crystal material, the liquid crystal layer may be irradiated with ultraviolet rays. Even in the case where the blue phase is not exhibited, if polymer stabilization treatment is performed by irradiation with light at a temperature within +10° C., preferably +5° C. from the phase transition temperature between the blue phase and the isotropic phase (with an isotropic phase exhibited), the response time can be made as short as 1 msec or less and high-speed response is possible.

One embodiment of the structure of the invention disclosed in this specification includes a first substrate and a second substrate which interpose a liquid crystal layer containing a liquid crystal material exhibiting a blue phase; a first electrode layer and a second electrode layer which are provided between the first substrate and the liquid crystal layer and have an opening pattern; a first structure body which is provided over the first electrode layer and projects into the liquid crystal layer; and a second structure body which is provided over the second electrode layer and projects into the liquid crystal layer. The dielectric constant of the first structure body and the dielectric constant of the second structure body are higher than the dielectric constant of the liquid crystal layer.

Another embodiment of the structure of the invention disclosed in this specification includes a first substrate and a second substrate which interpose a liquid crystal layer containing a liquid crystal material exhibiting a blue phase; a first electrode layer and a second electrode layer which are provided between the first substrate and the liquid crystal layer and have an opening pattern; a first structure body which is provided over the first electrode layer, projects into the liquid crystal layer, and is in contact with the second substrate; and a second structure body which is provided over the second electrode layer, projects into the liquid crystal layer, and is in contact with the second substrate. The dielectric constant of the first structure body and the dielectric constant of the second structure body are higher than the dielectric constant of the liquid crystal layer.

Since a liquid crystal layer exhibiting a blue phase is used, it is not necessary to form an alignment film. Thus, a pixel electrode layer (a first electrode layer) is in contact with a liquid crystal layer, and a second electrode layer (a common electrode layer) is also in contact with the liquid crystal layer.

Note that the ordinal numbers such as "first" and "second" in this specification are used for convenience and do not denote the order of steps and the stacking order of layers. In addition, the ordinal numbers in this specification do not denote particular names which specify the invention.

Note that the semiconductor devices in this specification indicate all the devices that can operate by using semiconductor characteristics, and an electronic optical device, a semiconductor circuit, and an electronic device are all included in the category of the semiconductor devices.

In a liquid crystal display device using a liquid crystal layer exhibiting a blue phase, a contrast ratio can be increased.

BRIEF DESCRIPTION OF DRAWINGS

FIGS. 12A1, 12A2, and 12B are diagrams illustrating liquid crystal display devices.
FIGS. 19A to 19C are graphs each showing a result of calculating an electric field mode of a liquid crystal display device.
FIGS. 21A to 21C are graphs each showing a result of calculating an electric field mode of a liquid crystal display device.
FIGS. 22A to 22C are graphs each showing a result of calculating an electric field mode of a liquid crystal display device.

BEST MODE FOR CARRYING OUT THE INVENTION

Figure 1A:
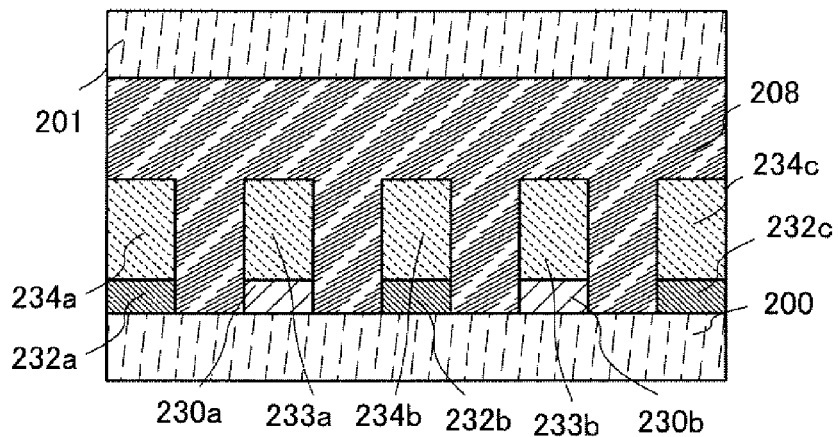
FIGS. 1A to 1C are diagrams each illustrating a liquid crystal display device.

Embodiments of the disclosed invention will be described in detail with reference to the accompanying drawings. Note that the disclosed invention is not limited to the following description, and it is easily understood by those skilled in the art that various changes may be made in modes and details without departing from the spirit and the scope of the disclosed invention. Therefore, the disclosed invention should not be construed as being limited to the description in the following embodiments. Note that in the structures described below, the same portions or portions having similar functions are denoted by the same reference numerals in different drawings, and explanation thereof will not be repeated.

Embodiment 1

A liquid crystal display device will be described with reference to FIGS. 1A to 1C, FIGS. 3A to 3C, FIGS. 18A to 18C, FIGS. 19A to 19C, FIGS. 20A to 20C, FIGS. 21A to 21C, FIGS. 22A to 22C, FIGS. 23A and 23B, and FIGS. 24A to 24C.

FIGS. 1A to 1C, FIGS. 3A to 3C, FIGS. 18A to 18C, FIGS. 19A to 19C, FIGS. 20A to 20C, FIGS. 21A to 21C, FIGS. 22A to 22C, FIGS. 23A and 23B, and FIGS. 24A to 24C are cross-sectional views of liquid crystal display devices.

FIG. 1A illustrates a liquid crystal display device in which a first substrate 200 and a second substrate 201 are arranged so as to face each other with a liquid crystal layer 208 containing a liquid crystal material exhibiting a blue phase interposed between the substrates. Between the first substrate 200 and the liquid crystal layer 208, first electrode layers 230a and 230b which are pixel electrode layers and with which voltage is controlled per pixel, first structure bodies 233a and 233b, second electrode layers 232a, 232b, and 232c which are common electrode layers and with which common voltage is applied to all pixels, and second structure bodies 234a, 234b, and 234c are provided. The first structure bodies 233a and 233b are formed over the first electrode layers 230a and 230b, respectively, and are provided to project into the liquid crystal layer 208. Similarly, the second structure bodies 234a, 234b, and 234e are formed over the second electrode layers 232a, 232b, and 232c, respectively, and are provided to project into the liquid crystal layer 208.

Figure 1B:
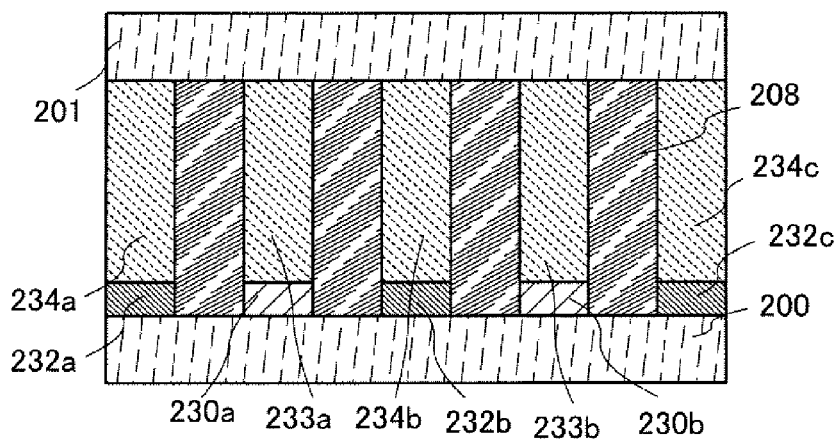
Figure 1C:
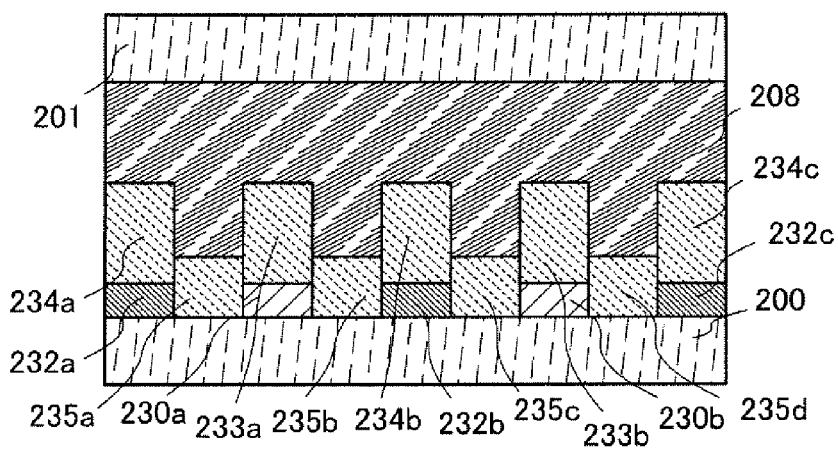

The first electrode layers 230a and 230b and the second electrode layers 232a, 232b, and 232c do not form plane-like shapes but form shapes with opening patterns; therefore, the first electrode layers 230a and 230b and the second electrode layers 232a, 232b, and 232c are illustrated as a plurality of divided electrode layers in the cross-sectional views of FIGS. 1A to 1C.

In a liquid crystal display device which includes the liquid crystal layer 208 exhibiting a blue phase, an electrode structure used in an IPS mode can be applied.

In a lateral electric field mode such as an IPS mode, the first electrode layers 230a and 230b and the second electrode layers 232a, 232b, and 232c, which have opening patterns, are located below the liquid crystal layer 208. The first electrode layers 230a and 230b and the second electrode layers 232a, 232b, and 232c do not form plane-like shapes but form various opening patterns including a bent portion or a branching comb-like portion. The first electrode layers 230a and 230b and the second electrode layers 232a, 232b, and 232c do not overlap with each other, but may have the same shape, in order to generate an electric field between the electrode layers.

The first electrode layers 230a and 230b and the second electrode layers 232a, 232b, and 232c form comb-like patterns which do not form a closed space and are opened. The first electrode layers 230a and 230b and the second electrode layers 232a, 232b, and 232c are not in contact with each other, and are provided on the same insulating surface (e.g., the same substrate or the same insulating film) such that their comb-like patterns are engaged with each other.

By application of an electric field between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c, a liquid crystal is controlled. An electric field in a lateral direction is applied to the liquid crystal, so that liquid crystal molecules can be controlled using the electric field. That is, when the electric field is applied, the liquid crystal molecules are oriented parallel to the substrate so that the liquid crystal molecules can be controlled in a direction parallel to the first substrate 200 and the second substrate 201; therefore, the viewing angle can be widened.

The first structure bodies 233a and 233b and the second structure bodies 234a, 234b, and 234c are insulators having a higher dielectric constant than the liquid crystal material used for the liquid crystal layer 208.

By provision of the first structure bodies 233a and 233b and the second structure bodies 234a, 234b, and 234c, which have a high dielectric constant, in the liquid crystal layer 208, an electric field can be widely formed between the following: between the first electrode layer 230a and the first structure body 233a, and the second electrode layer 232a and the second structure body 234a; between the first electrode layer 230a and the first structure body 233a, and the second electrode layer 232b and the second structure body 234b; between the first electrode layer 230b and the first structure body 233b, and the second electrode layer 232b and the second structure body 234b; and between the first electrode layer 230b and the first structure body 233b, and the second electrode layer 232c and the second structure body 234c, when voltage is applied between the following: between the first electrode layer 230a and the second electrode layer 232a; between the first electrode layer 230a and the second electrode layer 232b; between the first electrode layer 230b and the second electrode layer 232b; and between the first electrode layer 230b and the second electrode layer 232c.

As illustrated in FIG. 1B, the structure bodies formed over the electrode layers may be provided in contact with the substrate opposite to an element substrate. As in the liquid crystal display device of FIG. 1B, the first structure bodies 233a and 233b and the second structure bodies 234a, 234b, and 234c are provided in contact with the second substrate 201 opposite to the element substrate, whereby an electric field can be formed in the entire liquid crystal layer 208, and the liquid crystal molecules can be controlled using the electric field. With use of a material having a higher dielectric constant (preferably, a dielectric constant of 12 or more) for the first structure bodies 233a and 233b and the second structure bodies 234a, 234b, and 234c, a uniform electric field can be widely formed in the liquid crystal layer 208.

Therefore, the liquid crystal molecules in the entire liquid crystal layer 208 including the liquid crystal molecules in a thickness direction can be made to respond and white transmittance can be improved. Thus, a contrast ratio, which is a ratio of white transmittance to black transmittance (light transmittance in black display), can also be increased.

The first structure bodies 233a and 233b and the second structure bodies 234a, 234b, and 234c can be formed using an insulator which uses an insulating material (an organic material or an inorganic material). Since the first structure bodies 233a and 233b and the second structure bodies 234a, 234b, and 234c are each formed using a material having a higher dielectric constant than the liquid crystal material used for the liquid crystal layer 208, a material having a high dielectric constant is suitable for the first structure bodies 233a and 233b and the second structure bodies 234a, 234b, and 234c, and in particular, a material having a dielectric constant of 12 or more is preferably used. Typically, a visible light curable resin, an ultraviolet curable resin, a thermosetting resin, or a thermoplastic resin is preferably used. For example, an acrylic resin, an epoxy resin, an amine resin, a pullulan derivative, or the like can be used. Alternatively, an organic-inorganic composite material of an inorganic material and an organic material can be used, and for example, an organic-inorganic composite material of barium titanate and the above-described organic resin or the like can be used.

Note that the first structure bodies 233a and 233b and the second structure bodies 234a, 234b, and 234c may have a stacked-layer structure of a plurality of thin films. The first structure bodies 233a and 233b and the second structure bodies 234a, 234b, and 234c may have a columnar shape, a conical or pyramidal shape with a plane top surface and a trapezoidal cross section, a conical or pyramidal shape with a rounded dome top surface, or the like. The first structure bodies 233a and 233b and the second structure bodies 234a, 234b, and 234c may reflect the shapes of the first electrode layers 230a and 230b and the second electrode layers 232a, 232b, and 232c, respectively, to have shapes similar to the respective shapes. In order to fill a space between the first substrate and the second substrate with the liquid crystal layer 208, the structure bodies are formed to have shapes by which a closed space is not formed in a pixel region. Note that it is preferable that the distance between the first electrode layer 230a and the second electrode layer 232a, the distance between the first electrode layer 230a and the second electrode layer 232b, the distance between the first electrode layer 230b and the second electrode layer 232b, and the distance between the first electrode layer 230b and the second electrode layer 232c be 0.2 μm to 10 μm (more preferably, 0.2 μm to 2 μm), and typically, each of the distances is preferably 0.8 μm to 2

As illustrated in FIG. 1B, in the case where the first structure bodies 233a and 233b and the second structure bodies 234a, 234b, and 234c are provided in contact with the second substrate 201, the first structure bodies 233a and 233b and the second structure bodies 234a, 234b, and 234e can function as spacers. In that case, the heights (the thicknesses) of the first structure bodies 233a and 233b and the second structure bodies 234a, 234b, and 234c each become substantially the same thickness (so-called cell thickness) as the liquid crystal layer. In the case where the heights of the first structure bodies 233a and 233b and the second structure bodies 234a, 234b, and 234c are large, the first structure bodies 233a and 233b and the second structure bodies 234a, 234b, and 234c may have a stacked-layer structure.

Figure 3A:
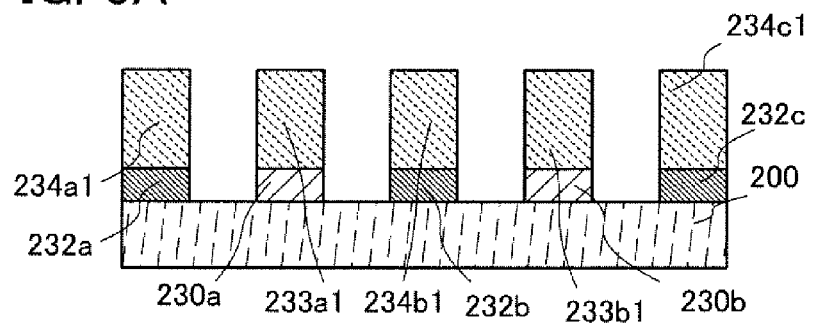
FIGS. 3A to 3C are diagrams illustrating a liquid crystal display device.
Figure 3B:
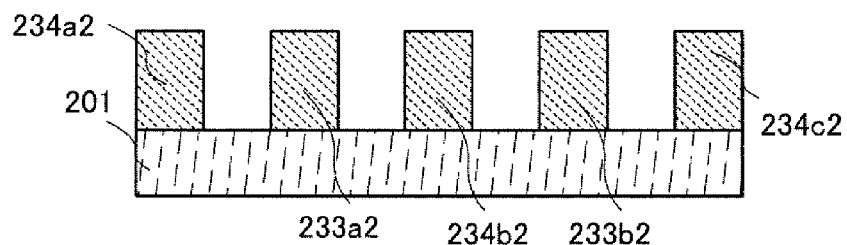
Figure 3C:
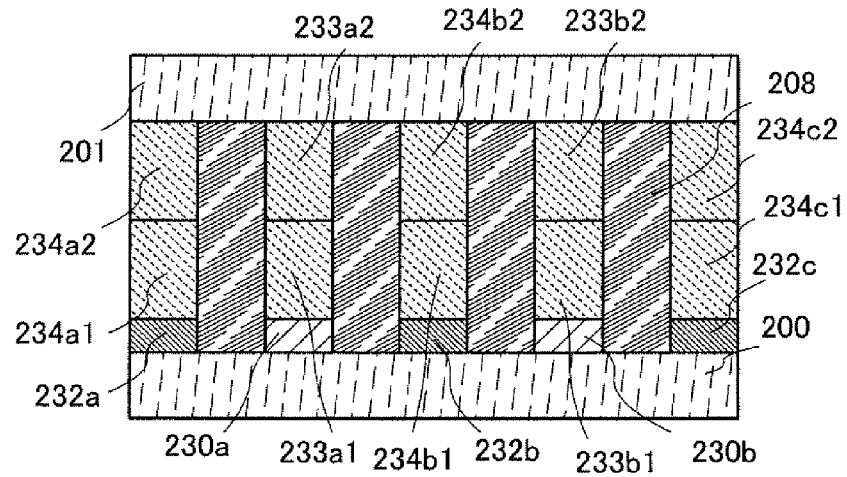

For example, in the case where the first structure bodies 233a and 233b and the second structure bodies 234a, 234b, and 234c are provided in contact with the second substrate 201, as illustrated in FIGS. 3A to 3C, over the first substrate 200, first structure bodies 233a1 and 233b1 are formed over the first electrode layers 230a and 230b, respectively, and second structure bodies 234a1, 234b1, and 234c1 are formed over the second electrode layers 232a, 232b, and 232c, respectively (see FIG. 3A).

On the other hand, over the second substrate 201, first structure bodies 233a2 and 233b2 are formed at positions corresponding to (when the first substrate 200 and the second substrate 201 face each other, overlapping with) the first structure bodies 233a1 and 233b1; similarly, second structure bodies 234a2, 234b2, and 234c2 are formed at positions corresponding to (when the first substrate 200 and the second substrate 201 face each other, overlapping with) the second structure bodies 234a1, 234b1, and 234c1 (see FIG. 3B).

The first substrate 200 and the second substrate 201 are made to face each other such that the corresponding structure bodies are in contact with each other, whereby a stacked layer of the first structure body 233a1 and the first structure body 233a2, a stacked layer of the first structure body 233b1 and the first structure body 233b2, a stacked layer of the second structure body 234a1 and the second structure body 234a2, a stacked layer of the second structure body 234b1 and the second structure body 234b2, and a stacked layer of the second structure body 234c1 and the second structure body 234c2 can be formed (see FIG. 3C).

Figure 5A:
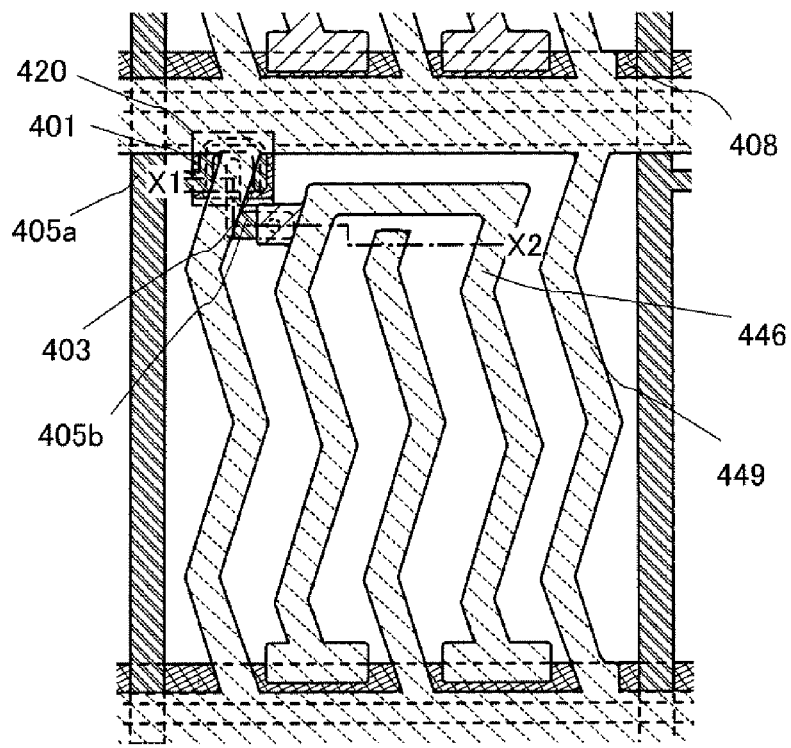
FIGS. 5A and 5B are diagrams illustrating a liquid crystal display device.
Figure 8A:
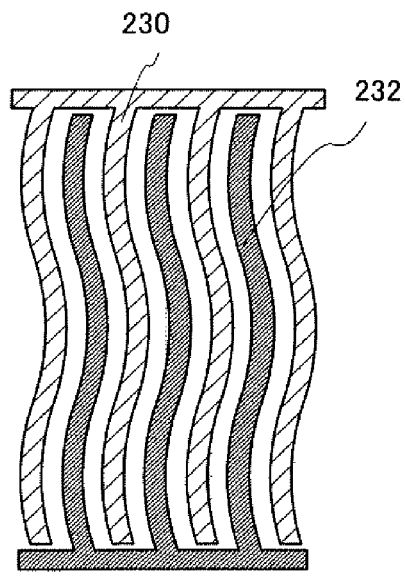
FIGS. 8A to 8C are diagrams illustrating a liquid crystal display device.
Figure 8B:
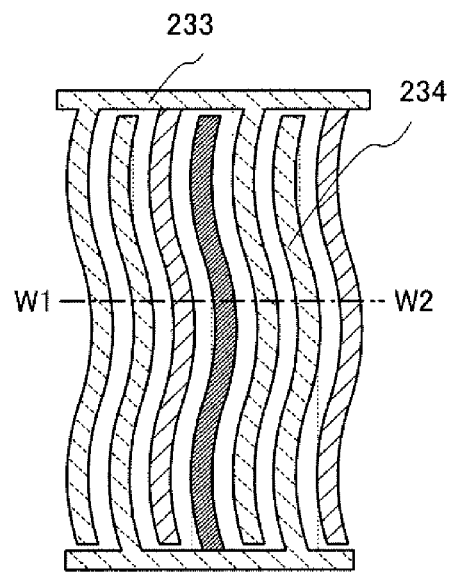
Figure 8C:
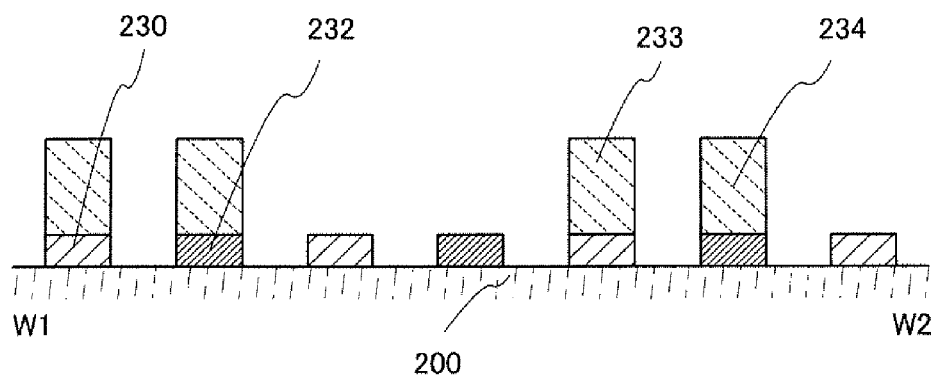

As illustrated in FIGS. 8A to 8C, the first structure body and the second structure body may be selectively provided over the first electrode layer and the second electrode layer, respectively. FIG. 5A is a plan view of a first electrode layer 230 and a second electrode layer 232. The first electrode layer 230 and the second electrode layer 232 are comb-like electrode layers, and are provided such that their comb-like patterns are engaged with each other. FIG. 8B is a plan view in which a first structure body 233 is formed over the first electrode layer 230 and a second structure body 234 is formed over the second electrode layer 232, and FIG. 8C is a cross-sectional view taken along line W1-W2 in FIG. 8B. As illustrated in FIGS. 8B and 8C, the first structure body 233 is selectively provided over the first electrode layer 230, and similarly, the second structure body 234 is selectively provided over the second electrode layer 232. In the case where the first electrode layer 230 and the second electrode layer 232 have a complicated shape, the first structure body 233 and the second structure body 234 are selectively provided; thus, injection of the liquid crystal material and filling with the liquid crystal material become easy, and process time becomes short.

As a method for forming the liquid crystal layer 208, a dispenser method (a dropping method) or an injecting method by which a liquid crystal is injected using a capillary phenomenon after the first substrate 200 is attached to the second substrate 201 can be used.

The first structure body and the second structure body can be formed in such a manner that an insulating film is formed so as to cover the first electrode layer and the second electrode layer, and the insulating film is selectively etched. In this etching step, as in the liquid crystal display device of FIG. 1C, the insulating film between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c may remain as third structure bodies 235a, 235b, 235c, and 235d by being removed partially.

Note that the shape of the first structure body formed over the first electrode layer reflects the shape of the first electrode layer; similarly, the shape of the second structure body formed over the second electrode layer reflects the shape of the second electrode layer. Further, the shape of the first structure body and the shape of the second structure body are also influenced by an etching process method. Examples of the shapes of the first structure body and the second structure body are illustrated in FIGS. 24A to 24C.

Figure 24A:
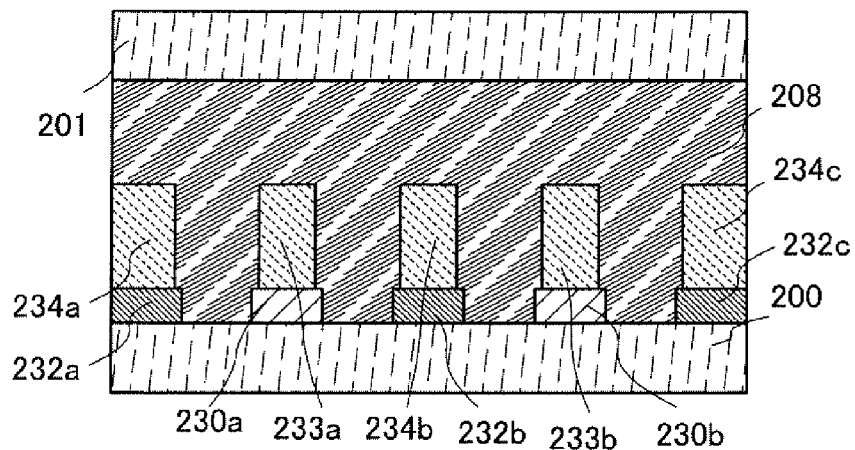
FIGS. 24A to 24C are diagrams each illustrating a liquid crystal display device.

In the example of FIG. 24A, the first electrode layer 230a over which the first structure body 233a is stacked, the first electrode layer 230b over which the first structure body 233b is stacked, the second electrode layer 232a over which the second structure body 234a is stacked, the second electrode layer 232b over which the second structure body 234b is stacked, and the second electrode layer 232c over which the second structure body 234c is stacked have larger areas than the first structure body 233a, the first structure body 233b, the second structure body 234a, the second structure body 234b, and the second structure body 234c, respectively. End portions of the first structure body 233a, those of the first structure body 233b, those of the second structure body 234a, those of the second structure body 234b, and those of the second structure body 234c are provided on the inner sides of end portions of the first electrode layer 230a, those of the first electrode layer 230b, those of the second electrode layer 232a, those of the second electrode layer 232b, and those of the second electrode layer 232c, respectively.

Figure 24B:
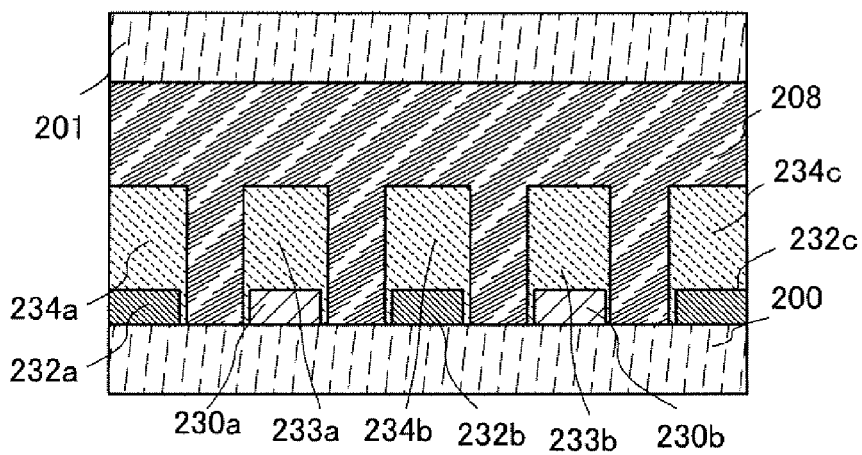

In contrast, in the example of FIG. 24B, the first electrode layer 230a over which the first structure body 233a is stacked, the first electrode layer 230b over which the first structure body 233b is stacked, the second electrode layer 232a over which the second structure body 234a is stacked, the second electrode layer 232b over which the second structure body 234b is stacked, and the second electrode layer 232e over which the second structure body 234c is stacked have smaller areas than the first structure body 233a, the first structure body 233b, the second structure body 234a, the second structure body 234b, and the second structure body 234c, respectively. The end portions of the first structure body 233a, those of the first structure body 233b, those of the second structure body 234a, those of the second structure body 234b, and those of the second structure body 234c are provided on the outer sides of the end portions of the first electrode layer 230a, those of the first electrode layer 230b, those of the second electrode layer 232a, those of the second electrode layer 232b, and those of the second electrode layer 232c, respectively.

Figure 24C:
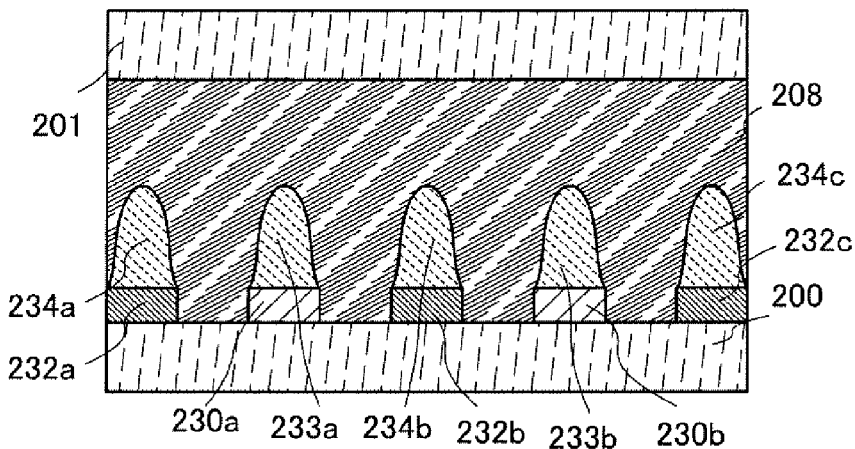

In the example of FIG. 24C, the first structure bodies 233a and 233b, and the second structure bodies 243a, 243b, and 234c each have a conical or pyramidal shape with a rounded dome top surface.

Figure 18A:
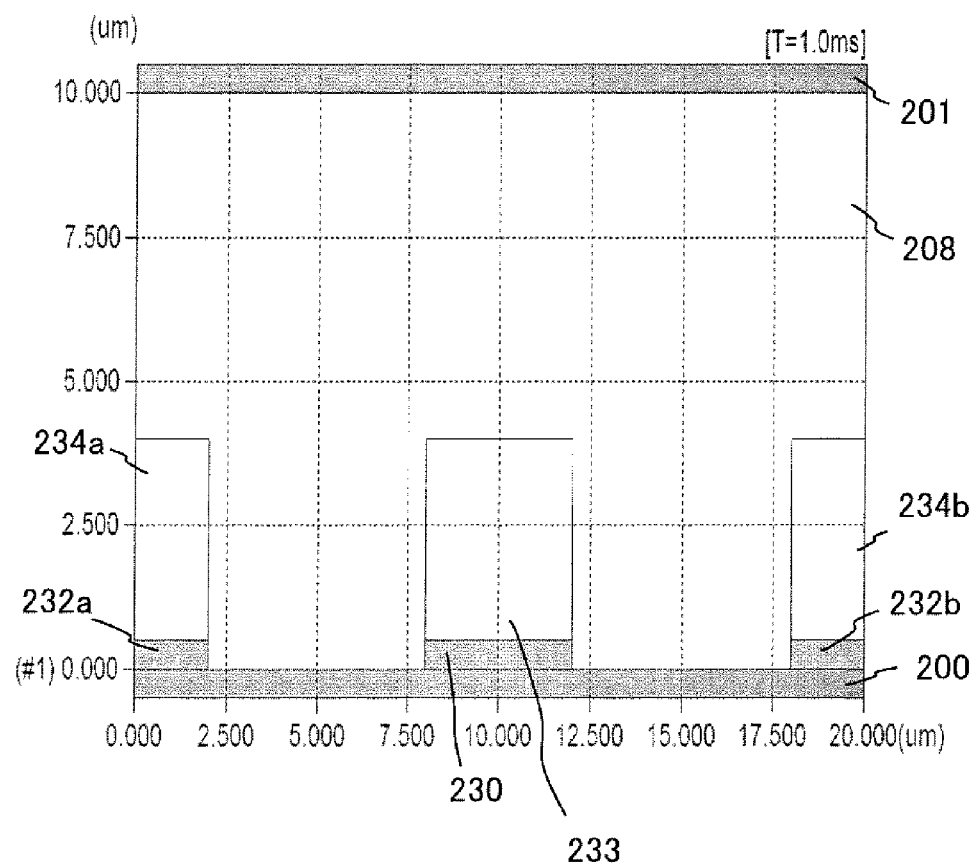
FIGS. 18A to 18C are graphs each showing a result of calculating an electric field mode of a liquid crystal display device.
Figure 18B:
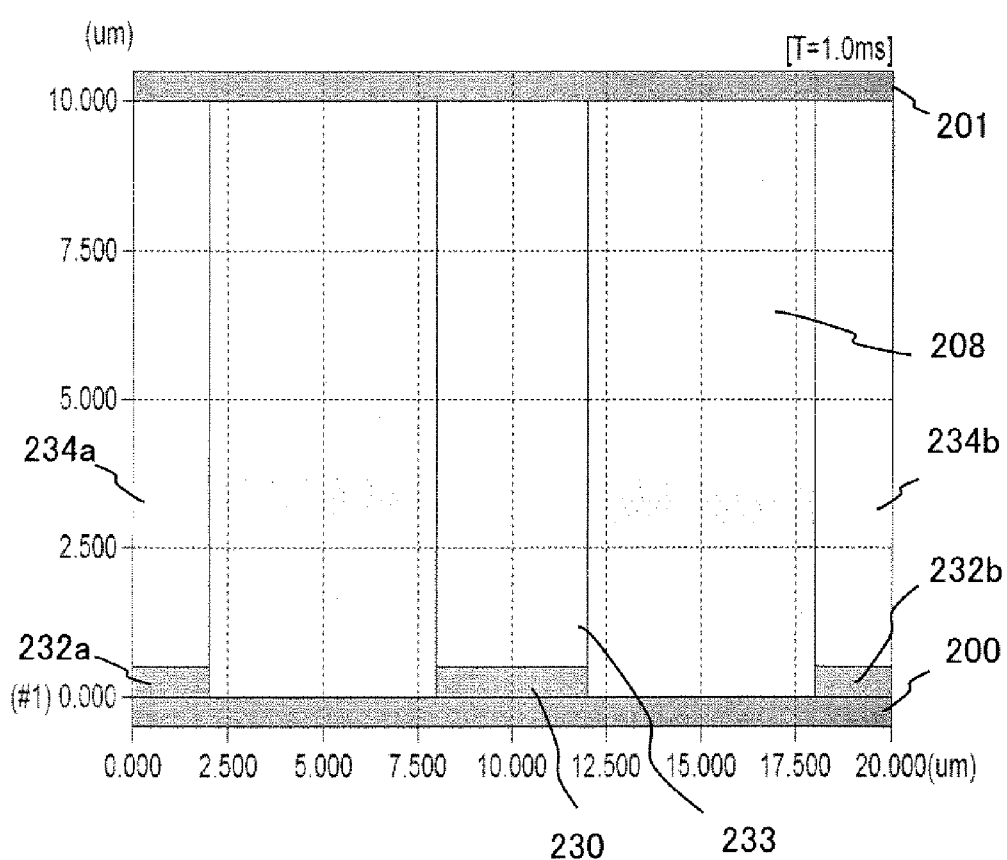
Figure 18C:
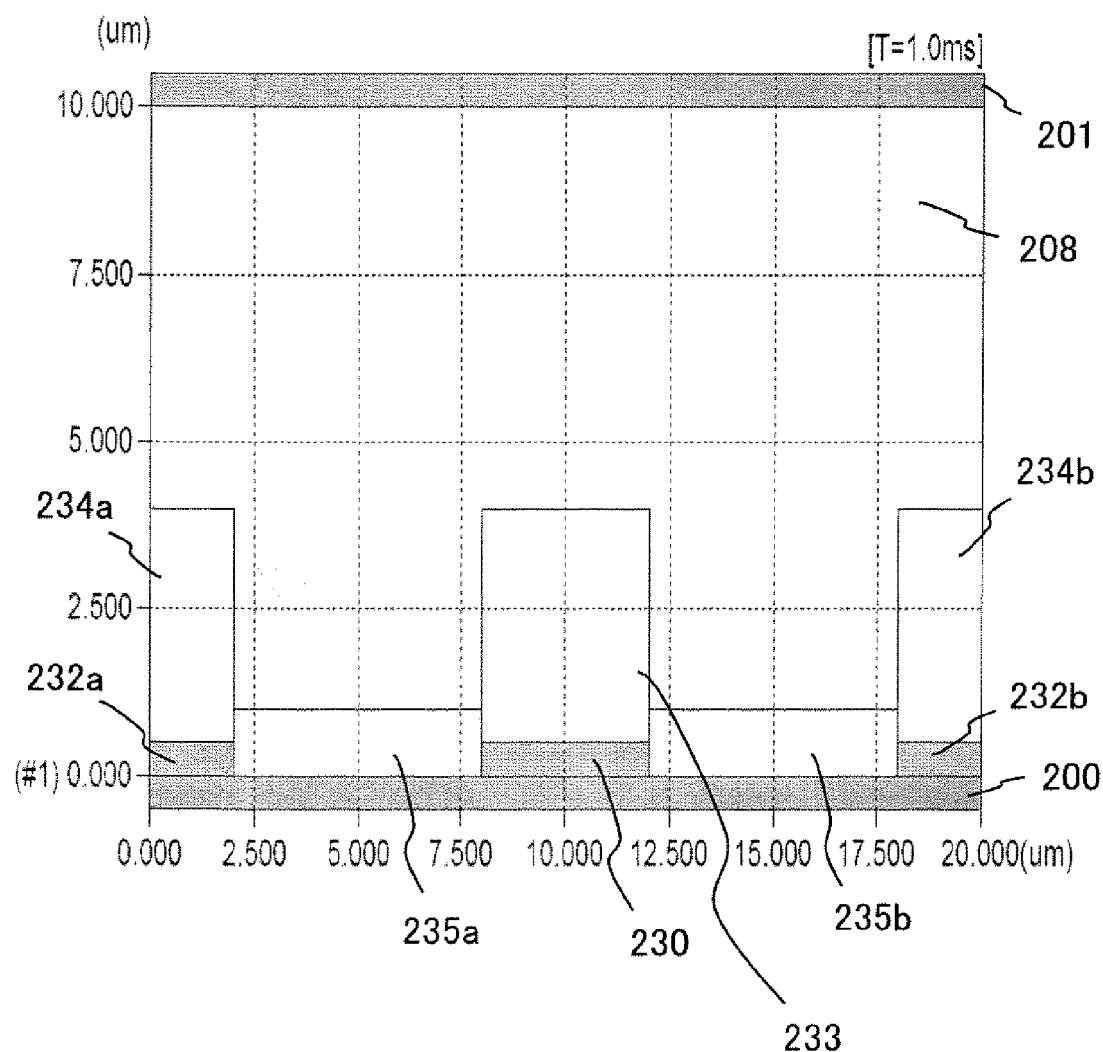
Figure 20A:
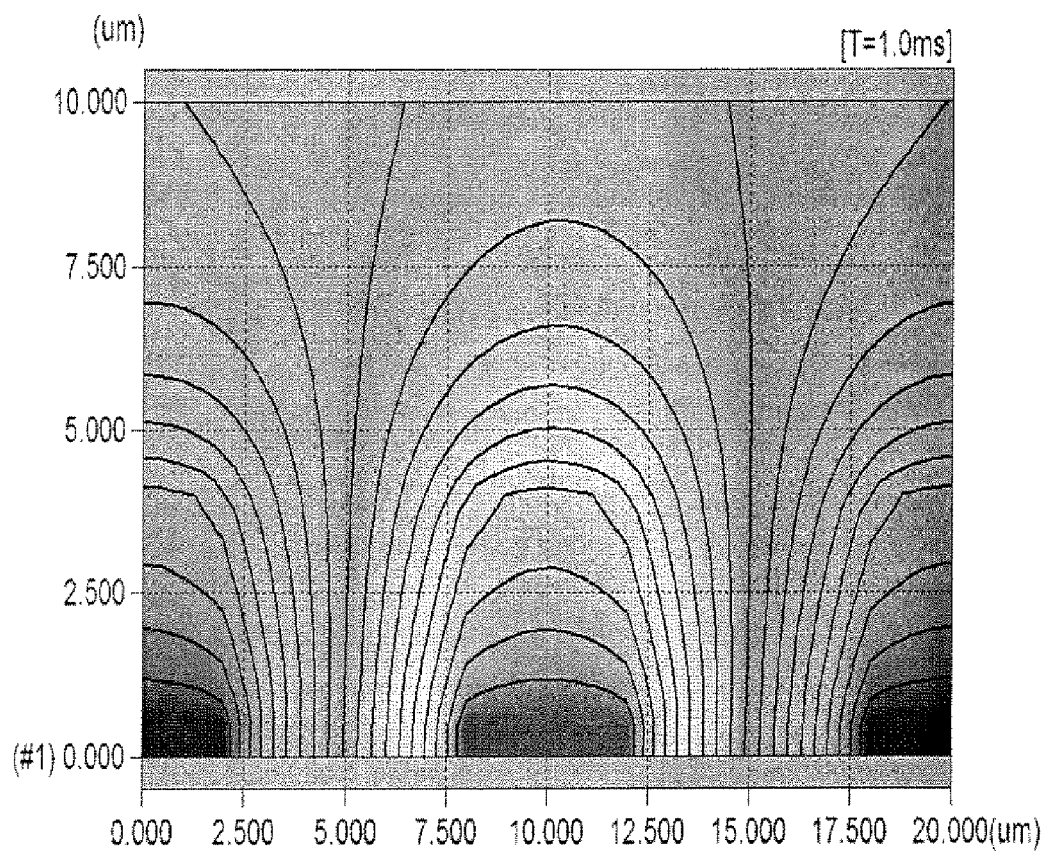
FIGS. 20A to 20C are graphs each showing a result of calculating an electric field mode of a liquid crystal display device.
Figure 20B:
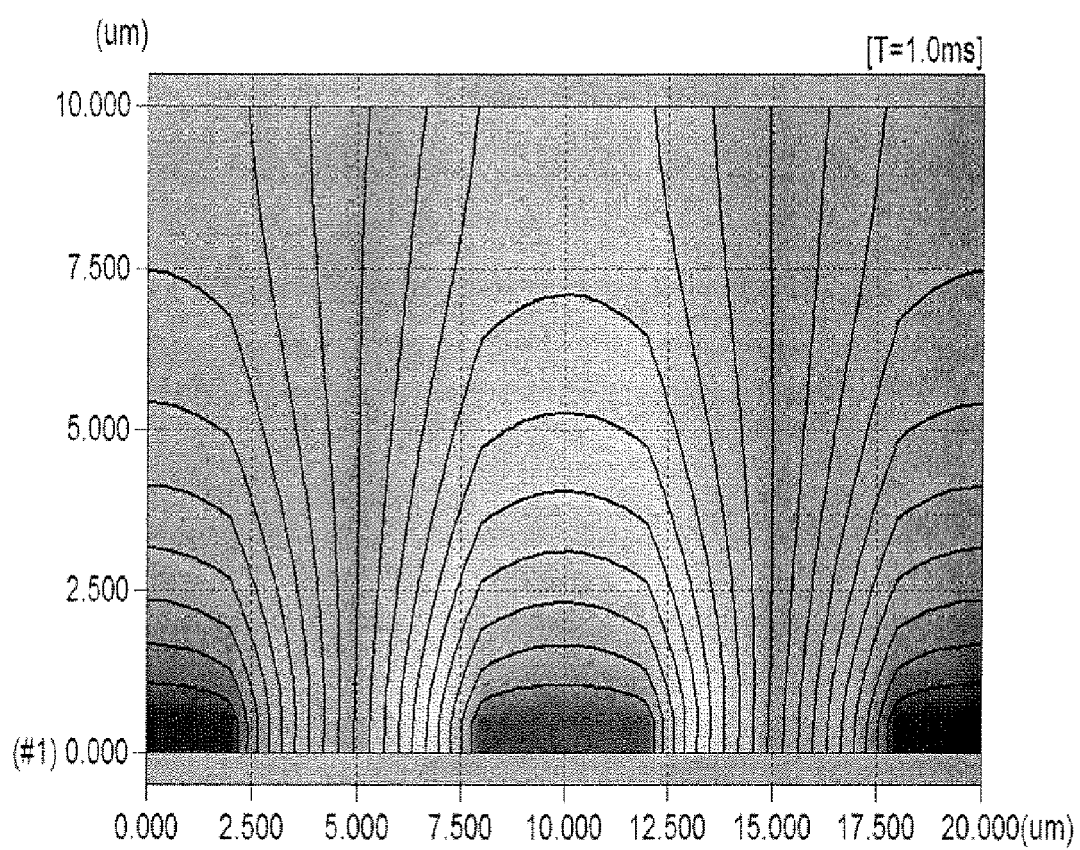
Figure 20C:
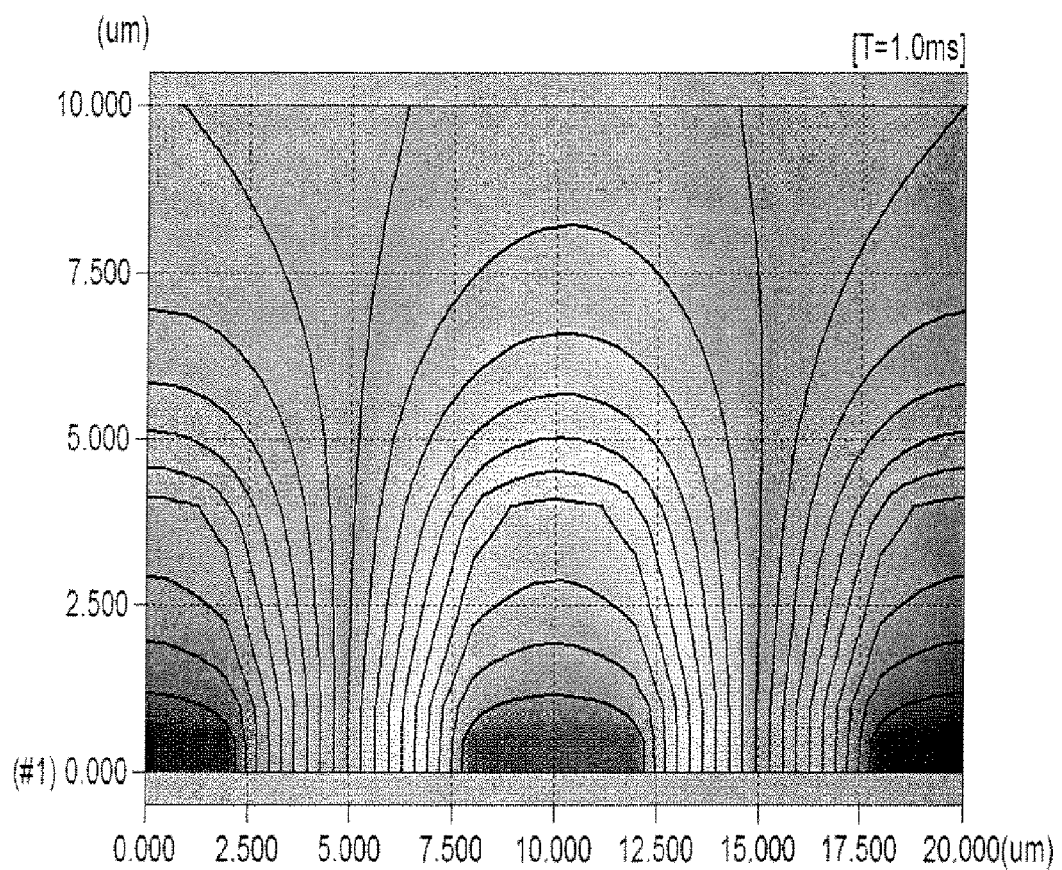
Figure 23A:
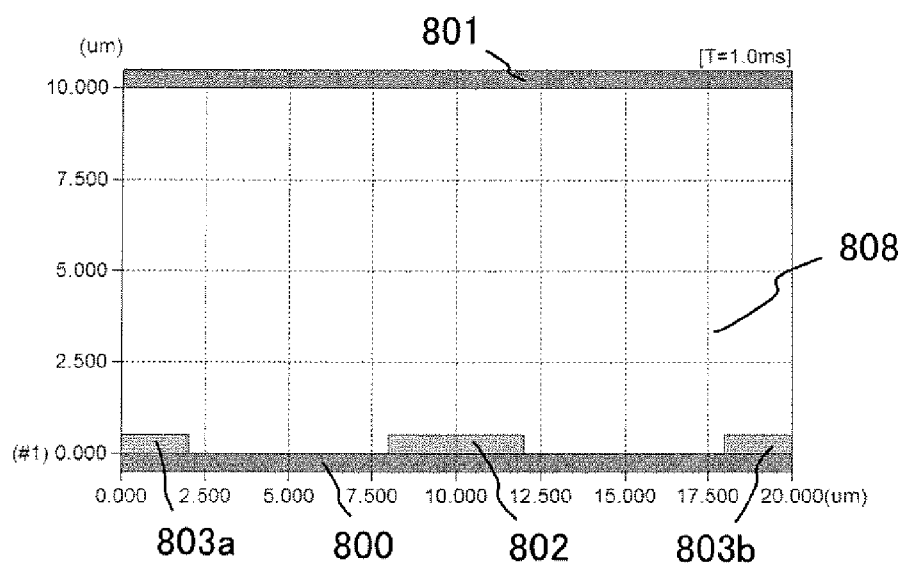
FIGS. 23A and 23B are graphs showing a result of calculating an electric field mode of a liquid crystal display device.
Figure 23B:
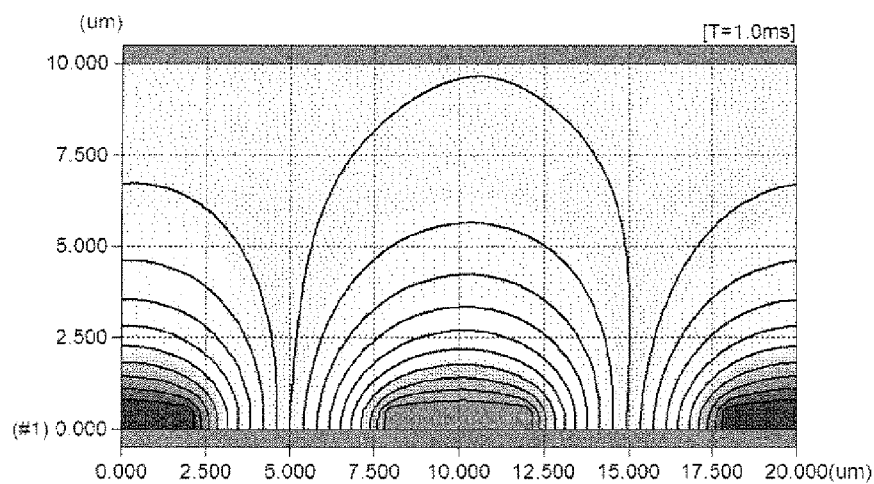

FIGS. 19A to 19C, FIGS. 20A to 20C, FIGS. 21A to 21C, FIGS. 22A to 22C, and FIG. 23B each show a calculation result of an application state of an electric field in the liquid crystal display devices having the structures of FIGS. 18A to 18C. FIGS. 19A to 19C are graphs each showing a structure of a liquid crystal display device used for calculation. FIG. 19A, FIG. 19B, and FIG. 19C correspond to the structure of the liquid crystal display device of FIG. 1A, that of FIG. 1B, and that of FIG. 1C, respectively. FIGS. 23A and 23B are comparative examples. FIG. 23A illustrates a structure of a liquid crystal display device, and FIG. 23B shows a calculation result of an application state of an electric field in the liquid crystal display device. In the example of the liquid crystal display device of FIGS. 23A and 23B, a structure body is not provided, and between a first substrate 800 and a liquid crystal layer 808, a first electrode layer 802 and second electrode layers 803a and 803b are alternately formed, and the liquid crystal display device is sealed by a second substrate 801.

The calculation is performed using LCD Master, 2s Bench manufactured by Shintec Company Limited, and an insulator having a dielectric constant of 12, an insulator having a dielectric constant of 18, an insulator having a dielectric constant of 24, and an insulator having a dielectric constant of 130 are used as the structure bodies (the first structure body 233a, the second structure bodies 234a and 234b, and the third structure bodies) in FIGS. 19A to 19C, FIGS. 20A to 20C, FIGS. 21A to 21C, and FIGS. 22A to 22C, respectively. Moreover, in cross sections, the widths of the first electrode layer 230, the first electrode layer 802, the second electrode layer 232a, the second electrode layer 232b, the second electrode layer 803a, and the second electrode layer 803b are each 4 μm, the thicknesses thereof are each 0.5 μm, the thicknesses of the liquid crystal layers are each 10 μm, and the distances, which are parallel to the substrate, between the following are each 6 μm: between the first electrode layer 230 and the second electrode layer 232a; between the first electrode layer 230 and the second electrode layer 232b; between the first electrode layer 802 and the second electrode layer 803a; and between the first electrode layer 802 and the second electrode layer 803b. Note that the voltage applied to the second electrode layers 232a, 232b, 803a, and 803b is set at 0 V, and the voltage applied to the first electrode layers 230 and 802 is set at 10 V. As for the dielectric constant of the liquid crystal layer, a dielectric constant $\in //$ in a direction parallel to a major axis of the liquid crystal molecule is 8.3, and a dielectric constant $\in$ in a direction perpendicular to the major axis of the liquid crystal molecule is 3.1.

In FIG. 18A, FIG. 19A, FIG. 20A, FIG. 21A, and FIG. 22A, the thicknesses (the heights) of the first structure body 233, the second structure body 234a, and the second structure body 234b are each 3.25 μm. In FIG. 18B, FIG. 19B, FIG. 20B, FIG. 21B, and FIG. 22B, the thicknesses (the heights) of the first structure body 233, the second structure body 234a, and the second structure body 234b are each 9.5 μm. In FIG. 18C, FIG. 19C, FIG. 20C, FIG. 21C, and FIG. 22C, the thicknesses (the heights) of the first structure body 233, the second structure body 234a, and the second structure body 234b are each 3.25 μm, and the thicknesses (the heights) of the third structure body 235a and the third structure body 235b are each 1 μm.

In each of FIGS. 19A to 19C, FIGS. 20A to 20C, FIGS. 21A to 21C, FIGS. 22A to 22C, and FIG. 23B, a solid line shows an equipotential line, and the first electrode layer and the second electrode layer are each arranged in the center of a circular pattern of the equipotential line.

An electric field appears perpendicularly to the equipotential line: thus, it can be confirmed that an electric field is applied between the first electrode layer 230 and the first structure body 233, and the second electrode layer 232a and the second structure body 234a, and between the first electrode layer 230 and the first structure body 233, and the second electrode body 232b and the second structure body 234b, in a lateral direction as shown in FIGS. 19A to 19C, FIGS. 20A to 20C, FIGS. 21A to 21C, and FIGS. 22A to 22C.

In the above-described manner, an electric field can be formed in the entire liquid crystal layer. In particular, in FIG. 19B, FIG. 20B, FIG. 21B, and FIG. 22B, the first structure body 233 and the second structure bodies 234a and 234h are provided in contact with the second substrate 201, so that an electric field can be widely formed in the liquid crystal layer.

It can be confirmed that the higher the dielectric constant of each of the first structure body 233 and the second structure bodies 234a and 234b becomes, the more widely an electric field is formed in the liquid crystal layer.

On the other hand, in FIG. 23B, an equipotential line appears and an electric field is formed in the liquid crystal layer 808 in the proximity of the first substrate 800 over which the first electrode layer 802 and the second electrode layers 803a and 803b are alternately formed; however, a potential line is not distributed and potential difference is not generated as the potential line gets closer to the second substrate 801. Therefore, an electric field is not formed in the liquid crystal layer 808 in the proximity of the second substrate 801, and it can be confirmed that it is difficult to make all liquid crystal molecules in the liquid crystal layer respond when the structure in FIGS. 23A and 23B is employed.

Therefore, by provision of the first structure body and the second structure body, each of which has a dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and the liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance (light transmittance in black display), can also be increased.

A liquid crystal material exhibiting a blue phase is used for the liquid crystal layer 208. The liquid crystal material exhibiting a blue phase has a short response time of 1 msec or less and enables high-speed response, whereby the liquid crystal display device can show high performance.

The liquid crystal material exhibiting a blue phase includes a liquid crystal and a chiral agent. The chiral agent is employed to align the liquid crystal in a helical structure and to make the liquid crystal exhibit a blue phase. For example, a liquid crystal material into which a chiral agent is mixed at 5 wt % or more may be used for the liquid crystal layer.

As the liquid crystal, a thermotropic liquid crystal, a low-molecular liquid crystal, a high-molecular liquid crystal, a ferroelectric liquid crystal, an anti-ferroelectric liquid crystal, or the like is used.

As the chiral agent, a material having a high compatibility with a liquid crystal and a strong twisting power is used. Either an R-enantiomer or an S-enantiomer is used, and a racemic mixture in which an R-enantiomer and an S-enantiomer are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of 500 nm or less. The alignment of the liquid crystal material has a double twist structure. Having the order of less than or equal to a wavelength of visible light, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

The blue phase is exhibited only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator are reacted. This polymer stabilization treatment may be conducted by light irradiation of a liquid crystal material exhibiting an isotropic phase or by light irradiation of a liquid crystal material exhibiting a blue phase under the control of the temperature. For example, the polymer stabilization treatment is conducted in such a manner that the temperature of a liquid crystal layer is controlled and the liquid crystal layer is irradiated with light with a blue phase exhibited. Note that the polymer stabilization treatment is not limited to this manner and may be performed in such a manner that a liquid crystal layer is irradiated with light with an isotropic phase exhibited at a temperature within +10° C., preferably +5° C. from the phase transition temperature between the blue phase and the isotropic phase. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (with an isotropic phase exhibited). In the case of using an ultraviolet curable resin (a UV curable resin) as the photocurable resin included in the liquid crystal material, the liquid crystal layer may be irradiated with ultraviolet rays. Even in the case where the blue phase is not exhibited, if polymer stabilization treatment is performed by irradiation with light at a temperature within +10° C., preferably +5° C. from the phase transition temperature between the blue phase and the isotropic phase (with an isotropic phase exhibited), the response time can be made as short as 1 msec or less and high-speed response is possible.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. For the photocurable resin, a resin to be cured by light with a wavelength with which a photopolymerization initiator to be used is reacted may be selected, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Specifically, as a liquid crystal material, a mixture of JC-1041 XX (manufactured by Chisso Corporation) and 4-cyano-4'-pentylbiphenyl can be used. As a chiral agent, ZLI-4572 (manufactured by Merck Ltd., Japan) can be used. As a photocurable resin, 2-ethylhexyl acrylate, RM257 (manufactured by Merck Ltd., Japan), or trimethylolpropane triacrylate can be used. As a photopolymerization initiator, 2,2-dimethoxy-2-phenylacetophenone can be used.

Although not illustrated in FIGS. 1A to 1C, an optical film such as a polarizing plate, a retardation plate, or an anti-reflection film, or the like is provided as appropriate. For example, circular polarization by the polarizing plate and the retardation plate may be used. In addition, a backlight or the like can be used as a light source.

In the case where, in this specification, the liquid crystal display device is a transmissive liquid crystal display device in which display is performed by transmission of light (or a semi-transmissive liquid crystal display device), it is necessary to transmit light at least in a pixel region. Therefore, the first substrate, the second substrate, and thin films of an insulating film, a conductive film, and the like which are present in the pixel region through which light is transmitted all have a light-transmitting property of visible light.

It is preferable that the first electrode layer (the pixel electrode layer) and the second electrode layer (the common electrode layer) each have a light-transmitting property; however, since an opening pattern is provided, a non-light-transmitting material such as a metal film may be used.

The first electrode layer (the pixel electrode layer) and the second electrode layer (the common electrode layer) may be formed using any one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organic indium, organotin, indium oxide containing tungsten oxide, indium zinc oxide containing tungsten oxide, indium oxide containing titanium oxide, and indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

As the first substrate 200 and the second substrate 201, a glass substrate made of barium borosilicate glass, aluminoborosilicate glass, or the like, a quartz substrate, a plastic substrate, or the like can be used.

In the above-described manner, in the liquid crystal display device using the liquid crystal layer exhibiting a blue phase, a contrast ratio can be increased.

Embodiment 2

In this embodiment, as one embodiment of the invention disclosed in this specification, an example of an active matrix liquid crystal display device will be described with reference to FIGS. 2A and 2B and FIGS. 7A to 7D.

Figure 2A:
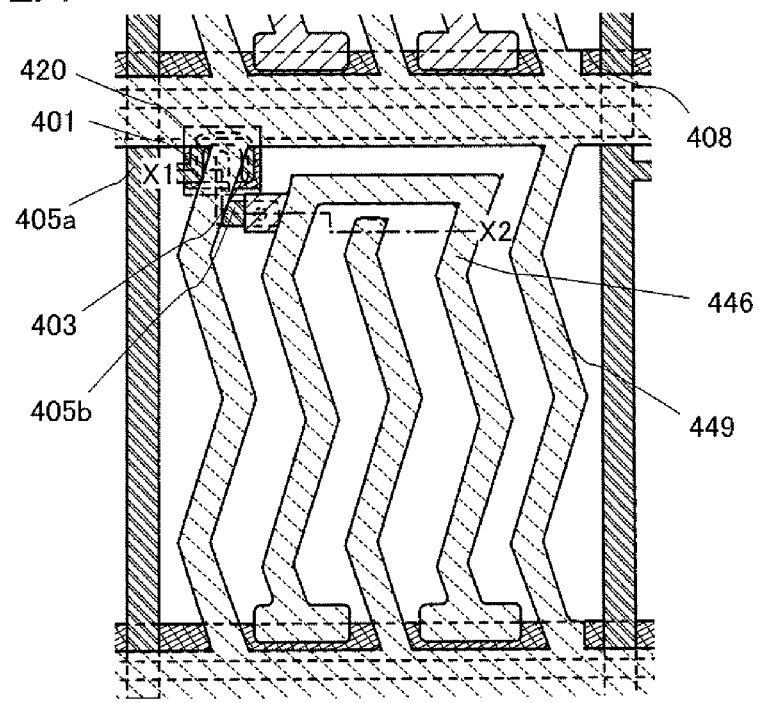
FIGS. 2A and 2B are diagrams illustrating a liquid crystal display device.
Figure 2B:
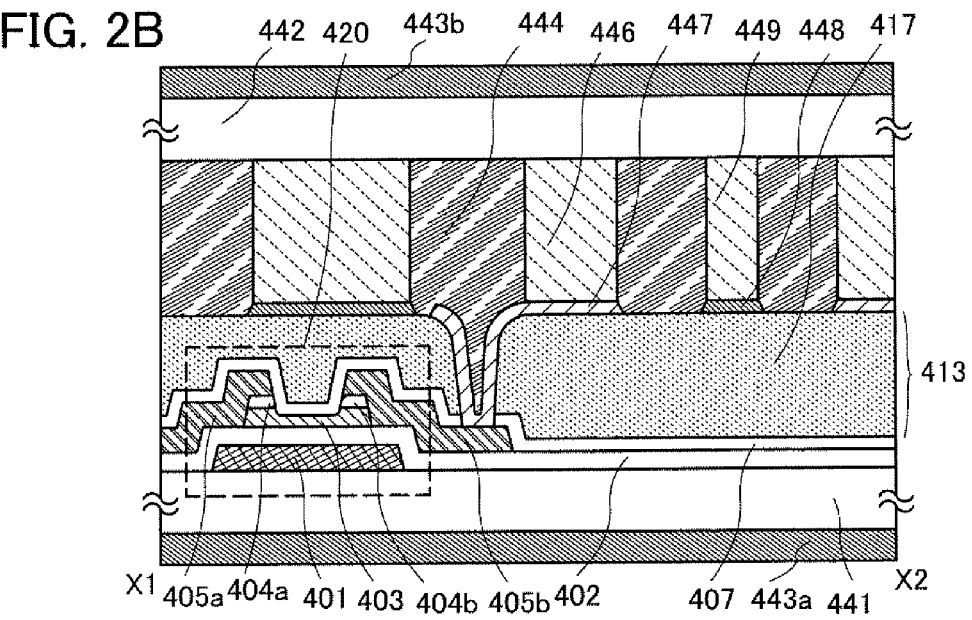

FIG. 2A is a plan view of a liquid crystal display device and illustrates one pixel. FIG. 2B is a cross-sectional view taken along line X1-X2 in FIG. 2A.

In FIG. 2A, a plurality of source wiring layers (including a wiring layer 405a) are provided in parallel to each other (extended in a vertical direction in the drawing) and apart from each other. A plurality of gate wiring layers (including a gate electrode layer 401) are provided apart from each other and extend in a direction generally perpendicular to the source wiring layers (a horizontal direction in the drawing). Capacitor wiring layers 408 are provided adjacent to the plurality of gate wiring layers and extend in a direction generally parallel to the gate wiring layers, that is, in a direction generally perpendicular to the source wiring layers (a horizontal direction in the drawing). Roughly rectangular spaces are surrounded by the source wiring layers, the capacitor wiring layers 408, and the gate wiring layers, and a pixel electrode layer and a common electrode layer of the liquid crystal display device are provided in these spaces with a liquid crystal layer 444 interposed therebetween. In this space, a pixel electrode layer and a common electrode layer of the liquid crystal display device are arranged with the liquid crystal layer 444 interposed therebetween. A thin film transistor 420 for driving the pixel electrode layer is provided at the upper left corner in the drawing. A plurality of pixel electrode layers and thin film transistors are provided in matrix.

In the liquid crystal display device in FIGS. 2A and 2B, a first electrode layer 447 which is electrically connected to the thin film transistor 420 functions as the pixel electrode layer, and a second electrode layer 448 functions as the common electrode layer. Note that a capacitor is formed by the first electrode layer 447 and the capacitor wiring layer 408. Although the common electrode layer can operate in a floating state (an electrically isolated state), the potential of the common electrode layer may be set to a fixed potential, preferably to a potential around a common potential (an intermediate potential of an image signal which is transmitted as data) in such a level as not to generate flickers.

In the space, the pixel electrode layer and the common electrode layer of the liquid crystal display device are provided. A first structure body 446 is provided over the first electrode layer 447 which is the pixel electrode layer, and a second structure body 449 is provided over the second electrode layer 448 which is the common electrode layer. The first structure body 446 and the second structure body 449 project into the liquid crystal layer 444.

The first electrode layer 447 which is the pixel electrode and the second electrode layer 448 which is the common electrode layer have opening patterns and are arranged below the liquid crystal layer 444. The first electrode layer 447 and the second electrode layer 448 are each formed to have a comb-like pattern which does not form a closed space and is opened. In order to generate an electric field between the first electrode layer 447 and the second electrode layer 448, they are provided not in contact with each other and are provided on the same insulating surface (a light-transmitting resin layer 417 in FIG. 2B) such that their comb-like patterns are engaged with each other.

The first structure body 446 and the second structure body 449 are insulators having a higher dielectric constant than a liquid crystal material used for the liquid crystal layer 444.

By provision of the first structure body 446 and the second structure body 449, each of which has a high dielectric constant, in the liquid crystal layer 444, an electric field can be widely formed between the first electrode layer 447 and the first structure body 446, and the second electrode layer 448 and the second structure body 449 when voltage is applied between the first electrode layer 447 and the second electrode layer 448.

As in the liquid crystal display device of FIGS. 2A and 2B in this embodiment, the structure body formed over the electrode layer may be provided in contact with the substrate opposite to the element substrate. As in this embodiment, the first structure body 446 and the second structure body 449 are provided in contact with the second substrate 442 opposite to a first substrate 441, whereby an electric field can be formed in the entire liquid crystal layer 444, and the liquid crystal molecules can be controlled using the electric field. With use of a material having a higher dielectric constant (preferably, a dielectric constant of 12 or more) for the first structure body 446 and the second structure body 449, a uniform electric field can be widely fainted in the liquid crystal layer 444.

Note that in the case where a coloring layer functioning as a color filter, a light-blocking layer functioning as a black matrix, an insulating layer, or the like is formed between the second substrate 442 and the liquid crystal layer 444, a film which is in contact with the liquid crystal layer 444 on the second substrate 442 and each of the first structure body 446 and the second structure body 449 are in contact with each other.

Therefore, the liquid crystal molecules in the entire liquid crystal layer 444 including the liquid crystal molecules in a thickness direction can be made to respond and white transmittance can be improved. Thus, a contrast ratio, which is a ratio of white transmittance to black transmittance (light transmittance in black display), can also be increased.

The first structure body 446 and the second structure body 449 each can be formed using an insulator which uses an insulating material (an organic material or an inorganic material). Since the first structure body 446 and the second structure body 449 are each formed using a material having a higher dielectric constant than the liquid crystal material, a material having a high dielectric constant is suitable for the structure bodies, and in particular, a material having a dielectric constant of 12 or more is preferably used. Typically, a visible light curable resin, an ultraviolet curable resin, a thermosetting resin, or a thermoplastic resin is preferably used. For example, an acrylic resin, an epoxy resin, an amine resin, a pullulan derivative, or the like can be used. Alternatively, an organic-inorganic composite material of an inorganic material and an organic material can be used, and for example, an organic-inorganic composite material of barium titanate and the above-described organic resin or the like can be used.

The method for forming the first structure body 446 and the second structure body 449 is not particularly limited, and a dry method such as evaporation, sputtering, or CVD or a wet method such as spin coating, dip coating, spray coating, droplet discharging (ink jetting), nanoimprinting, or various printing methods (screen printing or offset printing) may be used depending on the material. As needed, an etching method (dry etching or wet etching) may be employed to form a desired pattern.

Note that the first structure body 446 and the second structure body 449 may have a stacked-layer structure of a plurality of thin films. The first structure body 446 and the second structure body 449 may have a columnar shape, a conical or pyramidal shape with a plane top surface and a trapezoidal cross section, a conical or pyramidal shape with a rounded dome top surface, or the like. The first structure body 446 and the second structure body 449 may reflect the shapes of the first electrode layer 447 and the second electrode layer 448, respectively, to have shapes similar to the respective shapes. In order to fill a space between the first substrate and the second substrate with the liquid crystal layer 208, the structure bodies are formed to have shapes by which a closed space is not formed in a pixel region. Note that it is preferable that the distance between the first electrode layer 447 and the second electrode layer 448 be 0.2 μm to 10 μm (more preferably, 0.2 μm to 2 μm), and typically, the distance is preferably 0.8 μm to 2 μm.

In the case where the first structure body 446 and the second structure body 449 are provided in contact with the second substrate 442, the first structure body 446 and the second structure body 449 can function as spacers. In that case, the heights (the thicknesses) of the first structure body 446 and the second structure body 449 each become substantially the same thickness (so-called cell thickness) as the liquid crystal layer 444. In the case where the heights of the first structure body 446 and the second structure body 449 are large, the first structure body 446 and the second structure body 449 may have a stacked-layer structure. In the case where the first structure body 446 and the second structure body 449 are provided in contact with the second substrate 442 and each has a stacked-layer structure, they may be provided in the following manner: part of the first structure body 446 and part of the second structure body 449 are each formed over the first substrate 441 and the second substrate 442; and the parts of the first structure body 446 are made to be in contact with each other and the parts of the second structure body 449 are made to be in contact with each other in attaching the first substrate 441 and the second substrate 442.

The first structure body 446 and the second structure body 449 may be selectively provided over the first electrode layer 447 and the second electrode layer 448, respectively. For example, in the case where the first electrode layer 447 and the second electrode layer 448 have a complicated shape, the first structure body 446 and the second structure body 449 are selectively provided; thus, injection of a liquid crystal material and the filling with the liquid crystal material become easy, and process time becomes short.

The first structure body 446 and the second structure body 449 can be formed in such a manner that an insulating film is formed so as to cover the first electrode layer 447 and the second electrode layer 448, and the insulating film is selectively etched. In this etching step, the insulating film between the first electrode layer 447 and the second electrode layer 448 may remain by being removed partially (a remaining portion is also referred to as a third structure body).

The thin film transistor 420 is an inverted staggered thin film transistor which includes, over the first substrate 441 having an insulating surface, the gate electrode layer 401, a gate insulating layer 402, a semiconductor layer 403, $n^+$ layers 404$a$ and 404$b$ serving as source and drain regions, and the wiring layers 405$a$ and 405$b$ serving as source and drain electrode layers. The $n^+$ layers 404$a$ and 404$b$ are semiconductor layers having lower resistance than the semiconductor layer 403.

An insulating film 407 which covers the thin film transistor 420 and is in contact with the semiconductor layer 403 is provided. An interlayer film 413 is provided over the insulating film 407, the first electrode layer 447 is formed over the interlayer film 413, and the second electrode layer 448 is formed with the liquid crystal layer 444 interposed between the electrode layers.

The liquid crystal display device can be provided with a coloring layer which functions as a color filter layer. The color filter layer may be provided on the outer side (a side opposite to the liquid crystal layer 444) of the first substrate 441 and the second substrate 442, or may be provided on the inner side of the first substrate 441 and the second substrate 442.

When full-color display is performed in the liquid crystal display device, the color filter may be formed of materials exhibiting red (R), green (G), and blue (B). When monochrome display is performed, the coloring layer may be omitted or formed using a material exhibiting at least one color. Note that the color filter is not always provided in the case where light-emitting diodes (LEDs) of RGB or the like are arranged in a backlight unit and a successive additive color mixing method (a field sequential method) in which color display is performed by time division is employed.

The liquid crystal display device in FIGS. 2A and 2B is an example in which the light-transmitting chromatic-color resin layer 417 functioning as the color filter layer is used for the interlayer film 413.

In the case of providing a color filter layer on the counter substrate side, precise positional alignment of a pixel region with an element substrate over which a thin film transistor is formed is difficult and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

As the light-transmitting chromatic-color resin layer, a photosensitive or non-photosensitive organic resin can be used. Use of the photosensitive organic resin layer makes it possible to reduce the number of resist masks; thus, the steps are simplified, which is preferable. In addition, since a contact hole formed in the interlayer film has an opening shape with a curvature, coverage with a film such as an electrode layer formed in the contact hole can be improved.

Chromatic colors are colors except achromatic colors such as black, gray, and white. The coloring layer is formed using a material which transmits only chromatic color light in order to function as the color filter. As a chromatic color, red, green, blue, or the like can be used. Alternatively, cyan, magenta, yellow, or the like may also be used. "Transmitting only the chromatic color light" means that light transmitted through the coloring layer has a peak at the wavelength of the chromatic color light.

The thickness of the light-transmitting chromatic-color resin layer 417 is preferably controlled as appropriate in consideration of a relation between the concentration of the coloring material to be contained and light transmittance, in order to make the light-transmitting chromatic-color resin layer 417 function as a coloring layer (a color filter layer). In the case where the interlayer film 413 is formed of a plurality of thin films, at least one layer thereof needs to be a light-transmitting chromatic-color resin layer so that the interlayer film 413 can function as a color filter.

In the case where the thickness of the light-transmitting chromatic-color resin layer differs depending on the chromatic colors or in the case where there is surface unevenness due to a light-blocking layer or the thin film transistor, an insulating layer which transmits light in a visible wavelength range (so-called colorless and transparent insulating layer) may be stacked for planarization of the surface of the interlayer film. Improvement in planarization of the interlayer film allows favorable coverage with the first electrode layer (the pixel electrode layer) or the second electrode layer (the common electrode layer) to be formed thereover and uniform gap (thickness) of the liquid crystal layer, whereby the visibility of the liquid crystal display device is increased and higher image quality can be achieved.

There is no particular limitation on the method for forming the interlayer film 413 (the light-transmitting chromatic-resin layer 417), and the interlayer film 413 can be formed, depending on the material, by a method such as spin coating, dipping, spray coating, or droplet discharging (e.g., ink-jet, screen printing, or offset printing), or with a tool (equipment) such as a doctor knife, a roll coater, a curtain coater, or a knife coater.

The liquid crystal layer 444 is provided over the first electrode layer 447 and the second electrode layer 448 and sealed with the second substrate 442 which functions as a counter substrate.

The first substrate 441 and the second substrate 442 are light-transmitting substrates and are provided with a polarizing plate 443a and a polarizing plate 443b respectively on their outer sides (the sides opposite to the liquid crystal layer 444).

Manufacturing steps of the liquid crystal display device illustrated in FIGS. 2A and 2B are described with reference to FIGS. 7A to 7D. FIGS. 7A to 7D are cross-sectional views illustrating the manufacturing steps of the liquid crystal display device. Note that in FIGS. 7A to 7D, the first electrode layer, the second electrode layer, the first structure body, and the second structure body are omitted. The first electrode layer, the second electrode layer, the first structure body, and the second structure body can have the structures illustrated in FIGS. 2A and 2B, and a lateral electric field mode which is generated between the first electrode layer and the first structure body, and the second electrode layer and the second structure body in the liquid crystal layer can be employed.

Figure 7A:
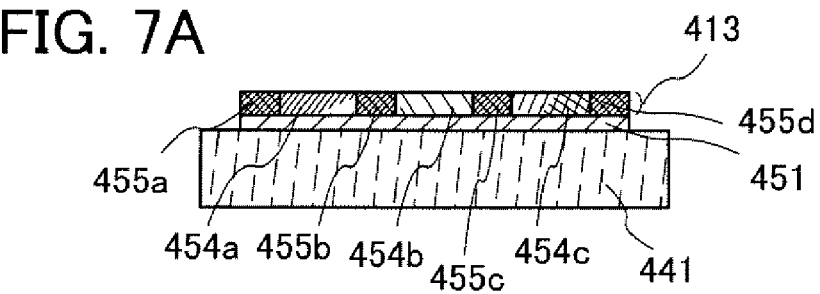
FIGS. 7A to 7D are diagrams illustrating a method for manufacturing a liquid crystal display device.

In FIG. 7A, an element layer 451 is formed over the first substrate 441 which is an element substrate, and the interlayer film 413 is formed over the element layer 451.

The interlayer film 413 includes light-transmitting chromatic-color resin layers 454a, 454b, and 454c and light-blocking layers 455a, 455b, 455c, and 455d, and has a structure in which the chromatic-color light-transmitting resin layers 454a, 454b, and 454c are provided between the light-blocking layers 455a and 455b, between the light-blocking layers 455b and 455c, and between the light-blocking layers 455c and 455d, respectively. Note that in FIGS. 7A to 7D, the first electrode layer, the second electrode layer, the first structure body, and the second structure body are omitted.

Figure 7B:
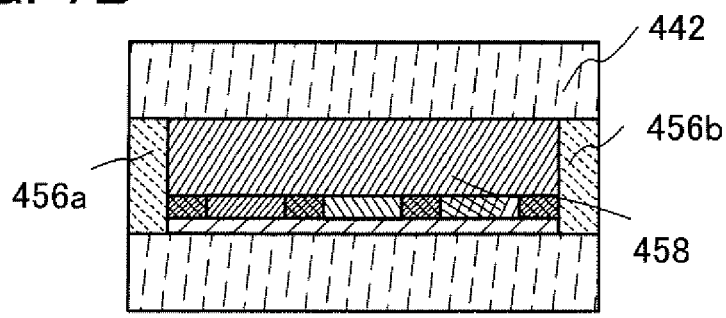

As illustrated in FIG. 7B, the first substrate 441 and the second substrate 442 which is a counter substrate are firmly fixed to each other by sealants 456a and 456b with a liquid crystal layer 458 interposed between the substrates. The liquid crystal layer 458 can be formed by a dispenser method (a dropping method), or an injecting method by which a liquid crystal is injected using a capillary phenomenon after the first substrate 441 and the second substrate 442 are attached to each other.

A liquid crystal material exhibiting a blue phase can be used for the liquid crystal layer 458. The liquid crystal layer 458 is formed using a liquid crystal material including a liquid crystal, a chiral agent, a photocurable resin, and a photopolymerization initiator.

As the sealants 456a and 456b, typically, a visible light curable resin, an ultraviolet curable resin, or a thermosetting resin is preferably used. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealants 456a and 456b.

Figure 7C:
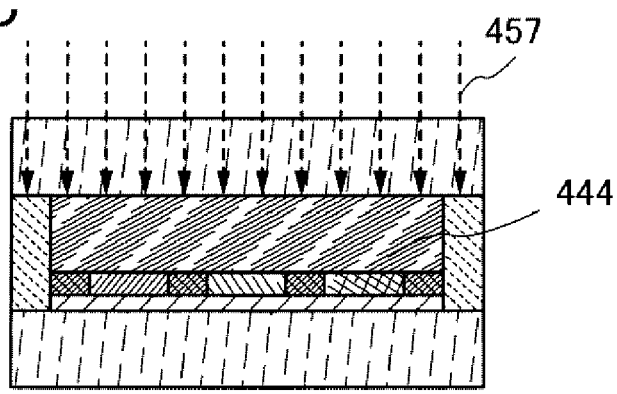

As illustrated in FIG. 7C, polymer stabilization treatment is performed on the liquid crystal layer 458 by irradiation with light 457, so that the liquid crystal layer 444 is formed. The light 457 has a wavelength with which the photocurable resin and the photopolymerization initiator included in the liquid crystal layer 458 react. By this polymer stabilization treatment with light irradiation, the temperature range in which the liquid crystal layer 444 exhibits a blue phase can be widened.

In the case where a photocurable resin such as an ultraviolet curable resin is used as a sealant and a liquid crystal layer is formed by a dropping method, for example, the sealant may be cured by the light irradiation step of the polymer stabilization treatment.

When a liquid crystal display device has a structure in which a color filter layer and a light-blocking layer are formed over an element substrate as illustrated in FIGS. 7A to 7D, irradiation light from the counter substrate side is not absorbed or blocked by the color filter layer and the light-blocking layer; accordingly, the entire region of the liquid crystal layer can be uniformly irradiated with the light. Thus, alignment disorder of a liquid crystal due to nonuniform photopolymerization, display unevenness due to the alignment disorder, and the like can be prevented. Further, a thin film transistor can also be shielded from light by the light-blocking layer, whereby defects in electric characteristics due to the light irradiation can be prevented.

Figure 7D:
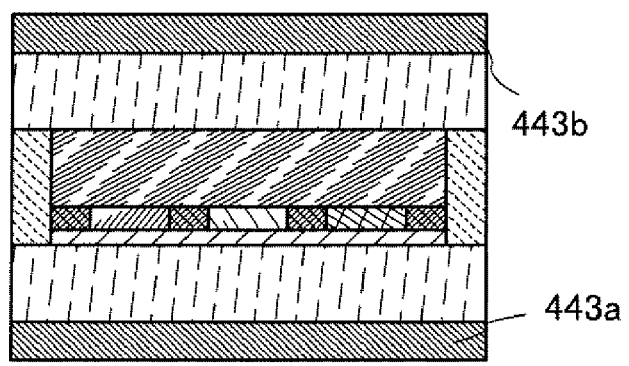

As illustrated in FIG. 7D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the second substrate 442. In addition to the polarizing plate, an optical film such as a retardation plate or an anti-reflection film may be provided. For example, circular polarization by the polarizing plate and the retardation plate may be used. Through the above-described steps, a liquid crystal display device can be completed.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 441, which is an element substrate, so as to pass through the second substrate 442 on the viewing side.

The first electrode layer 447 and the second electrode layer 448 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

The first electrode layer 447 and the second electrode layer 448 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also referred to as a conductive polymer) can be used to form the first electrode layer 447 and the second electrode layer 448. The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

An insulating film serving as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film. The gate electrode layer 401 can be formed to have a single-layer structure or a stacked-layer structure using a metal material such as molybdenum, titanium, chromium, tantalum, tungsten, aluminum, copper, neodymium, or scandium, or an alloy material which contains any of these materials as its main component. By use of a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, a stacked-layer structure of a tungsten layer or a tungsten nitride layer, a layer of an alloy of aluminum and silicon or an alloy of aluminum and titanium, and a titanium nitride layer or a titanium layer is preferable.

The gate insulating layer 402 can be formed to have a single-layer structure or a stacked-layer structure using a silicon oxide layer, a silicon nitride layer, a silicon oxynitride layer, or a silicon nitride oxide layer by a plasma CVD method, a sputtering method, or the like. Alternatively, the gate insulating layer 402 can be formed using a silicon oxide layer by a CVD method using an organosilane gas. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

In the manufacturing steps of the semiconductor layer, the $n^+$ layers, and the wiring layers, an etching step is used to process thin films into desired shapes. Dry etching or wet etching can be used for the etching step.

As an etching apparatus used for the dry etching, an etching apparatus using a reactive ion etching method (an RIE method), or a dry etching apparatus using a high-density plasma source such as ECR (electron cyclotron resonance) or ICP (inductively coupled plasma) can be used. As a dry etching apparatus by which uniform electric discharge can be obtained over a wider area as compared with an ICP etching apparatus, there is an ECCP (enhanced capacitively coupled plasma) mode apparatus in which an upper electrode is grounded, a high-frequency power source at 13.56 MHz is connected to a lower electrode, and further a low-frequency power source at 3.2 MHz is connected to the lower electrode. This ECCP mode etching apparatus can be applied even when, as the substrate, a substrate, the size of which exceeds 3 m of the tenth generation, is used, for example.

In order to etch the films into desired shapes, etching conditions (e.g., the amount of electric power applied to a coil-shaped electrode, the amount of electric power applied to an electrode on a substrate side, or the temperature of the electrode on the substrate side) are controlled as appropriate.

In order to etch the films into desired shapes, etching conditions (e.g., etchant, etching time, or temperature) are controlled as appropriate in accordance with the material.

As a material of the wiring layers 405a and 405b, an element selected from Al, Cr, Ta, Ti, Mo, or W, an alloy containing any of the elements as its component, an alloy containing any of the elements in combination, and the like can be given. Further, in the case where heat treatment is performed, the conductive film preferably has heat resistance against the heat treatment. For example, since Al itself has disadvantages such as low heat resistance and a tendency to be corroded, it is used in combination with a conductive material having heat resistance. As the conductive material having heat resistance which is used in combination with Al, any of the following materials may be used: an element selected from titanium (Ti), tantalum (Ta), tungsten (W), molybdenum (Mo), chromium (Cr), neodymium (Nd), or scandium (Sc), an alloy containing any of the elements as a component, an alloy containing the elements in combination, and a nitride containing any of the elements as a component.

The gate insulating layer 402, the semiconductor layer 403, the n$^+$ layers 404a and 404b, and the wiring layers 405a and 405b may be formed in succession without being exposed to air. By successive formation without exposure to air, each interface between the stacked layers can be formed without being contaminated by atmospheric components or impurities contained in air; therefore, variation in characteristics of the thin film transistors can be reduced.

Note that the semiconductor layer 403 is partly etched so as to have a groove (a depressed portion).

The insulating film 407 covering the thin film transistor 420 can be formed using an inorganic insulating film or an organic insulating film formed by a wet method or a dry method. For example, the insulating film 407 can be formed by a CVD method, a sputtering method, or the like, using a silicon nitride film, a silicon oxide film, a silicon oxynitride film, an aluminum oxide film, a tantalum oxide film, or the like. Alternatively, an organic material such as polyimide, acrylic, benzocyclobutene, polyamide, or epoxy can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin is a resin formed from a siloxane material as a starting material and having the bond of Si—O—Si. A siloxane-based resin may include, as a substituent, an organic group (e.g., an alkyl group, and an aryl group) or a fluoro group. The organic group may include a fluoro group. A siloxane-based resin is applied by a coating method and baked; thus, the insulating film 407 can be formed.

Alternatively, the insulating film 407 may be formed by stacking a plurality of insulating films formed using any of these materials. For example, the insulating film 407 may have such a structure that an organic resin film is stacked over an inorganic insulating film.

Further, by use of a resist mask having regions with plural thicknesses (typically, two different thicknesses) which is formed using a multi-tone mask, the number of resist masks can be reduced, resulting in simplified process and lower cost.

In the above-described manner, in the liquid crystal display device using the liquid crystal layer exhibiting a blue phase, a contrast ratio can be increased.

Embodiment 3

Figure 4A:
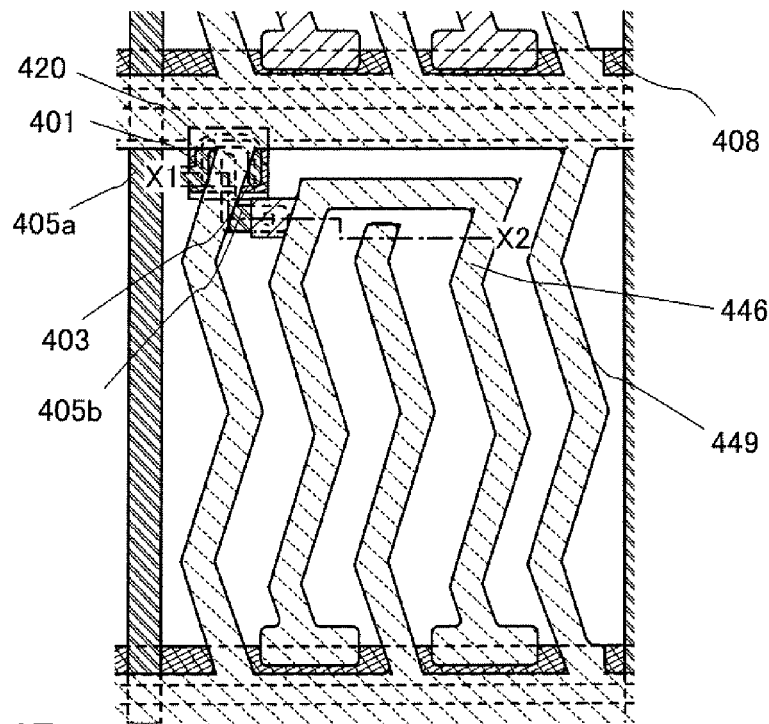
FIGS. 4A and 4B are diagrams illustrating a liquid crystal display device.
Figure 4B:
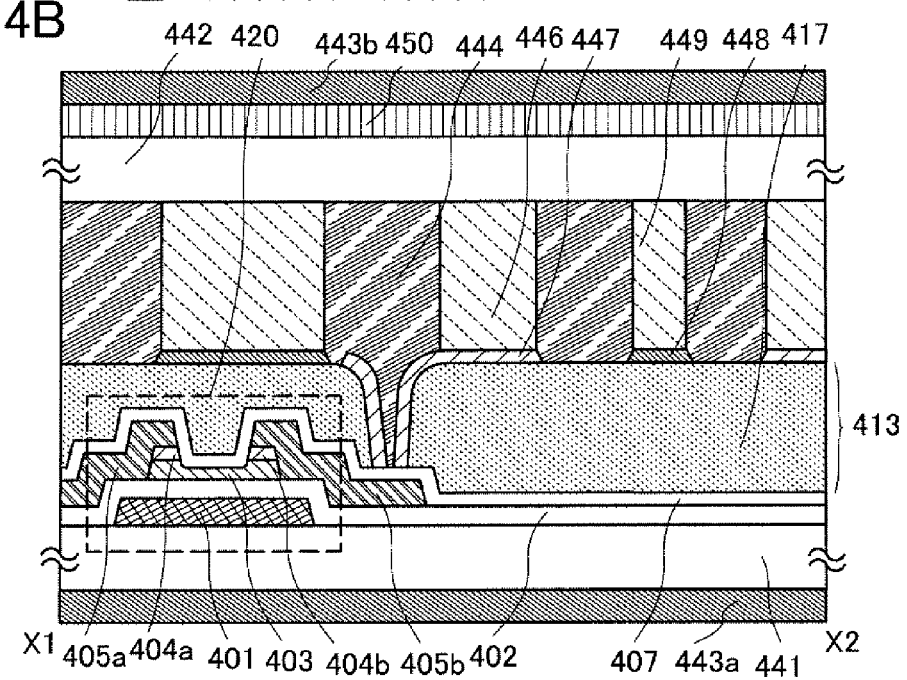

FIGS. 4A and 4B illustrate an example in which a color filter is provided on the outer side of substrates between which a liquid crystal layer is sandwiched in Embodiment 2. Note that components in common with those in Embodiments 1 and 2 can be formed using a similar material and manufacturing method, and detailed description of the same portions and portions having similar functions is omitted.

FIG. 4A is a plan view of a liquid crystal display device and illustrates one pixel. FIG. 4B is a cross-sectional view taken along line X1-X2 in FIG. 4A.

In the plan view of FIG. 4A, as in Embodiment 2, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extend in a direction generally perpendicular to the source wiring layers (a horizontal direction in the drawing). The capacitor wiring layers 408 are provided adjacent to the plurality of gate wiring layers and extend in a direction generally parallel to the gate wiring layers, that is, in a direction generally perpendicular to the source wiring layers (a horizontal direction in the drawing). Roughly rectangular spaces are surrounded by the source wiring layers, the capacitor wiring layers 408, and the gate wiring layers, and a pixel electrode layer and a common electrode layer of the liquid crystal display device are provided in these spaces. The first structure body 446 is provided over the first electrode layer 447 which is the pixel electrode layer, and the second structure body 449 is provided over the second electrode layer 448 which is the common electrode layer. The first structure body 446 and the second structure body 449 project into the liquid crystal layer 444. The thin film transistor 420 for driving the pixel electrode layer is provided at the upper left corner in the drawing. A plurality of pixel electrode layers and thin film transistors are provided in matrix.

FIGS. 4A and 4B illustrate an example in which the interlayer film 413 is formed so as to cover the thin film transistor 420 and the second structure body 449 is formed over the interlayer film 413 by etching process, and then a contact hole through which the first electrode layer 447 to be formed later is connected to the thin film transistor 420 is opened in the interlayer film 413. The first electrode layer 447 which functions as a pixel electrode layer is successively formed so as to cover the second structure body 449 and the contact hole formed in the interlayer film 413.

In the liquid crystal display device in FIGS. 4A and 4B, a color filter 450 is provided between the second substrate 442 and the polarizing plate 443b. The color filter 450 may be thus provided on the outer side of the first substrate 441 and the second substrate 442 between which the liquid crystal layer 444 is interposed.

Manufacturing steps of the liquid crystal display device in FIGS. 4A and 4B are illustrated in FIGS. 17A to 17D.

Note that in FIGS. 17A to 17D, the first electrode layer, the second electrode layer, the first structure body, and the second structure body are omitted. For example, the first electrode layer, the second electrode layer, the first structure body, and the second structure body can have the structures described in Embodiment 1 or 2, and an electric field mode which is generated between the first electrode layer and the first structure body, and the second electrode layer and the second structure body can be employed.

Figure 17A:
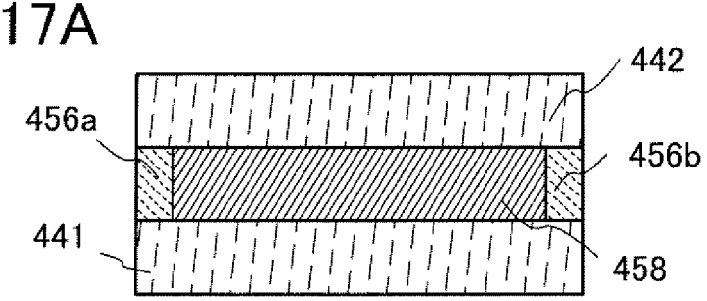
FIGS. 17A to 17D are diagrams illustrating a method for manufacturing a liquid crystal display device.

As illustrated in FIG. 17A, the first substrate 441 and the second substrate 442 which is a counter substrate are firmly fixed to each other by the sealants 456a and 456b with the liquid crystal layer 458 interposed between the substrates. The liquid crystal layer 458 can be formed by a dispenser method (a dropping method), or an injecting method by which a liquid crystal is injected using a capillary phenomenon after the first substrate 441 and the second substrate 442 are attached to each other.

A liquid crystal material exhibiting a blue phase is used for the liquid crystal layer 458. The liquid crystal layer 458 is formed using a liquid crystal material including a liquid crystal, a chiral agent, a photocurable resin, and a photopolymerization initiator.

Figure 17B:
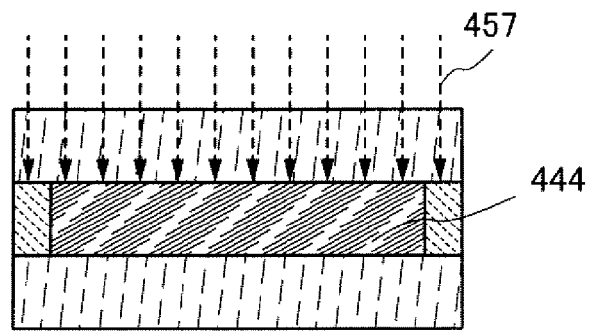

As illustrated in FIG. 17B, polymer stabilization treatment is performed on the liquid crystal layer 458 by irradiation with the light 457, so that the liquid crystal layer 444 is formed. The light 457 has a wavelength with which the photocurable resin and the photopolymerization initiator included in the liquid crystal layer 458 react. By this polymer stabilization treatment with light irradiation, the temperature range in which the liquid crystal layer 458 exhibits a blue phase can be widened.

In the case where a photocurable resin such as an ultraviolet curable resin is used as a sealant and a liquid crystal layer is formed by a dropping method, for example, the sealant may be cured by the light irradiation step of the polymer stabilization treatment.

Figure 17C:
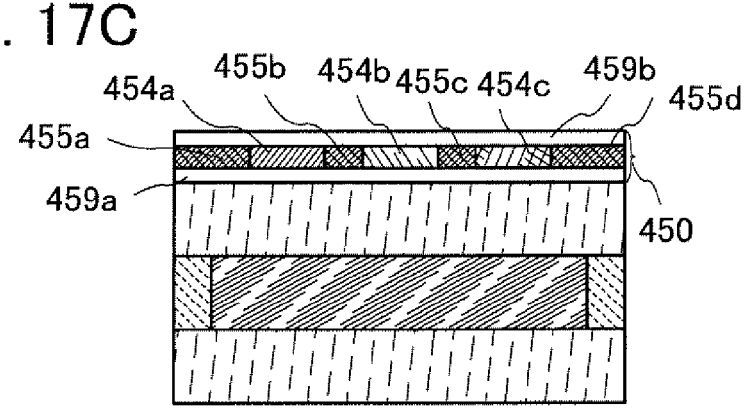

Next, as illustrated in FIG. 17C, the color filter 450 is provided on the second substrate 442 side which is the viewing side. The color filter 450 includes the light-transmitting chromatic-color resin layers 454a, 454b, and 454c functioning as color filter layers, and the light-blocking layers 455a, 455b, 455c, and 455d functioning as black matrix layers between a pair of substrates 459a and 459b. The chromatic-color light-transmitting resin layers 454a, 454b, and 454c are provided between the light-blocking layers 455a and 455b, between the light-blocking layers 455b and 455c, and between the light-blocking layers 455c and 455d, respectively.

Figure 17D:
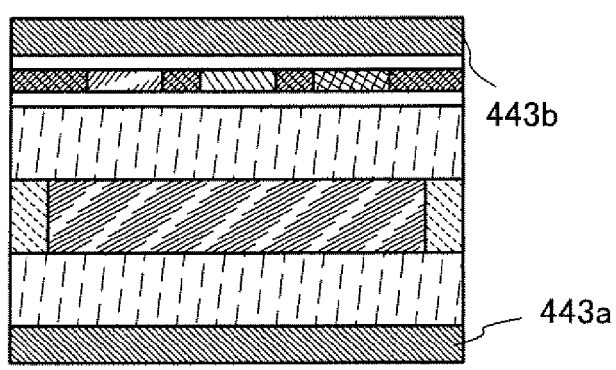

As illustrated in FIG. 17D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the color filter 450. In addition to the polarizing plate, an optical film such as a retardation plate or an anti-reflection film may be provided. For example, circular polarization by the polarizing plate and the retardation plate may be used. Through the above-described steps, a liquid crystal display device can be completed.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 441, which is an element substrate, so as to pass through the second substrate 442 on the viewing side.

By provision of the first structure body and the second structure body, each of which has a dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

Embodiment 4

A liquid crystal display device including a light-blocking layer (a black matrix) will be described with reference to FIGS. 5A and 5B.

Figure 5B:
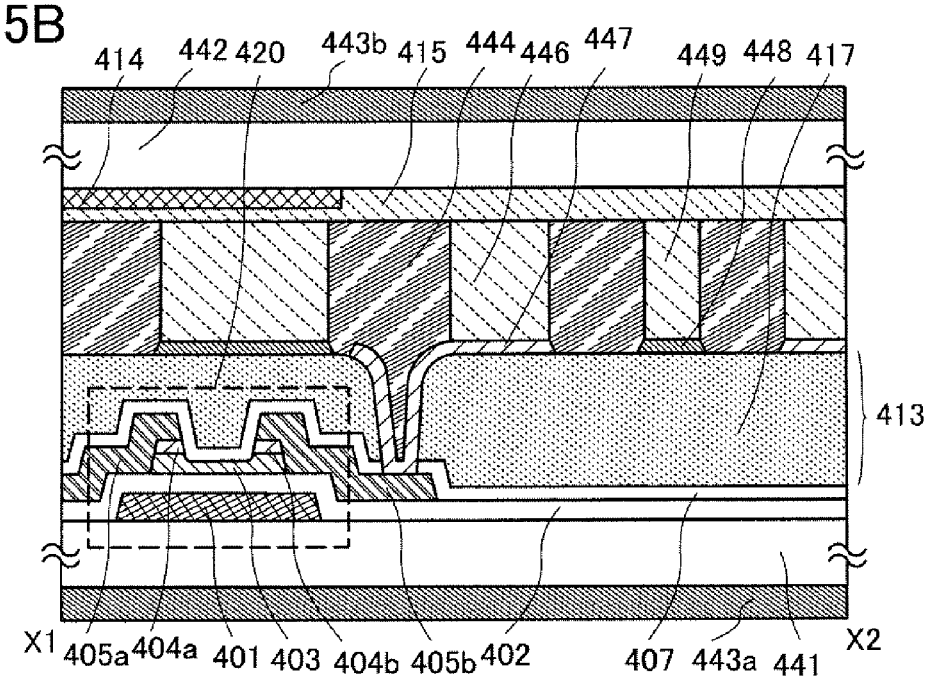

The liquid crystal display device illustrated in FIGS. 5A and 5B is an example in which a light-blocking layer 414 is further formed on the side of the second substrate 442 which is a counter substrate in the liquid crystal display device illustrated in FIGS. 2A and 2B of Embodiment 2. Therefore, components in common with those in Embodiment 2 can be formed using a similar material and manufacturing method, and detailed description of the same portions and portions having similar functions is omitted.

FIG. 5A is a plan view of a liquid crystal display device, and FIG. 5B is a cross-sectional view taken along line X1-X2 in FIG. 5A. Note that the plan view of FIG. 5A illustrates only the element substrate side and the counter substrate side is not illustrated.

The light-blocking layer 414 is formed on the liquid crystal layer 444 side of the second substrate 442 and an insulating layer 415 is formed as a planarization film. The light-blocking layer 414 is preferably formed in a region corresponding to the thin film transistor 420 (a region which overlaps with the semiconductor layer of the thin film transistor) with the liquid crystal layer 444 interposed therebetween. The first substrate 441 and the second substrate 442 are firmly attached to each other with the liquid crystal layer 444 interposed therebetween so that the light-blocking layer 414 is positioned to cover at least an upper portion of the semiconductor layer 403 of the thin film transistor 420.

The light-blocking layer 414 is formed using a light-blocking material that reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which may be formed using chromium, molybdenum, nickel, titanium, cobalt, copper, tungsten, aluminum, or the like, for example.

There is no particular limitation on the formation method of the light-blocking layer 414, and a dry method such as vapor deposition, sputtering, CVD, or the like or a wet method such as spin coating, dip coating, spray coating, droplet discharging (e.g., ink jetting, screen printing, or offset printing), or the like may be used depending on the material. If needed, an etching method (dry etching or wet etching) may be employed to form a desired pattern.

The insulating layer 415 may be formed using an organic resin such as acrylic or polyimide by a coating method such as spin coating or various printing methods.

By formation of the light-blocking layer 414 on the counter substrate side in this manner, improvement in contrast and stabilization of the thin film transistor can be achieved. The light-blocking layer 414 can block incident light on the semiconductor layer 403 of the thin film transistor 420; accordingly, electric characteristics of the thin film transistor 420 can be prevented from being varied due to photosensitivity of the semiconductor and can be further stabilized. Further, the light-blocking layer 414 can prevent light leakage to an adjacent pixel, which allows higher contrast and higher definition display. Therefore, high definition and high reliability of the liquid crystal display device can be achieved.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 5

A liquid crystal display device including a light-blocking layer (a black matrix) will be described with reference to FIGS. 6A and 6B.

Figure 6A:
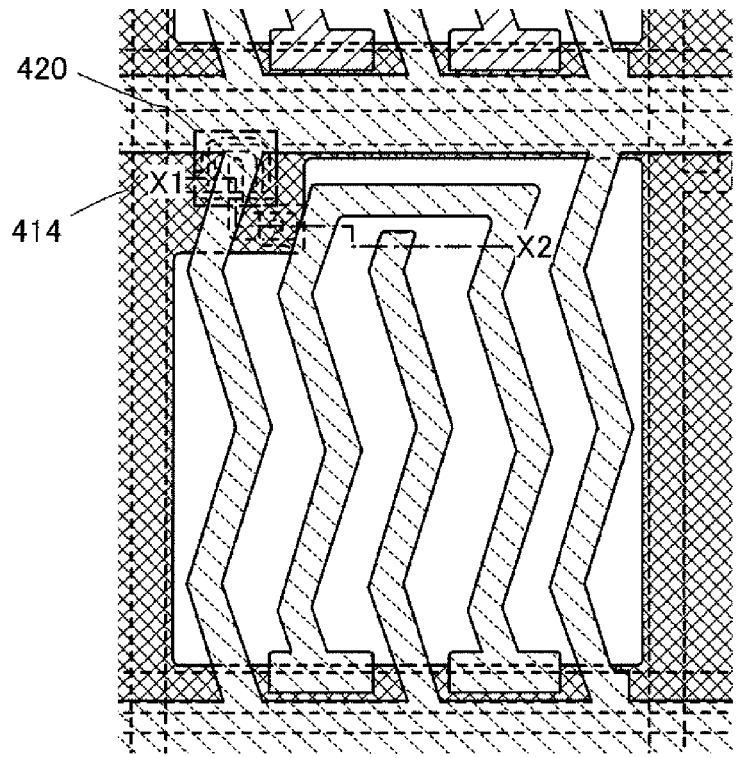
FIGS. 6A and 6B are diagrams illustrating a liquid crystal display device.
Figure 6B:
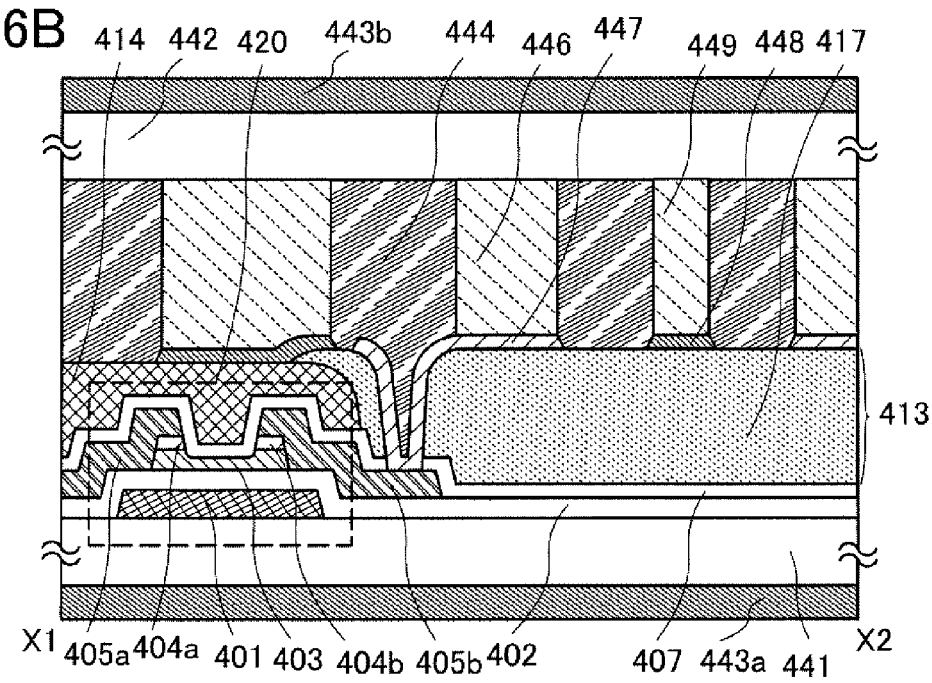

The liquid crystal display device illustrated in FIGS. 6A and 6B is an example in which the light-blocking layer 414 is formed as part of the interlayer film 413 on the side of the first substrate 441 which is an element substrate in the liquid crystal display device illustrated in FIGS. 2A and 2B of Embodiment 2. Therefore, components in common with those in Embodiment 2 can be formed using a similar material and manufacturing method, and detailed description of the same portions and portions having similar functions is omitted.

FIG. 6A is a plan view of a liquid crystal display device, and FIG. 6B is a cross-sectional view taken along line X1-X2 in FIG. 6A.

The interlayer film 413 includes the light-blocking layer 414 and the light-transmitting chromatic-color resin layer 417. The light-blocking layer 414 is provided on the side of the first substrate 441 which functions as an element substrate and formed over the thin film transistor 420 (at least in a region which covers a semiconductor layer of the thin film transistor) with the insulating film 407 interposed therebetween, so that the light-blocking layer 414 functions as a light-blocking layer for the semiconductor layer. On the other hand, the light-transmitting chromatic-color resin layer 417 is formed so that the first electrode layer 447 and the second electrode layer 448 are overlapped with the light-transmitting chromatic-color resin layer 417, and the light-transmitting chromatic-color resin layer 417 functions as a color filter layer.

Since the light-blocking layer 414 is used in the interlayer film, it is preferable that a black organic resin be used for the light-blocking layer 414. For example, a black resin of a pigment material, carbon black, titanium black, or the like may be mixed into a resin material such as photosensitive or non-photosensitive polyimide. As the formation method of the light-blocking layer 414, a wet method such as spin coating, dip coating, spray coating, droplet discharging (e.g., ink jetting, screen printing, or offset printing), or the like may be used depending on the material. If needed, an etching method (dry etching or wet etching) may be employed to form a desired pattern.

The light-blocking layer 414 is thus provided, whereby the light-blocking layer 414 can block incident light on the semiconductor layer 403 of the thin film transistor 420 without reduction in aperture ratio of a pixel; accordingly, electric characteristics of the thin film transistor 420 can be prevented from being varied and can be stabilized. Further, the light-blocking layer 414 can prevent light leakage to an adjacent pixel, which allows higher contrast and higher definition display. Therefore, high definition and high reliability of the liquid crystal display device can be achieved.

Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the light-transmitting chromatic-color resin layer 417 included in the interlayer film is formed directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 6

Another example of a thin film transistor that can be applied to the liquid crystal display devices in Embodiments 2 to 5 will be described. Note that components in common with those in Embodiments 2 to 5 can be formed using a similar material and manufacturing method, and detailed description of the same portions and portions having similar functions is omitted.

Figure 10A:
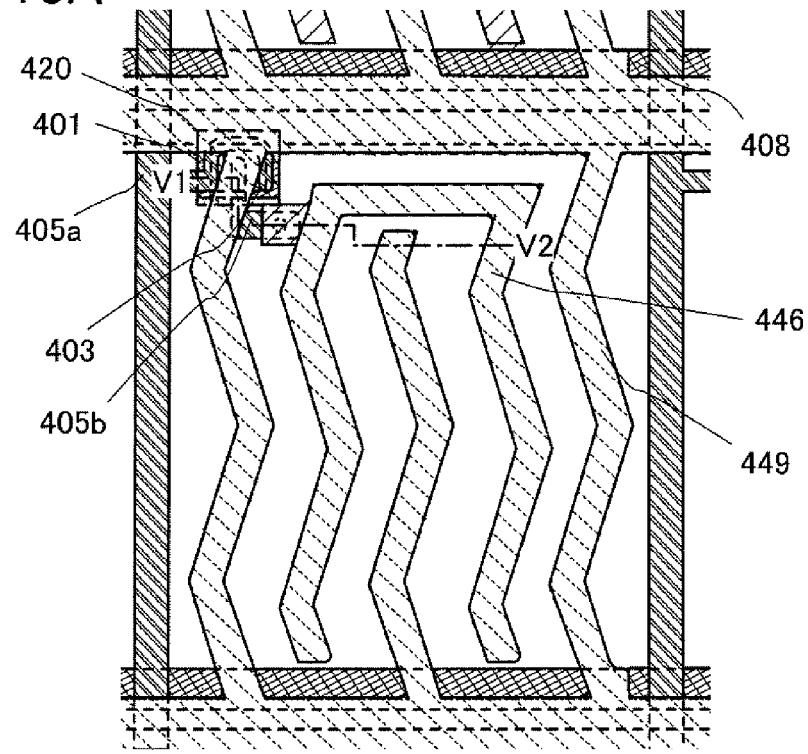
FIGS. 10A and 10B are diagrams illustrating a liquid crystal display device.
Figure 10B:
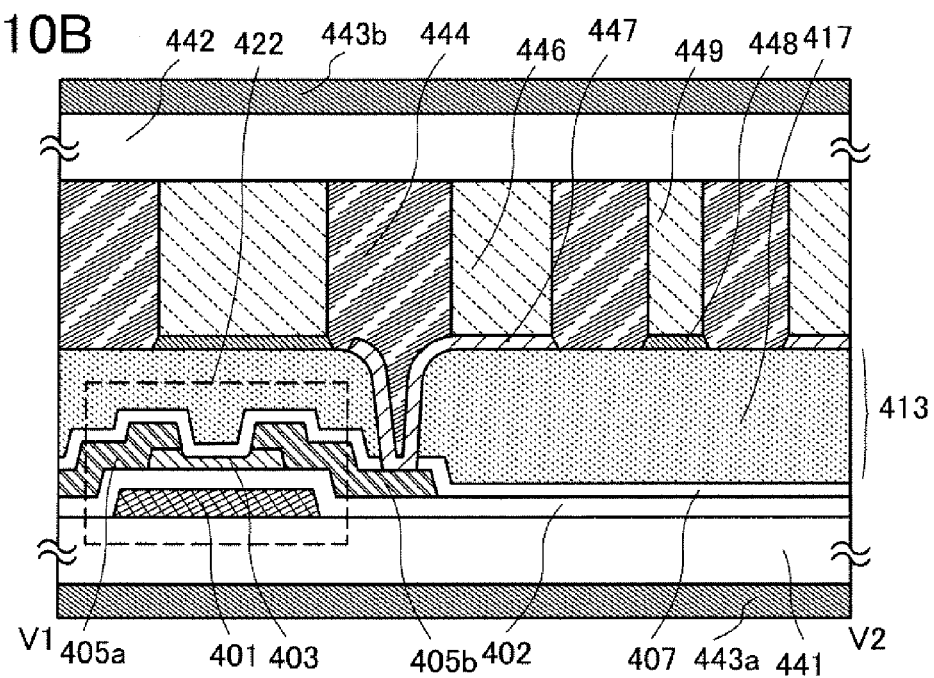

An example of a liquid crystal display device including a thin film transistor which has a structure in which source and drain electrode layers are in contact with a semiconductor layer without an $n^+$ layer interposed therebetween is illustrated in FIGS. 10A and 10B.

FIG. 10A is a plan view of a liquid crystal display device and illustrates one pixel. FIG. 10B is a cross-sectional view taken along line V1-V2 in FIG. 10A.

In the plan view of FIG. 10A, as in Embodiment 2, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extend in a direction generally perpendicular to the source wiring layers (a horizontal direction in the drawing). The capacitor wiring layers 408 are provided adjacent to the plurality of gate wiring layers and extend in a direction generally parallel to the gate wiring layers, that is, in a direction generally perpendicular to the source wiring layers (a horizontal direction in the drawing). Roughly rectangular spaces are surrounded by the source wiring layers, the capacitor wiring layers 408, and the gate wiring layers, and a pixel electrode layer and a common electrode layer of the liquid crystal display device are provided in these spaces. The first structure body 446 is provided over the first electrode layer 447 which is the pixel electrode layer, and the second structure body 449 is provided over the second electrode layer 448 which is the common electrode layer. The first structure body 446 and the second structure body 449 project into the liquid crystal layer 444. A thin film transistor 422 for driving the pixel electrode layer is provided at the upper left corner in the drawing. A plurality of pixel electrode layers and thin film transistors are provided in matrix.

The first substrate 441 provided with the thin film transistor 422, the interlayer film 413 which is a light-transmitting chromatic-color resin layer, the first electrode layer 447, and the second electrode layer 448 and the second substrate 442 are firmly attached to each other with the liquid crystal layer 444 interposed between the substrates.

The thin film transistor 422 has a structure in which the semiconductor layer 403 is in contact with the wiring layers 405a and 405b serving as source and drain electrode layers without an $n^+$ layer interposed therebetween.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 7

Another example of a thin film transistor that can be applied to the liquid crystal display devices in Embodiments 2 to 5 will be described. Note that components in common with those in Embodiments 2 to 5 can be formed using a similar material and manufacturing method, and detailed description of the same portions and portions having similar functions is omitted.

Figure 11A:
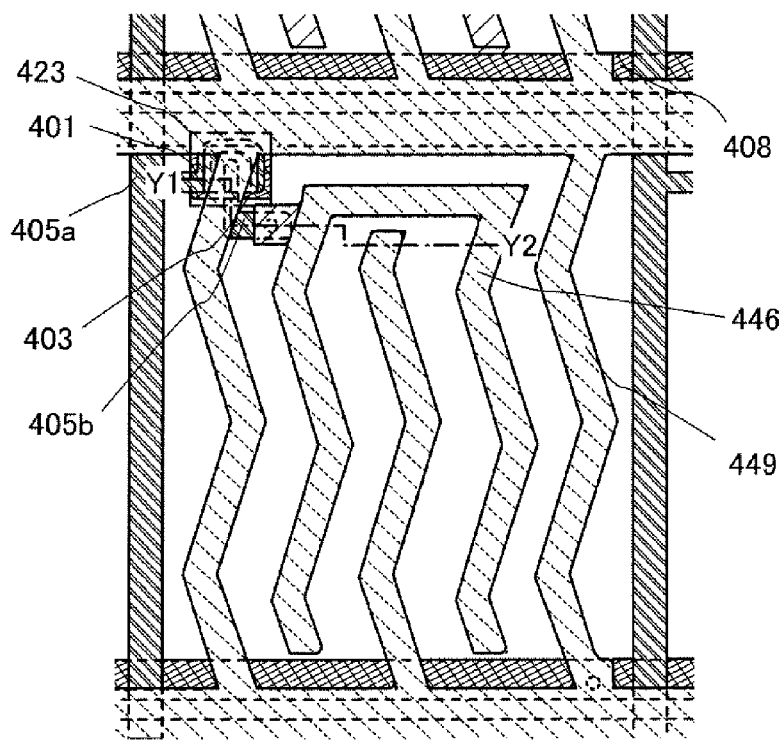
FIGS. 11A and 11B are diagrams illustrating a liquid crystal display device.
Figure 11B:
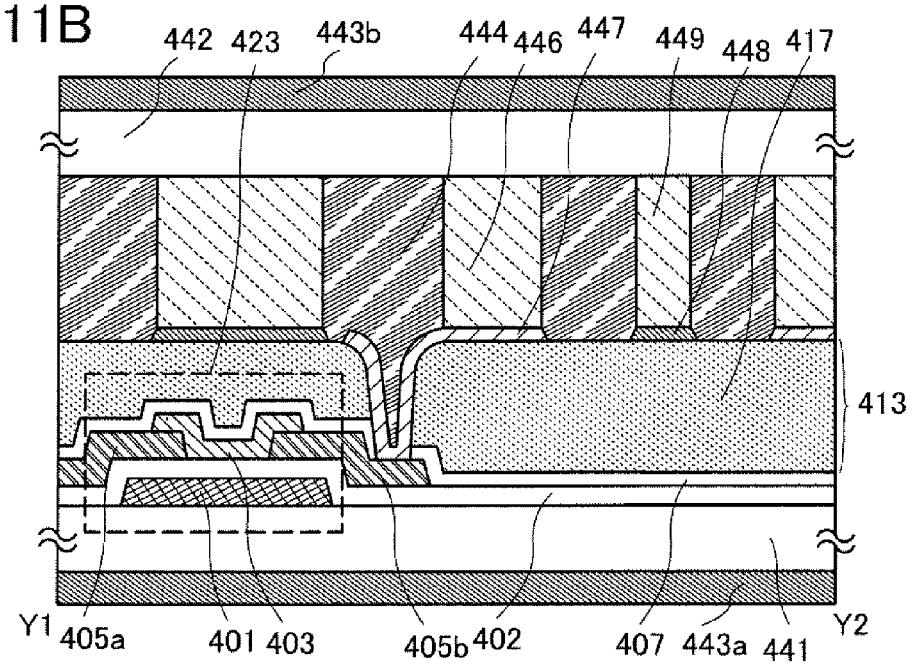

An example of a liquid crystal display device including a thin film transistor which has a structure in which source and drain electrode layers are in contact with a semiconductor layer without an $n^+$ layer interposed therebetween is illustrated in FIGS. 11A and 11B.

FIG. 11A is a plan view of a liquid crystal display device and illustrates one pixel. FIG. 11B is a cross-sectional view taken along line Y1-Y2 in FIG. 11A.

In the plan view of FIG. 11A, as in Embodiment 2, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extend in a direction generally perpendicular to the source wiring layers (a horizontal direction in the drawing). The capacitor wiring layers 408 are provided adjacent to the plurality of gate wiring layers and extend in a direction generally parallel to the gate wiring layers, that is, in a direction generally perpendicular to the source wiring layers (a horizontal direction in the drawing). Roughly rectangular spaces are surrounded by the source wiring layers, the capacitor wiring layers 408, and the gate wiring layers, and a pixel electrode layer and a common electrode layer of the liquid crystal display device are provided in these spaces. The first structure body 446 is provided over the first electrode layer 447 which is the pixel electrode layer, and the second structure body 449 is provided over the second electrode layer 448 which is the common electrode layer. The first structure body 446 and the second structure body 449 project into the liquid crystal layer 444. A thin film transistor 423 for driving the pixel electrode layer is provided at the upper left corner in the drawing. A plurality of pixel electrode layers and thin film transistors are provided in matrix.

The first substrate 441 provided with the thin film transistor 423, the interlayer film 413 which is a light-transmitting chromatic-color resin layer, the first electrode layer 447, and the second electrode layer 448 and the second substrate 442 are firmly attached to each other with the liquid crystal layer 444 interposed between the substrates.

The gate insulating layer 402 exists in the entire region including the thin film transistor 423, and the thin film transistor 423 is provided with the gate electrode layer 401 between the gate insulating layer 402 and the first substrate 441 which is a substrate having an insulating surface. The wiring layers 405a and 405b are provided over the gate insulating layer 402. In addition, the semiconductor layer 403 is provided over the gate insulating layer 402 and the wiring layers 405a and 405b. Although not illustrated, a wiring layer is provided over the gate insulating layer 402 in addition to the wiring layers 405a and 405b and the wiring layer extends beyond the perimeter of the semiconductor layer 403 to the outside.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 8

Another example of a thin film transistor that can be applied to the liquid crystal display devices in Embodiments 2 to 5 will be described with reference to FIGS. 9A and 9B. Note that components in common with those in Embodiments 2 to 5 can be formed using a similar material and manufacturing method, and detailed description of the same portions and portions having similar functions is omitted.

Figure 9A:
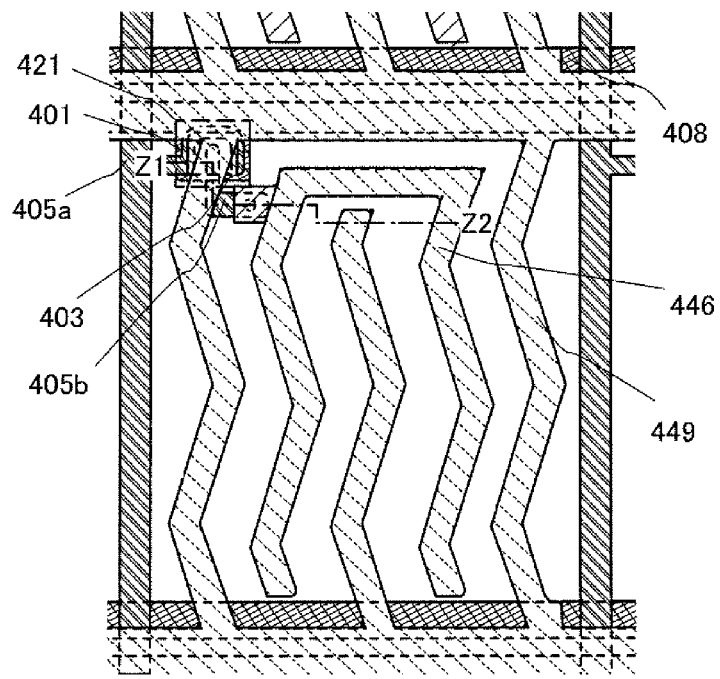
FIGS. 9A and 9B are diagrams illustrating a liquid crystal display device.
Figure 9B:
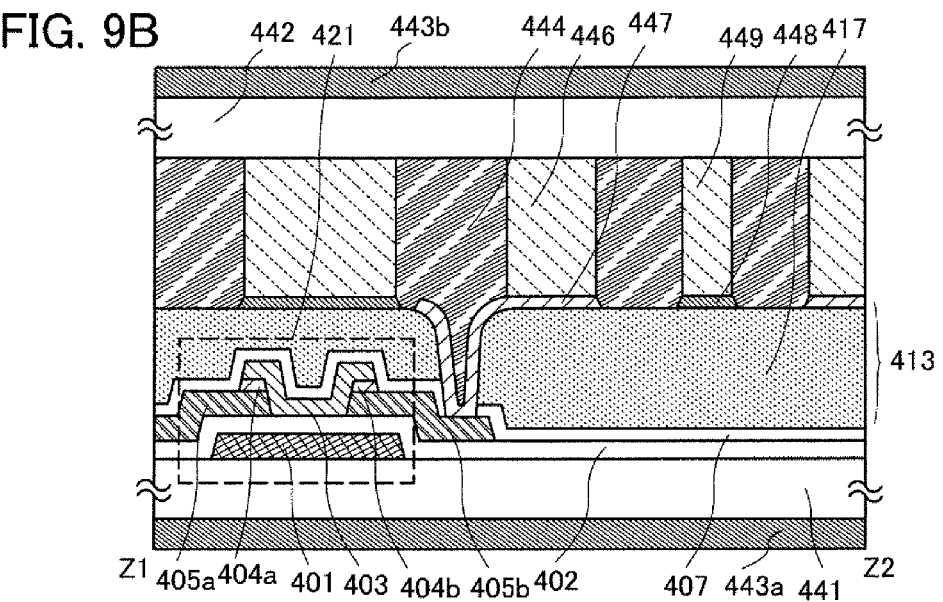

FIG. 9A is a plan view of a liquid crystal display device and illustrates one pixel. FIG. 9B is a cross-sectional view taken along line Z1-Z2 in FIG. 9A.

In the plan view of FIG. 9A, as in Embodiment 2, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extend in a direction generally perpendicular to the source wiring layers (a horizontal direction in the drawing). The capacitor wiring layers 408 are provided adjacent to the plurality of gate wiring layers and extend in a direction generally parallel to the gate wiring layers, that is, in a direction generally perpendicular to the source wiring layers (a horizontal direction in the drawing). Roughly rectangular spaces are surrounded by the source wiring layers, the capacitor wiring layer 408, and the gate wiring layers, and a pixel electrode layer and a common electrode layer of the liquid crystal display device are provided in these spaces. The first structure body 446 is provided over the first electrode layer 447 which is the pixel electrode layer, and the second structure body 449 is provided over the second electrode layer 448 which is the common electrode layer. The first structure body 446 and the second structure body 449 project into the liquid crystal layer 444. A thin film transistor 421 for driving the pixel electrode layer is provided at the upper left corner in the drawing. A plurality of pixel electrode layers and thin film transistors are provided in matrix.

The first substrate 441 provided with the thin film transistor 421, the interlayer film 413 which is a light-transmitting chromatic-color resin layer, the first electrode layer 447, and the second electrode layer 448 and the second substrate 442 are firmly attached to each other with the liquid crystal layer 444 interposed between the substrates.

The thin film transistor 421 is a bottom-gate thin film transistor and includes, over the first substrate 441 having an insulating surface, the gate electrode layer 401, the gate insulating layer 402, the wiring layers 405a and 405b serving as source and drain electrode layers, the n$^+$ layers 404a and 404b serving as source and drain regions, and the semiconductor layer 403. In addition, the insulating film 407 which covers the thin film transistor 421 and is in contact with the semiconductor layer 403 is provided.

Note that the n$^+$ layers 404a and 404b may be provided between the gate insulating layer 402 and the wiring layer 405a and between the gate insulating layer 402 and the wiring layer 405b, respectively. Alternatively, the n$^+$ layers may be provided both between the gate insulating layer and the wiring layers and between the wiring layers and the semiconductor layer.

The gate insulating layer 402 exists in the entire region including the thin film transistor 421, and the thin film transistor 421 is provided with the gate electrode layer 401 between the gate insulating layer 402 and the first substrate 441 which is a substrate having an insulating surface. The wiring layers 405a and 405b and the n$^+$ layers 404a and 404b are provided over the gate insulating layer 402. In addition, the semiconductor layer 403 is provided over the gate insulating layer 402, the wiring layers 405a and 405b, and the n$^+$ layers 404a and 404b. Although not illustrated, a wiring layer is provided over the gate insulating layer 402 in addition to the wiring layers 405a and 405b and the wiring layer extends beyond the perimeter of the semiconductor layer 403 to the outside.

By provision of the first structure body and the second structure body, each of which has a high dielectric constant, in the liquid crystal layer, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 9

Another example of a thin film transistor that can be applied to the liquid crystal display devices in Embodiments 2 to 5 will be described. Note that components in common with those in Embodiments 2 to 5 can be formed using a similar material and manufacturing method, and detailed description of the same portions and portions having similar functions is omitted.

Figure 27:
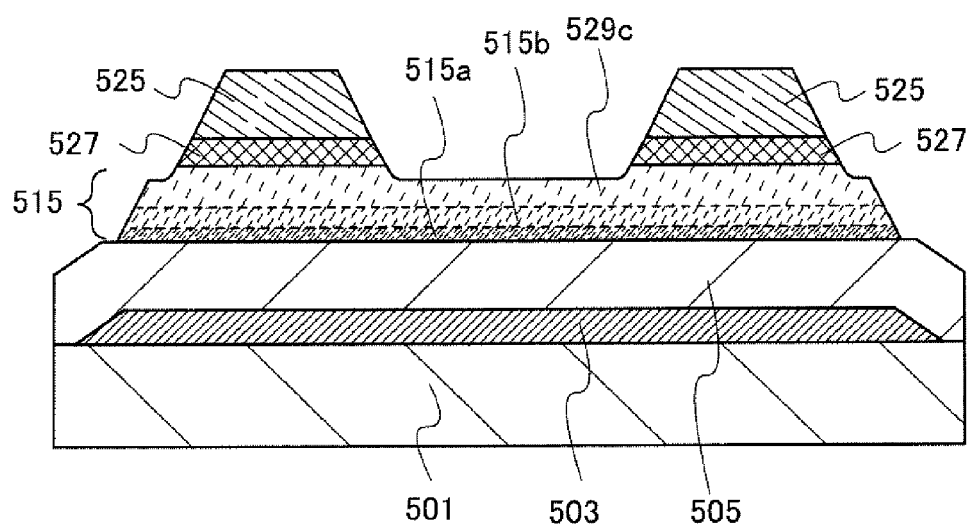
FIG. 27 is a diagram illustrating an example of a thin film transistor that can be applied to a liquid crystal display device.

FIG. 27 is a cross-sectional view of one embodiment of a thin film transistor described in this embodiment. The thin film transistor illustrated in FIG. 27 includes a gate electrode layer 503 over a substrate 501, a semiconductor layer 515 over a gate insulating layer 505, impurity semiconductor layers 527 serving as source and drain regions which are in contact with part of the upper surface of the semiconductor layer 515, and wirings 525 in contact with the impurity semiconductor layers 527. The semiconductor layer 515 includes a microcrystalline semiconductor layer 515a, a mixed region 515b, and a layer 529c containing an amorphous semiconductor, which are stacked in sequence over the gate insulating layer 505.

Figure 28A:
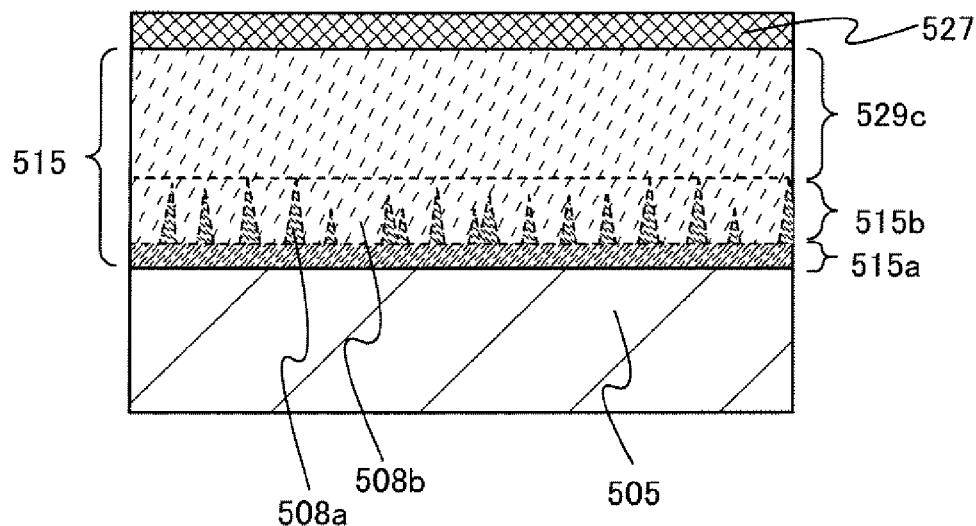
FIGS. 28A and 28B are diagrams each illustrating an example of a thin film transistor that can be applied to a liquid crystal display device.
Figure 28B:
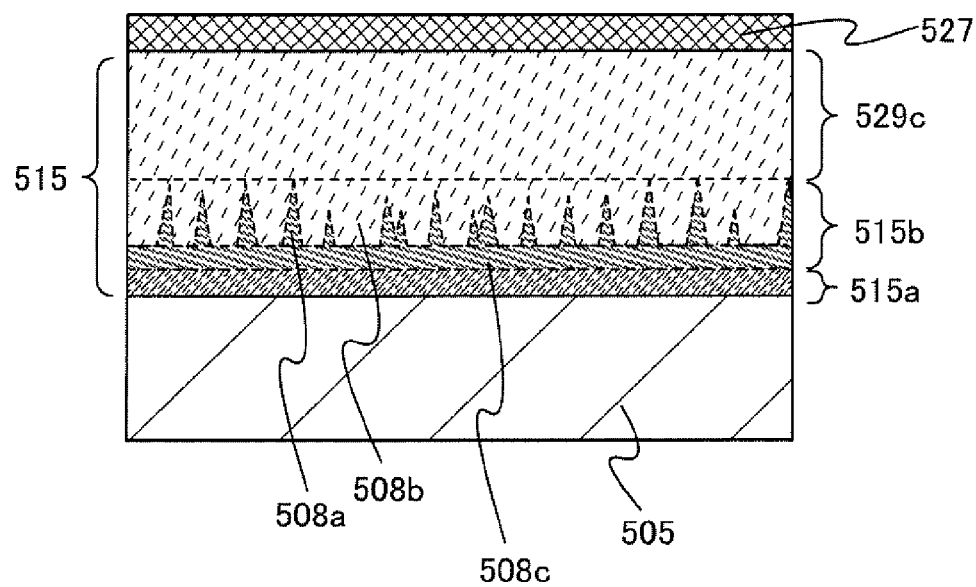

Next, a structure of the semiconductor layer 515 is described. FIGS. 28A and 28B each show an enlarged view of a region between the gate insulating layer 505 and one of the impurity semiconductor layers 527 functioning as source and drain regions in FIG. 27.

One embodiment of the semiconductor layer 515 is illustrated in each of FIGS. 28A and 28B. As illustrated in FIG. 28A, in the semiconductor layer 515, the microcrystalline semiconductor layer 515a, the mixed region 515b, and the layer 529c containing an amorphous semiconductor are stacked.

A microcrystalline semiconductor included in the microcrystalline semiconductor layer 515a is a semiconductor having a crystal structure (including a single crystal and a polycrystal). A microcrystalline semiconductor is a semiconductor having a third state that is stable in terms of free energy and is a crystalline semiconductor having short-range order and lattice distortion, in which columnar or needle-like crystals having a grain size of from 2 nm to 200 nm, preferably from 10 nm to 80 nm, more preferably from 20 nm to 50 nm have grown in a direction normal to the substrate surface. Therefore, a crystal grain boundary is formed at the interface of the columnar or needle-like crystals in some cases.

Microcrystalline silicon which is a typical example of the microcrystalline semiconductor has a peak of Raman spectrum which is shifted to a lower wave number than 520 cm$^{-1}$ that represents single crystal silicon. That is, the peak of the Raman spectrum of microcrystalline silicon is between 520 cm$^{-1}$ that represents single crystal silicon and 480 cm$^{-1}$ that represents amorphous silicon. The microcrystalline semiconductor may contain hydrogen or halogen of at least 1 at. % to terminate a dangling bond. Moreover, a rare gas element such as helium, argon, krypton, or neon may be contained to further promote lattice distortion, so that stability of the structure of minute crystals is enhanced and a favorable microcrystalline semiconductor can be obtained. Such a microcrystalline semiconductor is disclosed in, for example, U.S. Pat. No. 4,409,134.

Further, it is preferable that the concentration of oxygen and nitrogen contained in the microcrystalline semiconductor layer 515a which is measured by secondary ion mass spectrometry be less than $1\times10^{18}$ atoms/cm$^3$ so that the crystallinity of the microcrystalline semiconductor layer 515a can be improved.

The thickness of the microcrystalline semiconductor layer 515a is preferably 3 nm to 100 nm, more preferably 5 nm to 50 nm.

Note that in FIG. 27 and FIGS. 28A and 28B, the microcrystalline semiconductor layer 515a is formed in a layer shape; however, instead of this structure, microcrystalline semiconductor particles may be dispersed on the gate insulating layer 505. In this case, the mixed region 515b is in contact with the microcrystalline semiconductor particles and the gate insulating layer 505.

When the size of the microcrystalline semiconductor particle is set at 1 nm to 30 nm, and the density thereof is set at less than $1\times10^{13}$/cm$^3$, preferably less than $1\times10^{10}$/cm$^3$, microcrystalline semiconductor particles separated from each other can be formed.

The mixed region 515b and the layer 529c containing an amorphous semiconductor each contain nitrogen. The concentration of nitrogen contained in the mixed region 515b is greater than or equal to $1\times10^{20}$ atoms/cm$^3$ and less than or equal to $1\times10^{21}$ atoms/cm$^3$, preferably greater than or equal to $2\times10^{20}$ atoms/cm$^3$ and less than or equal to $1\times10^{21}$ atoms/cm$^3$.

As illustrated in FIG. 28A, the mixed region 515b includes microcrystalline semiconductor regions 508a and an amorphous semiconductor region 508b filling a space between the microcrystalline semiconductor regions 508a. Specifically, the mixed region 515b includes the microcrystalline semiconductor regions 508a which protrude from a surface of the microcrystalline semiconductor layer 515a and the amorphous semiconductor region 508b which is formed using the same kind of semiconductor as the layer 529c containing an amorphous semiconductor.

The microcrystalline semiconductor regions 508a are formed using a microcrystalline semiconductor with a projecting, needle-like, conical, or pyramidal shape which is tapered from the gate insulating layer 505 toward the layer 529c containing an amorphous semiconductor. Note that the microcrystalline semiconductor regions 508a may be formed using a microcrystalline semiconductor with a conical or pyramidal shape, a needle-like shape, or a projecting shape whose width is increased from the gate insulating layer 505 toward the layer 529c containing an amorphous semiconductor.

In addition, in some cases, a semiconductor crystal grain having a diameter of greater than or equal to 1 nm and less than or equal to 10 nm, preferably greater than or equal to 1 nm and less than or equal to 5 nm, is provided as a microcrystalline semiconductor region in the amorphous semiconductor region 508b of the mixed region 515b.

Alternatively, as illustrated in FIG. 28B, the mixed region 515b includes a microcrystalline semiconductor region 508c and the microcrystalline semiconductor region 508a which are successively formed, in some cases. The microcrystalline semiconductor region 508c is deposited with a uniform thickness over the microcrystalline semiconductor layer 515a, and the microcrystalline semiconductor region 508a has a conical or pyramidal shape, a needle-like shape, or a projecting shape whose end is narrowed from the gate insulating layer 505 toward the layer 529c containing an amorphous semiconductor.

In addition, the amorphous semiconductor region 508h included in the mixed region 515b in FIGS. 28A and 28B includes a semiconductor the quality of which is substantially the same as that of the layer 529c containing an amorphous semiconductor.

According to the above, an interface between a region formed using a microcrystalline semiconductor and a region formed using an amorphous semiconductor may correspond to the interface between the microcrystalline semiconductor region 508a and the amorphous semiconductor region 508b in the mixed region; thus, a cross-sectional boundary between the microcrystalline semiconductor region and the amorphous semiconductor region can be described as uneven or zigzag.

In the case where the microcrystalline semiconductor region 508a includes a projecting semiconductor crystal grain whose end is narrowed from the gate insulating layer 505 toward the layer 529c containing an amorphous semiconductor, the proportion of the microcrystalline semiconductor regions in the mixed region 515b is higher in a region close to the microcrystalline semiconductor layer 515a than in a region close to the layer 529c containing an amorphous semiconductor. The reason for this is as follows. The microcrystalline semiconductor region 508a grows in a film thickness direction from the surface of the microcrystalline semiconductor layer 515a. By addition of a gas containing nitrogen in a source gas, or by addition of a gas containing nitrogen in a source gas and reducing the flow rate of hydrogen to silane from that under the condition for forming the microcrystalline semiconductor layer 515a, growth of the semiconductor crystal grain in the microcrystalline semiconductor region 508a is suppressed, the semiconductor crystal grain becomes a conical or pyramidal microcrystalline semiconductor region, and the amorphous semiconductor is gradually deposited. This is caused by the fact that the solid solubility of nitrogen in the microcrystalline semiconductor region is lower than in the amorphous semiconductor region.

Off-current of the thin film transistor can be reduced by setting the total thickness of the microcrystalline semiconductor layer 515a and the mixed region 515b, that is, the distance from the interface between the microcrystalline semiconductor layer 515a and the gate insulating layer 505 to the tip of the projection (projecting portion) in the mixed region 515b, to greater than or equal to 3 nm and less than or equal to 410 nm, preferably greater than or equal to 20 nm and less than or equal to 100 nm.

The layer 529c containing an amorphous semiconductor contains nitrogen and is a semiconductor the quality of which is substantially the same as that of the amorphous semiconductor region 508b included in the mixed region 515b. Further, the layer 529c containing an amorphous semiconductor may include a semiconductor crystal grain having a diameter of greater than or equal to 1 nm and less than or equal to 10 nm, preferably greater than or equal to 1 nm and less than or equal to 5 nm. Here, the layer 529e containing an amorphous semiconductor is a semiconductor layer having lower energy at an Urbach edge and a small amount of the absorption spectrum of defects, measured by a constant photocurrent method (CPM) or photoluminescence spectroscopy, compared with a conventional amorphous semiconductor layer. That is, the layer 529c containing an amorphous semiconductor is a well-ordered semiconductor layer which has fewer defects and whose tail of a level at a band edge in the valence band is steep, compared with the conventional amorphous semiconductor layer. Since the tail of a level at a band edge in the valence band is steep in the layer 529c containing an amorphous semiconductor, the band gap gets wider, and tunneling current does not easily flow. Therefore, by provision of the layer 529c containing an amorphous semiconductor on the back channel side, off-current of the thin film transistor can be reduced. In addition, by provision of the layer 529c containing an amorphous semiconductor, on-current and field effect mobility of the thin film transistor can be increased.

A peak region of spectrum of the layer 529c containing an amorphous semiconductor, which is measured by low temperature photoluminescence spectroscopy, is greater than or equal to 1.31 eV and less than or equal to 1.39 eV. Note that a peak region of spectrum obtained by measuring a microcrystalline semiconductor layer, typically a microcrystalline silicon layer with low-temperature photoluminescence spectroscopy is greater than or equal to 0.98 eV and less than or equal to 1.02 eV. Therefore, the layer 529c containing an amorphous semiconductor is different from a microcrystalline semiconductor layer.

Note that an amorphous semiconductor contained in the layer 529c containing an amorphous semiconductor is typically amorphous silicon.

The thickness of the mixed region 515b and that of the layer 529c containing an amorphous semiconductor are each preferably 50 nm to 350 nm, more preferably 120 nm to 250 nm.

Since the mixed region 515b includes the conical or pyramidal microcrystalline semiconductor region 508a, resistance in a vertical direction (film thickness direction) of when voltage is applied to the source or drain electrode, that is, resistance of the microcrystalline semiconductor layer 515a, the mixed region 515b, and the layer 529c containing an amorphous semiconductor can be reduced.

In some cases, the mixed region 515b contains an NH group or an $NH_2$ group. This is preferable because when an NH group or an $NH_2$ group is bonded to a dangling bond of a silicon atom at an interface between different microcrystalline semiconductor regions in the microcrystalline semiconductor region 508a, at an interface between the microcrystalline semiconductor region 508a and the amorphous semiconductor region 508b, or at an interface between the microcrystalline semiconductor layer 515a and the mixed region 515b, defects are reduced.

Further, the concentration of oxygen in the mixed region 515b is made lower than that of nitrogen in the mixed region 515b, whereby bonds which interrupt carrier transfer in defects at the interface between semiconductor crystal grains and at the interface between the microcrystalline semiconductor region 508a and the amorphous semiconductor region 508b can be reduced.

In this manner, off-current of the thin film transistor can be reduced when a channel formation region is formed using the microcrystalline semiconductor layer 515a, and the layer 529c containing an amorphous semiconductor and formed using a well-ordered semiconductor layer which has fewer defects and whose tail of a level at a band edge in the valence band is steep is provided between the channel formation region and the impurity semiconductor layers 527 serving as source and drain regions. Further, the mixed region 515b including the conical or pyramidal microcrystalline semiconductor region 508a and the layer 529e containing an amorphous semiconductor and formed using a well-ordered semiconductor layer which has fewer defects and whose tail slope of a level at a band edge in the valence band is steep are formed between the channel formation region and the impurity semiconductor layers 527 serving as source and drain regions. Thus, on-current and field effect mobility can be increased while off-current can be reduced.

The impurity semiconductor layers 527 illustrated in FIG. 27 are formed using amorphous silicon to which phosphorus is added, microcrystalline silicon to which phosphorus is added, or the like. Note that, in the case where a p-channel thin film transistor is formed as the thin film transistor, the impurity semiconductor layers 527 are formed using microcrystalline silicon to which boron is added, amorphous silicon to which boron is added, or the like. Note that when ohmic contact is formed between the mixed region 515b and the wirings 525 or between the layer 529c containing an amorphous semiconductor and the wirings 525, the impurity semiconductor layers 527 are not necessarily formed.

In the thin film transistor illustrated in FIG. 27 and FIGS. 28A and 28B, the microcrystalline semiconductor layer serves as the channel formation region and the layer containing an amorphous semiconductor is formed on the back channel side. Thus, on-current and field effect mobility can be increased while off-current can be reduced. In addition, since the channel formation region is formed using the microcrystalline semiconductor layer, the thin film transistor less deteriorates and has high reliability in electric characteristics.

This embodiment can be combined with any of the other embodiments as appropriate.

Embodiment 10

An example of a material that can be used for any of the semiconductor layers of the thin film transistors of Embodiments 2 to 8 will be described. There is no particular limitation on a semiconductor material used for a semiconductor layer of a thin film transistor included in the liquid crystal display device disclosed in this specification.

The semiconductor layer included in a semiconductor element can be formed using the following material: an amorphous semiconductor (hereinafter also referred to as an "AS") manufactured by a sputtering method or a vapor-phase growth method using a semiconductor material gas typified by silane or germane; a polycrystalline semiconductor formed by crystallizing the amorphous semiconductor with the use of light energy or thermal energy; a microcrystalline semiconductor described in Embodiment 9; or the like. The semiconductor layer can be formed by a sputtering method, an LPCVD method, a plasma CVD method, or the like.

A typical example of an amorphous semiconductor is hydrogenated amorphous silicon, while a typical example of a crystalline semiconductor is polysilicon or the like. Polysilicon includes so-called high-temperature polysilicon formed using polysilicon which is formed at processing temperatures of 800° C. or more as a main material, so-called low-temperature polysilicon formed using polysilicon which is formed at processing temperatures of 600° C. or less as a main material, polysilicon formed by crystallization of amorphous silicon using an element that promotes crystallization or the like, and the like. Needless to say, as described above, a microcrystalline semiconductor, or a semiconductor which includes a crystalline phase in part of a semiconductor layer can be used.

As a material of the semiconductor, as well as an element of silicon (Si), germanium (Ge), or the like, a compound semiconductor such as GaAs, InP, SiC, ZnSe, GaN, or SiGe can be used.

In the case of using a crystalline semiconductor film for the semiconductor layer, the crystalline semiconductor film may be formed by various methods (such as a laser crystallization method, a thermal crystallization method, or a thermal crystallization method using an element which promotes crystallization, such as nickel). Also, a microcrystalline semiconductor, which is an SAS, can be crystallized by laser irradiation to increase its crystallinity. In the case where an element which promotes crystallization is not used, before an amorphous silicon film is irradiated with laser light, the amorphous silicon film is heated at 500° C. for one hour in a nitrogen atmosphere so that the concentration of hydrogen contained in the amorphous silicon film becomes $1 \times 10^{20}$ atoms/cm$^3$ or less. This is because the amorphous silicon film is destroyed when the amorphous silicon film containing a high amount of hydrogen is irradiated with laser light.

A technique for introducing a metal element into an amorphous semiconductor film is not particularly limited as long as it is a technique capable of providing the metal element on a surface or inside of the amorphous semiconductor film. For example, a sputtering method, a CVD method, a plasma processing method (including a plasma CVD method), an adsorption method, or a method for coating a solution of metal salt, can be used. Among them, the method using a solution is simple and advantageous in that the concentration of the metal element can be easily controlled. At this time, an oxide film is preferably deposited by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution on the entire surface of the amorphous semiconductor film.

In a crystallization step in which an amorphous semiconductor film is crystallized to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) crystallization, one or more of iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element that promotes crystallization from the crystalline semiconductor film, a semiconductor film containing an impurity element is formed in contact with the crystalline semiconductor film, which functions as a gettering sink. As the impurity element, an impurity element imparting n-type conductivity, an impurity element imparting p-type conductivity, a rare gas element, or the like can be used. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor film containing a rare gas element is formed in contact with the crystalline semiconductor film containing the element that promotes crystallization, and then heat treatment is performed (at 550° C. to 750° C. for 3 minutes to 24 hours). The element promoting crystallization that is contained in the crystalline semiconductor film moves into the semiconductor film containing a rare gas element, and thus the element promoting crystallization that is contained in the crystalline semiconductor film is removed or reduced. After that, the semiconductor film containing a rare gas element, which has functioned as the gettering sink, is removed.

The amorphous semiconductor film may be crystallized by a combination of heat treatment and laser light irradiation. Alternatively, either heat treatment or laser light irradiation may be performed plural times.

A crystalline semiconductor film can also be formed directly over the substrate by a plasma method. Alternatively, a crystalline semiconductor film may be selectively formed over the substrate by a plasma method.

An oxide semiconductor may be used for the semiconductor layer. For example, zinc oxide (ZnO), tin oxide ($SnO_2$), or the like can be used. In the case of using ZnO for the semiconductor layer, $Y_2O_3$, $Al_2O_3$, $TiO_2$, a stacked layer thereof, or the like can be used for a gate insulating layer, and ITO, Au, Ti, or the like can be used for a gate electrode layer, a source electrode layer, and a drain electrode layer. In addition, In, Ga, or the like may be added to ZnO.

As the oxide semiconductor, a thin film represented by $InMO_3(ZnO)_m$ (m>0) can be used. Note that M denotes one or more of metal elements selected from gallium (Ga), iron (Fe), nickel (Ni), manganese (Mn), and cobalt (Co). In addition to a case where only Ga is contained as M, there is a case where Ga and any of the above metal elements other than Ga, for example, Ga and Ni or Ga and Fe are contained as M. Furthermore, the above oxide semiconductor may contain a transition metal element such as Fe or Ni or an oxide of the transition metal as an impurity element in addition to a metal element contained as M. For example, an In—Ga—Zn—O-based non-single-crystal film can be used as the oxide semiconductor layer.

As the oxide semiconductor layer (the $InMO_3(ZnO)_m$ (m>0) film), an $InMO_3(ZnO)_m$ film (m>0) in which M is another metal element may be used instead of the In—Ga—Zn—O-based non-single-crystal film. As the oxide semiconductor which is applied to the oxide semiconductor layer, any of the following oxide semiconductors can be applied in addition to the above: an In—Sn—Zn—O-based oxide semiconductor; an In—Al—Zn—O-based oxide semiconductor; a Sn—Ga—Zn—O-based oxide semiconductor; an Al—Ga—Zn—O-based oxide semiconductor; a Sn—Al—Zn—O-based oxide semiconductor; an In—Zn—O-based oxide semiconductor; a Sn—Zn—O-based oxide semiconductor; an Al—Zn—O-based oxide semiconductor; an In—O-based oxide semiconductor; a Sn—O-based oxide semiconductor; and a Zn—O-based oxide semiconductor. Silicon oxide may be added to any of the above oxide semiconductors.

This embodiment can be combined with any of the other embodiments as appropriate.

Embodiment 11

In this embodiment, one embodiment of a liquid crystal display device will be described with reference to block diagrams of FIGS. 25A and 25B and a timing chart of FIG. 26.

Figure 25A:
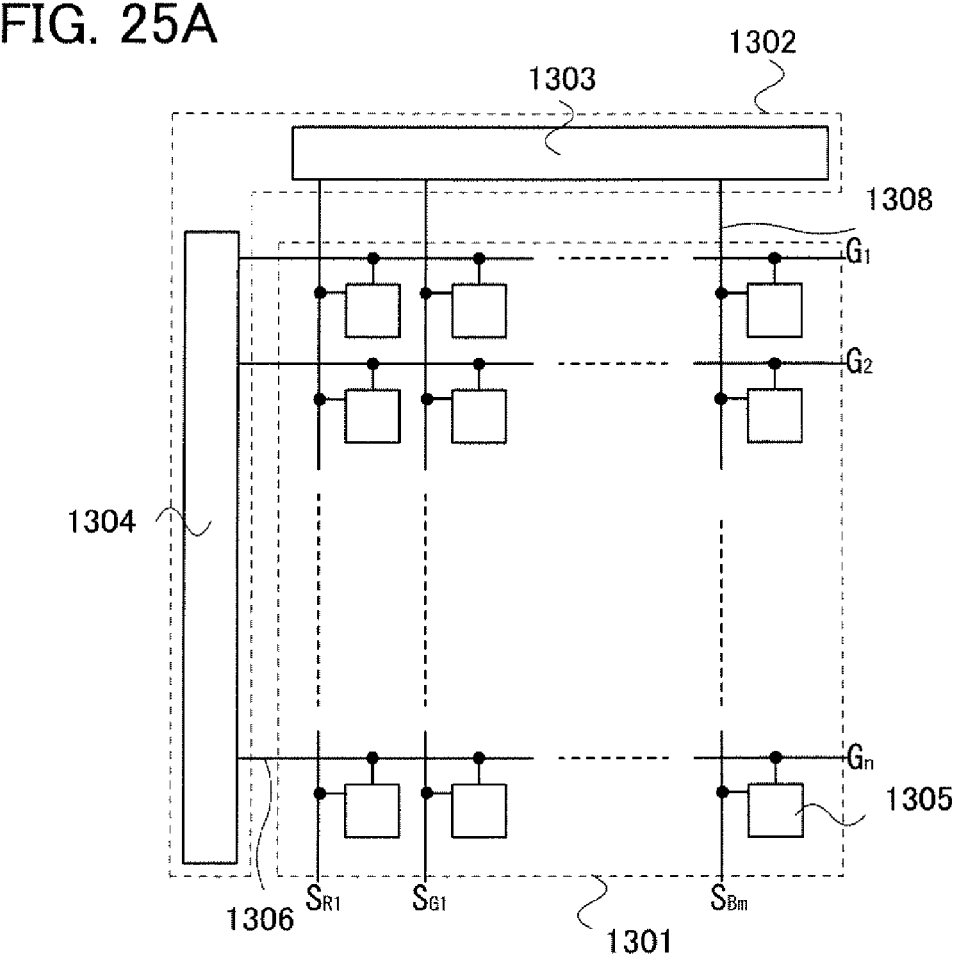
FIGS. 25A and 25B are block diagrams illustrating a liquid crystal display device.
Figure 25B:
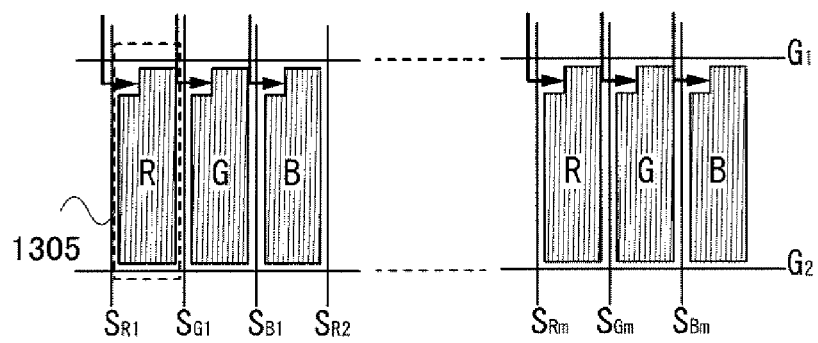

FIGS. 25A and 25B illustrate a structure of a block diagram of a liquid crystal display device. FIG. 25A illustrates a structure of a display portion 1301 and a driving portion 1302. The driving portion 1302 includes a signal line driver circuit 1303, a scan line driver circuit 1304, and the like. In the display portion 1301, a plurality of pixels 1305 are provided in matrix.

In FIG. 25A, a scan signal is supplied from the scan line driver circuit 1304 to a scan line 1306. In addition, data is supplied from the signal line driver circuit 1303 to a signal line 1308. A scan signal from the scan line 1306 is supplied such that the pixels 1305 are sequentially selected from a first row of the scan line 1306.

Note that in FIG. 25A, n (from $G_1$ to $G_n$) scan lines 1306 are connected to the scan line driver circuit 1304. Considering the case where a minimum unit of an image is formed with three pixels of R, G, and B (R: red, G: green, and B: blue), the signal line driver circuit 1303 is connected to 3m signal lines in total: m (from $S_{R1}$ to $S_{Rm}$) signal lines corresponding to R, m (from $S_{G1}$ to $S_{Gm}$) signal lines corresponding to G, and m (from $S_{B1}$ to $S_{Bm}$) signal lines corresponding to B. That is, as illustrated in FIG. 25B, a signal line is provided for each color element, and data is supplied from the signal line to the pixel corresponding to a color element, so that the pixels 1305 can express a desired color.

Figure 26:
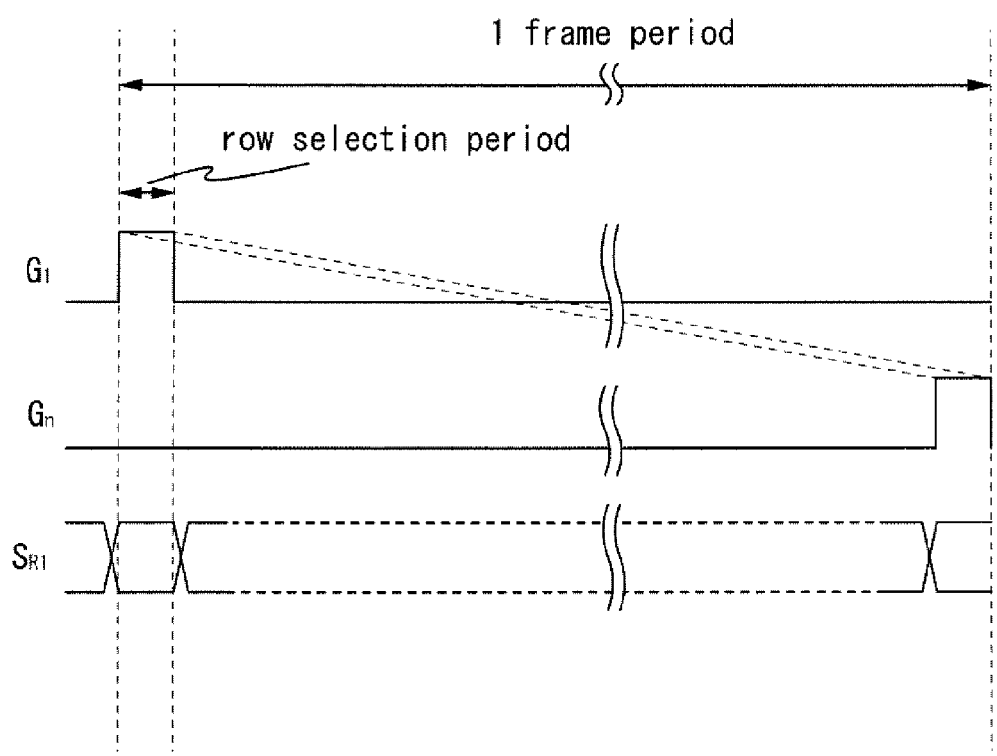
FIG. 26 is a timing chart illustrating a liquid crystal display device.

The timing chart of FIG. 26 shows scan signals for selecting the scan lines 1306 (typically, $G_1$ and $G_n$) in the respective row selection periods (scan period of one row of pixels of the liquid crystal display device) in one frame period, and shows a data signal of the signal line 1308 (typically, $S_{R1}$).

Note that circuit diagrams in FIGS. 25A and 25B show the case where an n-channel transistor is used as a transistor provided for each pixel. FIG. 26 shows drive of pixels of when on and off of the n-channel transistor are controlled. Note that when a p-channel transistor is used in the circuit diagrams in FIGS. 25A and 25B, the potential of a scan signal may be changed as appropriate so that operation of turning on or off of the transistor can be the same.

In the timing chart of FIG. 26, one frame period corresponding to a period in which an image of one screen is displayed is set to at least 1/120 second 8.3 ms) (preferably, 1/240 second) such that a viewer does not perceive afterimages when a moving image is displayed. When the number of scan lines is n, a row selection period corresponds to 1/(120×n) second. For example, in the case of a liquid crystal display device including 2000 scan lines (a so-called 4k2k image such as 4096×2160 pixels or 3840×2160 pixels is assumed) and not taking into consideration delay of a signal due to a wiring or the like, a row selection period corresponds to 1/240000 second (≈4.2 μs).

A liquid crystal element exhibiting a blue phase has a response time (a time to change the alignment of liquid crystal molecules) of one millisecond or less when voltage is applied. On the other hand, a VA mode liquid crystal element has a response time of about a few milliseconds when voltage is applied, even if the overdrive method is employed. Therefore, in the operation of a VA mode liquid crystal element, the length of one frame period is made not to be shorter than the response time in order to maintain favorable display. On the other hand, in the liquid crystal display device of this embodiment, a liquid crystal element exhibiting a blue phase is used and a wiring is formed using a low-resistance material such as a Cu wiring, so that delay of a signal due to the wiring or the like can be reduced; thus, a sufficient margin for the response time of the liquid crystal element can be obtained, and desired alignment of the liquid crystal element which is based on voltage applied to the liquid crystal element in a row selection period can be efficiently obtained.

By provision of the first structure body and the second structure body, each of which has a high dielectric constant, in a liquid crystal layer of the liquid crystal display device in FIGS. 25A and 25B and FIG. 26, an electric field can be widely formed between the first electrode layer and the first structure body, and the second electrode layer and the second structure body when voltage is applied between the first electrode layer and the second electrode layer.

The first structure body and the second structure body are provided in contact with the second substrate opposite to the first substrate, and a material having a higher dielectric constant is used, whereby an electric field can be formed in the entire liquid crystal layer, and the liquid crystal molecules can be controlled using the electric field.

Therefore, the liquid crystal molecules in the entire liquid crystal layer including the liquid crystal molecules in a thickness direction can be made to respond and white transmittance can be improved. Thus, a contrast ratio, which is a ratio of white transmittance to black transmittance, can also be increased.

In the above-described manner, in the liquid crystal display device using the liquid crystal layer exhibiting a blue phase, a contrast ratio can be increased.

This embodiment can be combined with any of the other embodiments as appropriate.

Embodiment 12

A thin film transistor is manufactured, and a liquid crystal display device having a display function can be manufactured using the thin film transistor in a pixel portion and further in a driver circuit. Further, part or the whole of a driver circuit can be formed over the same substrate as a pixel portion, using a thin film transistor, whereby a system-on-panel can be obtained.

The liquid crystal display device includes a liquid crystal element (also referred to as a liquid crystal display element) as a display element.

Further, a liquid crystal display device includes a panel in which a liquid crystal display element is sealed, and a module in which an IC or the like including a controller is mounted to the panel. One embodiment of the present invention also relates to an element substrate, which corresponds to one mode before the display element is completed in a manufacturing process of the liquid crystal display device, and the element substrate is provided with means for supplying current to the display element in each of a plurality of pixels. Specifically, the element substrate may be in a state after only a pixel electrode of the display element is formed, a state after a conductive film to be a pixel electrode is formed and before the conductive film is etched to form the pixel electrode, or any of other states.

Note that a liquid crystal display device in this specification means an image display device, a display device, or a light source (including a lighting device). Further, the liquid crystal display device includes any of the following modules in its category: a module to which a connector such as a flexible printed circuit (FPC), tape automated bonding (TAB) tape, or a tape carrier package (TCP) is attached; a module having TAB tape or a TCP which is provided with a printed wiring board at the end thereof; and a module having an integrated circuit (IC) which is directly mounted on a display element by a chip on glass (COG) method.

The appearance and a cross section of a liquid crystal display panel, which is one embodiment of a liquid crystal display device, will be described with reference to FIGS. 12A1, 12A2, and 12B. FIGS. 12A1 and 12A2 are top views of panels in which thin film transistors 4010 and 4011 and a liquid crystal element 4013, which are formed over a first substrate 4001, are sealed between the first substrate 4001 and a second substrate 4006 with a sealant 4005. FIG. 12B is a cross-sectional view taken along line M-N in FIGS. 12A1 and 12A2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. Therefore, the pixel portion 4002 and the scan line driver circuit 4004 are sealed together with a liquid crystal layer 4008, by the first substrate 4001, the sealant 4005, and the second substrate 4006.

In FIG. 12A1, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. Note that FIG. 12A2 illustrates an example in which part of the signal line driver circuit is formed using a thin film transistor provided over the first substrate 4001. A signal line driver circuit 4003b is formed over the first substrate 4001, and a signal line driver circuit 4003a formed using a single crystal semiconductor film or a polycrystalline semiconductor film is mounted over a separately-prepared substrate.

Note that the connection method of a driver circuit which is separately formed is not particularly limited, and a COG method, a wire bonding method, a TAB method, or the like can be used. FIG. 12A1 illustrates an example in which the signal line driver circuit 4003 is mounted by a COG method, and FIG. 12A2 illustrates an example in which the signal line driver circuit 4003 is mounted by a TAB method.

The pixel portion 4002 and the scanning line driver circuit 4004 which are provided over the first substrate 4001 include a plurality of thin film transistors. FIG. 12B illustrates the thin film transistor 4010 included in the pixel portion 4002 and the thin film transistor 4011 included in the scanning line driver circuit 4004. Over the thin film transistors 4010 and 4011, an insulating layer 4020 and an interlayer film 4021 are provided.

Any of thin film transistors which are described in Embodiments 2 to 10 can be used as the thin film transistors 4010 and 4011. The thin film transistors 4010 and 4011 are n-channel thin film transistors.

A pixel electrode layer 4030 which is electrically connected to the thin film transistor 4010 is formed over the first substrate 4001 and the interlayer film 4021. Over the pixel electrode layer 4030, first structure bodies 4037a and 4037b are formed to project into the liquid crystal layer 4008. Similarly, a common electrode layer 4036 is formed over the interlayer film 4021, and second structure bodies 4038a and 4038b are formed over the common electrode layer 4036. The first structure bodies 4037a and 4037b form a stacked-layer structure, the second structure bodies 4038a and 4038b form another stacked-layer structure, and they are provided in contact with the second substrate 4006.

The first structure bodies 4037a and 4037b and the second structure bodies 4038a and 4038b also function as spacers, and control the thickness (a cell gap) of the liquid crystal layer 4008. In the case where a spacer is separately provided, a columnar spacer obtained by selective etching of an insulating film or a spherical spacer may be used. The spacer is provided so that the thickness (the cell gap) of the liquid crystal layer 4008 is controlled. In the liquid crystal display device using the liquid crystal layer 4008, the thickness (the cell gap) of the liquid crystal layer 4008 is preferably about 5 µm to 20 µm.

The liquid crystal element 4013 includes the pixel electrode layer 4030, the common electrode layer 4036, and the liquid crystal layer 4008. Note that a polarizing plate 4032 and a polarizing plate 4033 are provided on the outer sides of the first substrate 4001 and the second substrate 4006, respectively.

As the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. In addition, a sheet with a structure in which an aluminum foil is sandwiched between PVF films or polyester films can be used.

Although FIGS. 12A1, 12A2, and 12B illustrate examples of transmissive liquid crystal display devices, one embodiment of the present invention can also be applied to a semi-transmissive liquid crystal display device.

FIGS. 12A1, 12A2, and 12B illustrate examples of liquid crystal display devices in which a polarizing plate is provided on the outer side (the view side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

The interlayer film 4021 is a light-transmitting chromatic-color resin layer and functions as a color filter layer. A light-blocking layer may be included in part of the interlayer film 4021. In FIGS. 12A1, 12A2, and 12B, a light-blocking layer 4034 is provided on the second substrate 4006 side so as to cover the thin film transistors 4010 and 4011. By provision of the light-blocking layer 4034, improvement in contrast and stabilization of the thin film transistors can be achieved.

The thin film transistors may be covered with the insulating layer 4020 which serves as a protective film of the thin film transistors; however, the structure of the thin film transistor is not particularly limited thereto.

Note that the protective film is provided to prevent entry of contaminant impurities such as an organic substance, a metal substance, or moisture existing in air and is preferably a dense film. The protective film may be formed with a single layer or a stacked layer of a silicon oxide film, a silicon nitride film, a silicon oxynitride film, a silicon nitride oxide film, an aluminum oxide film, an aluminum nitride film, an aluminum oxynitride film, and/or an aluminum nitride oxide film by a sputtering method.

After the protective film is formed, the semiconductor layer may be subjected to annealing (300° C. to 400° C.).

Further, in the case of further forming a light-transmitting insulating layer as a planarizing insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, PSG (phosphosilicate glass), BPSG (borophosphosilicate glass), or the like. Note that the insulating layer may be formed by stacking a plurality of insulating films formed of these materials.

There is no particular limitation on the formation method of the insulating layer having a stacked-layer structure, and the following method can be employed depending on the material: a method such as a sputtering method, a CVD method, an SOG method, spin coating, dip coating, spray coating, or a droplet discharging method (e.g., ink jetting, screen printing, or offset printing), or with a tool (equipment) such as a doctor knife, a roll coater, a curtain coater, or a knife coater. In the case where the insulating layer is formed using a material solution, the semiconductor layer may be annealed (at 200° C. to 400° C.) at the same time of a baking step. The baking step of the insulating layer also serves as the annealing step of the semiconductor layer, whereby a liquid crystal display device can be manufactured efficiently.

The pixel electrode layer 4030 and the common electrode layer 4036 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

The pixel electrode layer 4030 and the common electrode layer 4036 can be formed using one kind or plural kinds selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also referred to as a conductive polymer) can be used for the pixel electrode layer 4030 and the common electrode layer 4036.

Further, a variety of signals and potentials are supplied to the signal line driver circuit 4003 which is formed separately, the scan line driver circuit 4004, or the pixel portion 4002 from an FPC 4018.

Since the thin film transistors are easily damaged by static electricity or the like, a protection circuit for protecting the driver circuits is preferably provided over the same substrate as a gate line or a source line. The protection circuit is preferably formed using a nonlinear element.

In FIGS. 12A1, 12A2, and 12B, a connection terminal electrode 4015 is formed using the same conductive film as that of the pixel electrode layer 4030, and a terminal electrode 4016 is formed using the same conductive film as that of source and drain electrode layers of the thin film transistors 4010 and 4011.

The connection terminal electrode 4015 is electrically connected to a terminal included in the FPC 4018 through an anisotropic conductive film 4019.

Although FIGS. 12A1, 12A2, and 12B illustrate an example in which the signal line driver circuit 4003 is formed separately and mounted on the first substrate 4001, this embodiment is not limited to this structure. The scan line driver circuit may be separately formed and then mounted, or only part of the signal line driver circuit or part of the scan line driver circuit may be separately formed and then mounted.

Figure 16:
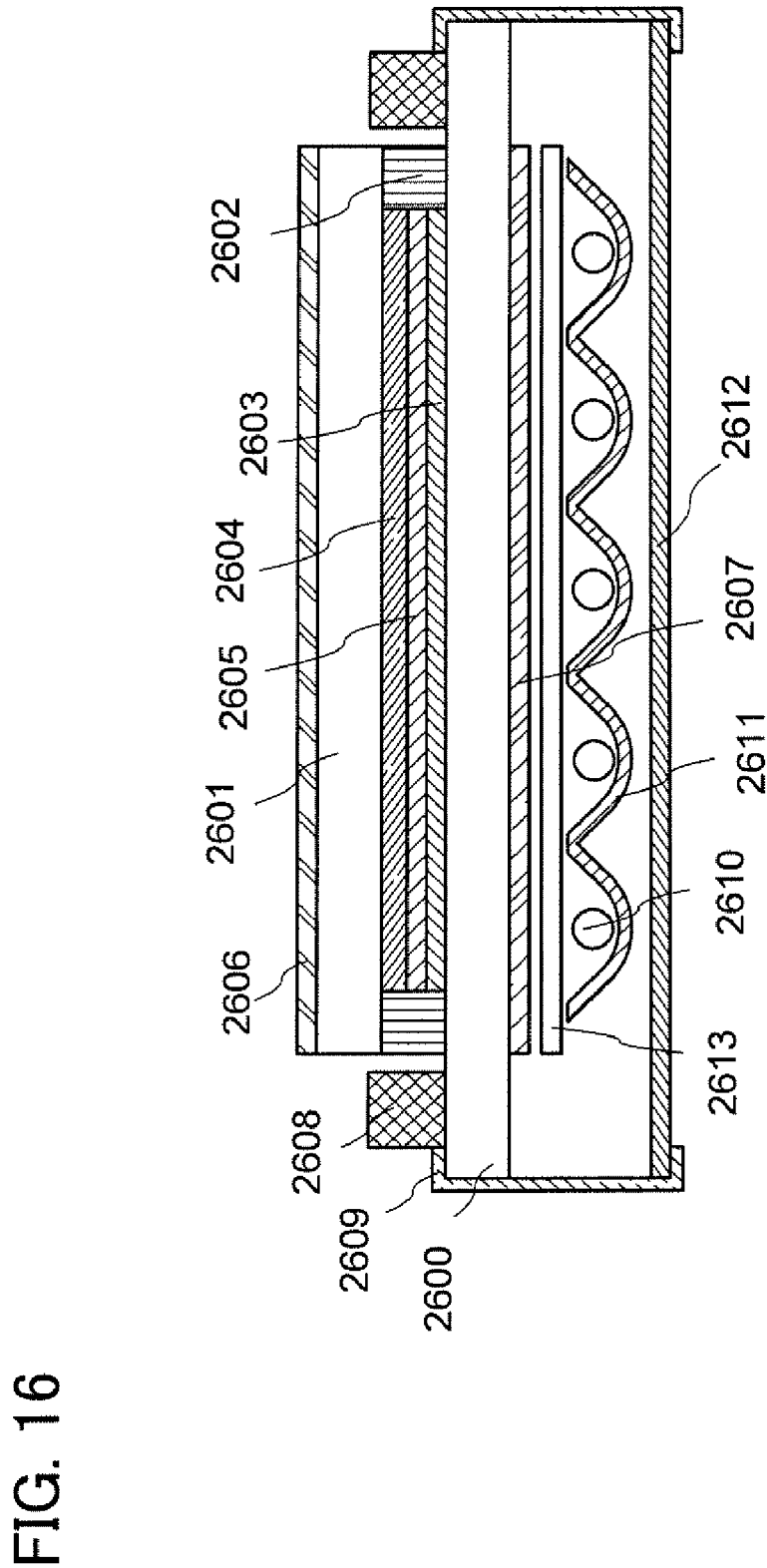
FIG. 16 is a diagram illustrating a liquid crystal display module.

FIG. 16 illustrates an example of a liquid crystal display module which is formed as a liquid crystal display device disclosed in this specification.

FIG. 16 illustrates an example of the liquid crystal display module, in which an element substrate 2600 and a counter substrate 2601 are attached to each other with a sealant 2602, and an element layer 2603 including a TFT or the like, a display element 2604 including a liquid crystal layer, and an interlayer film 2605 including a light-transmitting chromatic-color resin layer that functions as a color filter are provided between the substrates to form a display region. The interlayer film 2605 including a light-transmitting chromatic-color resin layer is necessary to perform color display. In the ease of the RGB system, respective light-transmitting chromatic-color resin layers corresponding to colors of red, green, and blue are provided for respective pixels. A polarizing plate 2606 is provided on the outer side of the counter substrate 2601, and a polarizing plate 2607 and a diffuser plate 2613 are provided on the outer side of the element substrate 2600. A light source includes a cold cathode tube 2610 and a reflective plate 2611, and a circuit substrate 2612 is connected to a wiring circuit portion 2608 of the element substrate 2600 through a flexible wiring board 2609 and includes an external circuit such as a control circuit and a power source circuit. As the light source, a white diode may be used. The polarizing plate and the liquid crystal layer may be stacked with a retardation plate therebetween.

Through the above-described steps, a highly reliable liquid crystal display panel as a liquid crystal display device can be manufactured.

This embodiment can be combined with any of the other embodiments as appropriate.

Embodiment 13

A display device disclosed in this specification can be applied to a variety of electronic devices (including an amusement machine). Examples of electronic devices include a television set (also referred to as a television or a television receiver), a monitor of a computer or the like, a camera such as a digital camera or a digital video camera, a digital photo frame, a mobile phone handset (also referred to as a mobile phone or a mobile phone device), a portable game console, a portable information terminal, an audio reproducing device, a large-sized game machine such as a pachinko machine, and the like.

Figure 13A:
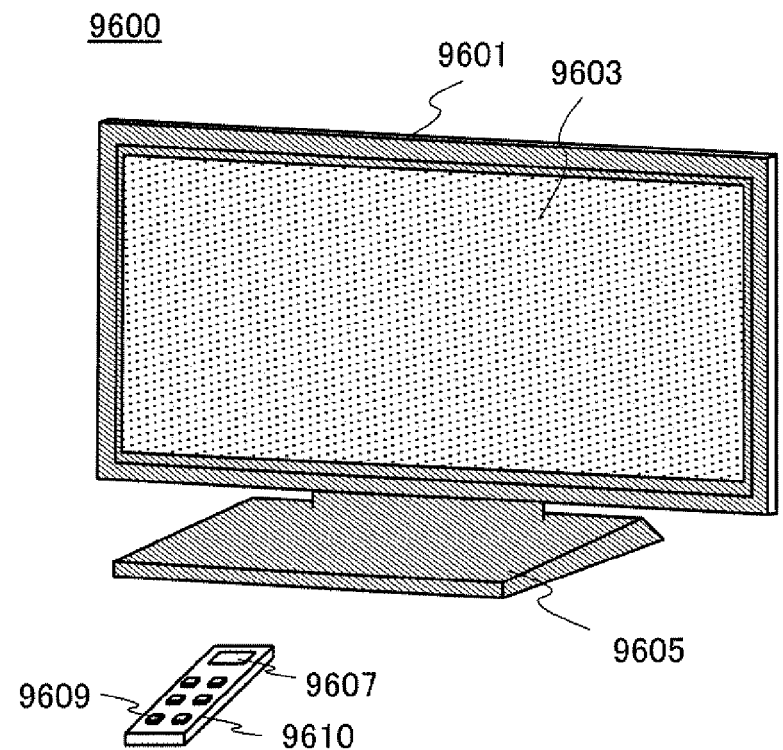
FIG. 13A is an external view of an example of a television device and FIG. 13B is an external view of an example of a digital photo frame.

FIG. 13A illustrates an example of a television set 9600. In the television set 9600, a display portion 9603 is incorporated in a housing 9601. The display portion 9603 can display an image. Further, the housing 9601 is supported by a stand 9605 here.

The television set 9600 can be operated with an operation switch of the housing 9601 or a separate remote controller 9610. Channels and volume can be controlled with an operation key 9609 of the remote controller 9610 so that an image displayed on the display portion 9603 can be controlled. Further, the remote controller 9610 may be provided with a display portion 9607 for displaying data output from the remote controller 9610.

Note that the television set 9600 is provided with a receiver, a modem, and the like. With the receiver, a general television broadcast can be received. Further, when the television set is connected to a communication network by wired or wireless connection via the modem, one-way (from a transmitter to a receiver) or two-way (between a transmitter and a receiver or between receivers) data communication can be performed.

Figure 13B:
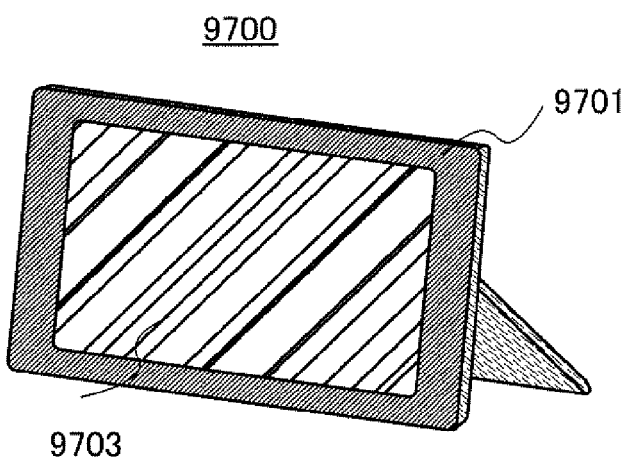

FIG. 13B illustrates an example of a digital photo frame 9700. For example, in the digital photo frame 9700, a display portion 9703 is incorporated in a housing 9701. The display portion 9703 can display various images. For example, the display portion 9703 can display data of an image taken with a digital camera or the like and function as a normal photo frame.

Note that the digital photo frame 9700 is provided with an operation portion, an external connection portion (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for the design of the digital photo frame. For example, a memory storing data of an image taken with a digital camera is inserted in the recording medium insertion portion of the digital photo frame, whereby the image data can be transferred and then displayed on the display portion 9703.

The digital photo frame 9700 may be configured to transmit and receive data wirelessly. The structure may be employed in which desired image data is transferred wirelessly to be displayed.

Figure 14A:
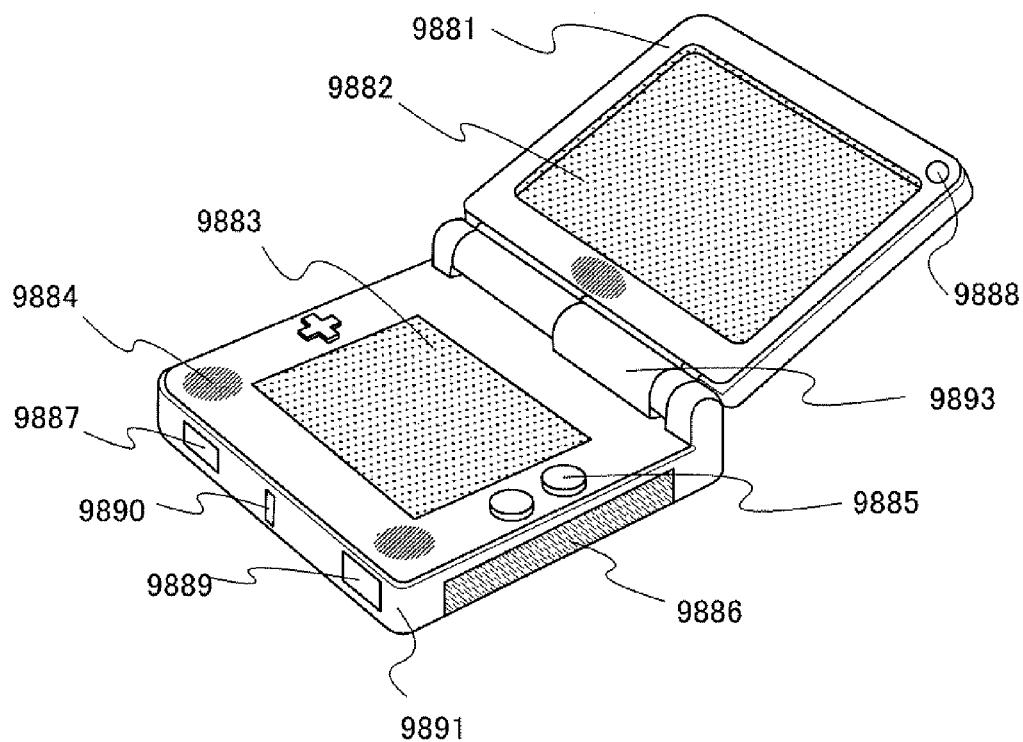
FIGS. 14A and 14B are external views each illustrating an example of an amusement machine.

FIG. 14A is a portable game machine and includes two housings, a housing 9881 and a housing 9891, which are connected with a joint portion 9893 so that the portable game machine can be opened or folded. A display portion 9882 is incorporated in the housing 9881, and a display portion 9883 is incorporated in the housing 9891. In addition, the portable game machine illustrated in FIG. 14A is provided with a speaker portion 9884, a recording medium insert portion 9886, an LED lamp 9890, input means (operation keys 9885, a connection terminal 9887, a sensor 9888 (having a function of measuring force, displacement, position, speed, acceleration, angular velocity, rotation number, distance, light, liquid, magnetism, temperature, chemical substance, sound, time, hardness, electric field, current, voltage, electric power, radial ray, flow rate, humidity, gradient, vibration, odor, or infrared ray), and a microphone 9889), and the like. Needless to say, the structure of the portable game machine is not limited to that described above. The portable game machine may have a structure in which additional accessory equipment is provided as appropriate as long as at least a liquid crystal display device disclosed in this specification is provided. The portable game machine illustrated in FIG. 14A has a function of reading a program or data stored in a recording medium to display it on the display portion, and a function of sharing information with another portable game machine by wireless communication. Note that a function of the portable game machine illustrated in FIG. 14A is not limited to those described above, and the portable game machine can have a variety of functions.

Figure 14B:
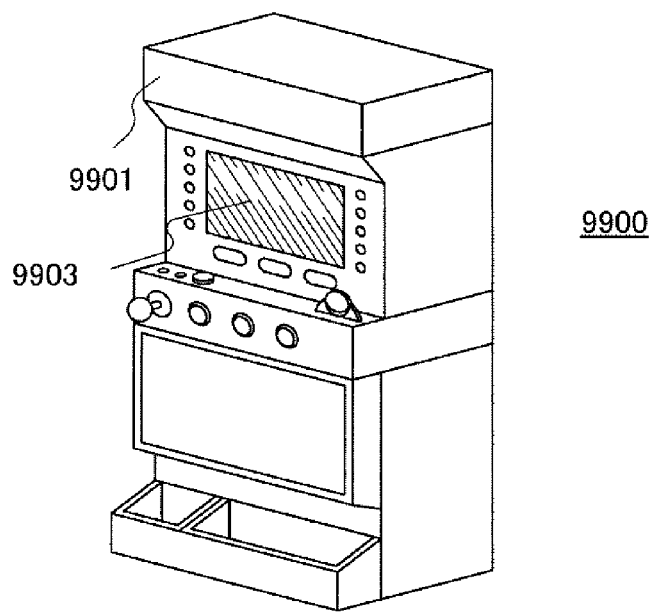

FIG. 14B illustrates an example of a slot machine 9900 which is a large-sized amusement machine. In the slot machine 9900, a display portion 9903 is incorporated in a housing 9901. In addition, the slot machine 9900 is provided with operation means such as a start lever and a stop switch, a coin slot, a speaker, or the like. Needless to say, the structure of the slot machine 9900 is not limited to the above-described structure. The slot machine may have a structure in which additional accessory equipment is provided as appropriate as long as at least a liquid crystal display device disclosed in this specification is provided.

Figure 15A:
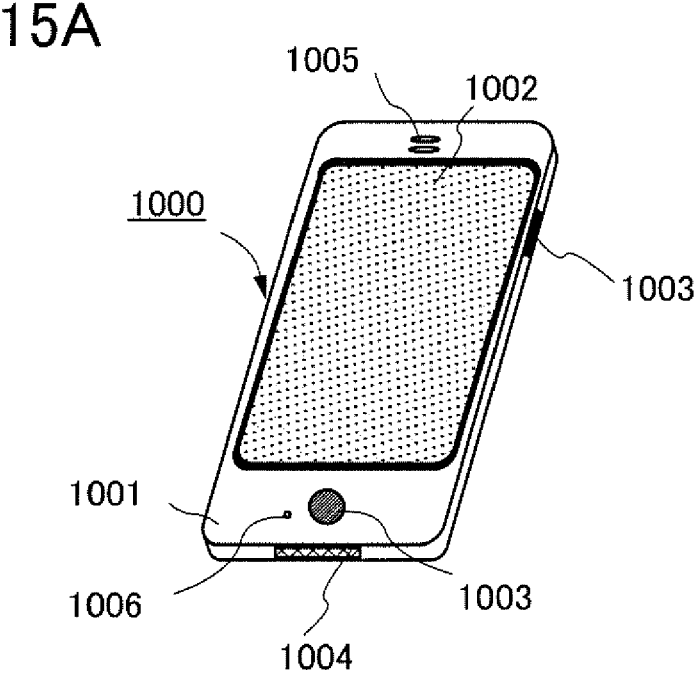
FIGS. 15A and 15B are external views each illustrating an example of a mobile phone handset.

FIG. 15A illustrates an example of a mobile phone handset 1000. The mobile phone handset 1000 is provided with a display portion 1002 incorporated in a housing 1001, operation buttons 1003, an external connection port 1004, a speaker 1005, a microphone 1006, and the like.

When the display portion 1002 of the mobile phone handset 1000 illustrated in FIG. 15A is touched with a finger or the like, data can be input into the mobile phone handset 1000. Further, operation such as making calls and texting can be performed by touching the display portion 1002 with a finger or the like.

There are mainly three screen modes of the display portion 1002. The first mode is a display mode mainly for displaying an image. The second mode is an input mode mainly for inputting data such as text. The third mode is a display-and-input mode which is a combination of the two modes, that is, a combination of the display mode and the input mode.

For example, in the case of making a call or texting, a text input mode mainly for inputting text is selected for the display portion 1002 so that text displayed on a screen can be inputted. In that case, it is preferable to display a keyboard or number buttons on almost all area of the screen of the display portion 1002.

When a detection device including a sensor for detecting inclination, such as a gyroscope or an acceleration sensor, is provided inside the mobile phone handset 1000, display on the screen of the display portion 1002 can be automatically changed by determining the orientation of the mobile phone handset 1000 (whether the mobile phone handset 1000 is placed horizontally or vertically for a landscape mode or a portrait mode).

The screen modes are changed by touching the display portion 1002 or using the operation buttons 1003 of the housing 1001. Alternatively, the screen modes may be changed depending on the kind of image displayed on the display portion 1002. For example, when a signal of an image displayed on the display portion is the one of moving image data, the screen mode is changed to the display mode. When the signal is the one of text data, the screen mode is changed to the input mode.

Further, in the input mode, when input by touching the display portion 1002 is not performed for a certain period while a signal detected by the optical sensor in the display portion 1002 is detected, the screen mode may be controlled so as to be changed from the input mode to the display mode.

The display portion 1002 may function as an image sensor. For example, an image of a palm print, a fingerprint, or the like is taken when the display portion 1002 is touched with a palm or a finger, whereby personal identification can be performed. Further, by providing a backlight or a sensing light source which emits a near-infrared light in the display portion, an image of a finger vein, a palm vein, or the like can be taken.

Figure 15B:
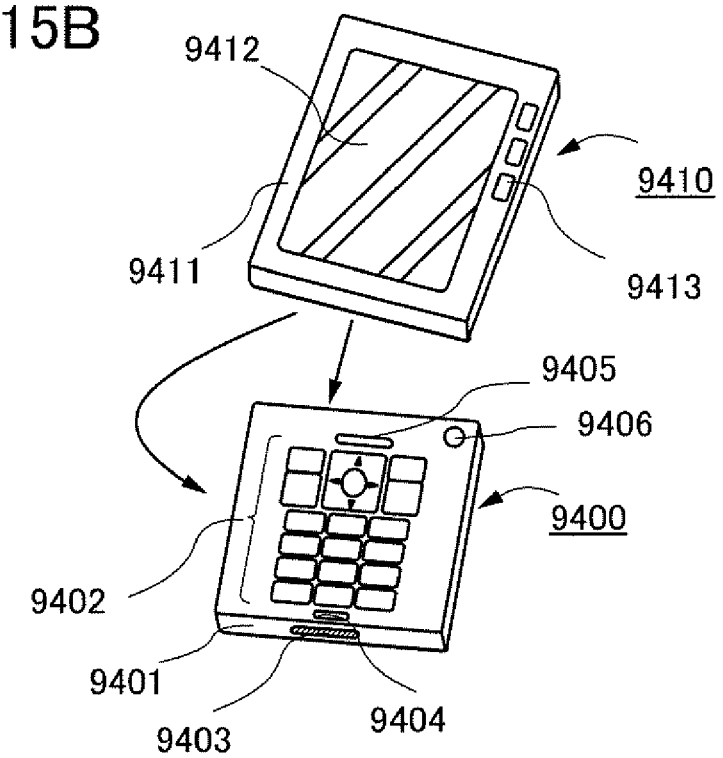

FIG. 15B illustrates another example of a mobile phone handset. The mobile phone handset in FIG. 15B has a display device 9410 in a housing 9411, which includes a display portion 9412 and operation buttons 9413, and a communication device 9400 in a housing 9401, which includes operation buttons 9402, an external input terminal 9403, a microphone 9404, a speaker 9405, and a light-emitting portion 9406 that emits light when a phone call is received. The display device 9410 which has a display function can be detached from or attached to the communication device 9400 which has a phone function by moving in two directions represented by arrows. Thus, the display device 9410 and the communication device 9400 can be attached to each other along their short sides or long sides. In addition, when only the display function is needed, the display device 9410 can be detached from the communication device 9400 and used alone. Images or input information can be transmitted or received by wireless or wired communication between the communication device 9400 and the display device 9410, each of which has a rechargeable battery.

This application is based on Japanese Patent Application serial no. 2009-130030 filed with Japan Patent Office on May 29, 2009, the entire contents of which are hereby incorporated by reference.

The invention claimed is:

1. A liquid crystal display device comprising:
a first substrate and a second substrate opposed to each other;
a liquid crystal layer between the first substrate and the second substrate, the liquid crystal layer containing a liquid crystal material exhibiting a blue phase;
a pixel electrode layer and a common electrode layer which are provided between the first substrate and the liquid crystal layer;
a first structure body which is provided over the pixel electrode layer and projects into the liquid crystal layer; and
a second structure body which is provided over the common electrode layer and projects into the liquid crystal layer,
wherein liquid crystal molecules in the liquid crystal layer are controlled in a direction parallel to the first substrate and the second substrate, and
wherein a dielectric constant of the first structure body and a dielectric constant of the second structure body are higher than a dielectric constant of the liquid crystal layer.

2. The liquid crystal display device according to claim 1, wherein a dielectric constant of the first structure body and a dielectric constant of the second structure body are 12 or more.

3. The liquid crystal display device according to claim 1, wherein the first structure body and the second structure body each have a stacked-layer structure.

4. The liquid crystal display device according to claim 1, wherein the pixel electrode layer and the common electrode layer each have a comb-like shape.

5. The liquid crystal display device according to claim 1, wherein the liquid crystal layer includes a chiral agent.

6. The liquid crystal display device according to claim 1, wherein the liquid crystal layer includes a photocurable resin and a photopolymerization initiator.

7. The liquid crystal display device according to claim 1, wherein the first structure body and the second structure body include any one of an acrylic resin, an epoxy resin, an amine resin and a pullulan derivative.

8. The liquid crystal display device according to claim 1, wherein a thin film transistor is provided between the first substrate and the pixel electrode layer and between the first substrate the common electrode layer, and
wherein the pixel electrode layer is electrically connected to the thin film transistor.

9. The liquid crystal display device according to claim 8, wherein a light-transmitting chromatic-color resin layer is provided between the thin film transistor and the pixel electrode layer and between the thin film transistor and the common electrode layer.

10. A liquid crystal display device comprising:
a first substrate and a second substrate opposed to each other;
a liquid crystal layer between the first substrate and the second substrate, the liquid crystal layer containing a liquid crystal material exhibiting a blue phase;
a pixel electrode layer and a common electrode layer which are provided between the first substrate and the liquid crystal layer;
a first structure body which is provided over the pixel electrode layer, projects into the liquid crystal layer, and is in contact with the second substrate; and
a second structure body which is provided over the common electrode layer, projects into the liquid crystal layer, and is in contact with the second substrate,
wherein liquid crystal molecules in the liquid crystal layer are controlled in a direction parallel to the first substrate and the second substrate, and
wherein a dielectric constant of the first structure body and a dielectric constant of the second structure body are higher than a dielectric constant of the liquid crystal layer.

11. The liquid crystal display device according to claim 10, wherein a dielectric constant of the first structure body and a dielectric constant of the second structure body are 12 or more.

12. The liquid crystal display device according to claim 10, wherein the first structure body and the second structure body each have a stacked-layer structure.

13. The liquid crystal display device according to claim 10, wherein the pixel electrode layer and the common electrode layer each have a comb-like shape.

14. The liquid crystal display device according to claim 10, wherein the liquid crystal layer includes a chiral agent.

15. The liquid crystal display device according to claim 10, wherein the liquid crystal layer includes a photocurable resin and a photopolymerization initiator.

16. The liquid crystal display device according to claim 10, wherein the first structure body and the second structure body include any one of an acrylic resin, an epoxy resin, an amine resin and a pullulan derivative.

17. The liquid crystal display device according to claim 10, wherein a thin film transistor is provided between the first substrate and the pixel electrode layer and between the first substrate and the common electrode layer, and
wherein the pixel electrode layer is electrically connected to the thin film transistor.

18. The liquid crystal display device according to claim 17, wherein a light-transmitting chromatic-color resin layer is provided between the thin film transistor and the pixel electrode layer and between the thin film transistor and the common electrode layer.

19. A liquid crystal display device comprising:
a first substrate and a second substrate opposed to each other;
a liquid crystal layer between the first substrate and the second substrate, the liquid crystal layer containing a liquid crystal material exhibiting a blue phase;
a pixel electrode layer and a common electrode layer which are provided between the first substrate and the liquid crystal layer;
a first structure body which is provided over the pixel electrode layer and projects into the liquid crystal layer;
a second structure body which is provided over the common electrode layer and projects into the liquid crystal layer; and
a third structure body formed using the same material as the first structure body and the second structure body and provided between the pixel electrode layer and the common electrode layer,
wherein liquid crystal molecules in the liquid crystal layer are controlled in a direction parallel to the first substrate and the second substrate, and
wherein a dielectric constant of the first structure body, a dielectric constant of the second structure body and a dielectric constant of the third structure body are higher than a dielectric constant of the liquid crystal layer.

20. The liquid crystal display device according to claim 19, wherein a dielectric constant of the first structure body, a dielectric constant of the second structure body and a dielectric constant of the third structure body are 12 or more.

21. The liquid crystal display device according to claim 19, wherein the first structure body, the second structure body and the third structure body each have a stacked-layer structure.

22. The liquid crystal display device according to claim 19, wherein the pixel electrode layer and the common electrode layer each have a comb-like shape.

23. The liquid crystal display device according to claim 19, wherein the liquid crystal layer includes a chiral agent.

24. The liquid crystal display device according to claim 19, wherein the liquid crystal layer includes a photocurable resin and a photopolymerization initiator.

25. The liquid crystal display device according to claim 19, wherein the first structure body, the second structure body and the third structure body include any one of an acrylic resin, an epoxy resin, an amine resin and a pullulan derivative.

26. The liquid crystal display device according to claim 19, wherein a thin film transistor is provided between the first substrate and the pixel electrode layer and between the first substrate and the common electrode layer, and
wherein the pixel electrode layer is electrically connected to the thin film transistor.

27. The liquid crystal display device according to claim 26, wherein a light-transmitting chromatic-color resin layer is provided between the thin film transistor and the pixel electrode layer and between the thin film transistor and the common electrode layer.

* * * * *